US012239882B2

(12) United States Patent
Werner

(10) Patent No.: US 12,239,882 B2
(45) Date of Patent: Mar. 4, 2025

(54) PROGRAM PRODUCTS, METHODS, AND SYSTEMS FOR PROVIDING LOCATION-AWARE FITNESS MONITORING SERVICES

(71) Applicant: adidas AG, Herzogenaurach (DE)

(72) Inventor: Jon H. Werner, Austin, TX (US)

(73) Assignee: adidas AG, Herzogenaurach (DE)

( * ) Notice: Subject to any disclaimer, the term of this patent is extended or adjusted under 35 U.S.C. 154(b) by 0 days.

(21) Appl. No.: 18/474,694

(22) Filed: Sep. 26, 2023

(65) Prior Publication Data

US 2024/0091590 A1    Mar. 21, 2024

Related U.S. Application Data

(63) Continuation of application No. 15/216,266, filed on Jul. 21, 2016, now Pat. No. 11,819,735, which is a
(Continued)

(51) Int. Cl.
*A63B 24/00* (2006.01)
*G01C 21/20* (2006.01)
(Continued)

(52) U.S. Cl.
CPC ...... *A63B 24/0021* (2013.01); *A63B 24/0062* (2013.01); *G01C 21/20* (2013.01);
(Continued)

(58) Field of Classification Search
CPC .... A63B 2024/0025; A63B 2071/0638; A63B 2071/0641; A63B 2071/0691;
(Continued)

(56) References Cited

U.S. PATENT DOCUMENTS 5,422,816 A    6/1995 Sprague et al.
5,648,768 A    7/1997 Bouve
(Continued)

FOREIGN PATENT DOCUMENTS

GB      2440975 A       2/2008
WO   WO 01/00281 A2    1/2001
(Continued)

OTHER PUBLICATIONS

Magellan GPS NAV DLX-10™ User Guide, Magellan System Corporation, San Dimas CA, 91 pages, 1995.
(Continued)

*Primary Examiner* — Charles J Han
(74) *Attorney, Agent, or Firm* — Sterne, Kessler, Goldstein & Fox P.L.L.C.

(57) ABSTRACT

Program products, methods, and systems for providing location-aware fitness monitoring services are disclosed. In an embodiment of the present invention, a method of displaying a route traversed by an athlete equipped with a location-aware portable fitness monitoring device includes the steps of (a) receiving data describing a plurality of satellite navigational system waypoints that are acquired as the athlete engages in a fitness activity, (b) identifying a map area based on a location indicated by the data describing the plurality of satellite navigational system waypoints, (c) determining the route traversed by the athlete based on the data describing the plurality of satellite navigational system waypoints and based on the location of one or more known paths associated with the map area, and (d) displaying the route traversed by the athlete on top of the map area.

17 Claims, 30 Drawing Sheets

Related U.S. Application Data continuation of application No. 12/569,492, filed on Sep. 29, 2009, now Pat. No. 9,409,052.

(60) Provisional application No. 61/102,623, filed on Oct. 3, 2008.

(51) Int. Cl.
| | |
|---|---|
| *G01C 21/36* | (2006.01) |
| *G01S 19/19* | (2010.01) |
| *G09B 5/02* | (2006.01) |
| *G09B 5/04* | (2006.01) |
| *A63B 71/06* | (2006.01) |

(52) U.S. Cl.
CPC .......... *G01C 21/3676* (2013.01); *G01S 19/19* (2013.01); *G09B 5/02* (2013.01); *G09B 5/04* (2013.01); *A63B 2024/0025* (2013.01); *A63B 2071/0641* (2013.01); *A63B 2071/0691* (2013.01); *A63B 2220/12* (2013.01); *A63B 2220/14* (2013.01)

(58) Field of Classification Search
CPC ............ A63B 2220/00; A63B 2220/10; A63B 2220/12; A63B 2220/14; A63B 24/00; A63B 24/0021; A63B 24/0062; A63B 71/00; A63B 71/06; A63B 71/0619; A63B 71/0622; G01C 21/00; G01C 21/20; G01C 21/26; G01C 21/34; G01C 21/36; G01C 21/3667; G01C 21/3676; G01S 19/00; G01S 19/01; G01S 19/13; G01S 19/14; G01S 19/19; G09B 5/00; G09B 5/02

See application file for complete search history.

(56) References Cited

U.S. PATENT DOCUMENTS

| | | | |
|---|---|---|---|
| 5,680,465 | A | 10/1997 | Boyden |
| 5,742,922 | A | 4/1998 | Kim |
| 5,769,755 | A | 6/1998 | Henry et al. |
| 5,825,327 | A | 10/1998 | Krasner |
| 5,864,870 | A | 1/1999 | Guck |
| 5,883,594 | A | 3/1999 | Lau |
| 5,883,595 | A | 3/1999 | Colley |
| 5,908,464 | A | 6/1999 | Kishigami et al. |
| 5,910,799 | A | 6/1999 | Carpenter et al. |
| 5,919,239 | A | 7/1999 | Fraker et al. |
| 5,948,040 | A | 9/1999 | DeLorme et al. |
| 6,002,982 | A | 12/1999 | Fry |
| 6,013,007 | A | 1/2000 | Root et al. |
| 6,024,655 | A | 2/2000 | Coffee |
| 6,032,108 | A | 2/2000 | Seiple et al. |
| 6,198,431 | B1 | 3/2001 | Gibson |
| 6,208,935 | B1 | 3/2001 | Yamada et al. |
| 6,301,964 | B1 | 10/2001 | Fyfe et al. |
| 6,321,158 | B1 | 11/2001 | De Lorme et al. |
| 6,339,746 | B1 | 1/2002 | Sugiyama et al. |
| 6,450,922 | B1 | 9/2002 | Henderson et al. |
| 6,456,854 | B1 | 9/2002 | Chern et al. |
| 6,463,385 | B1 | 10/2002 | Fry |
| 6,466,232 | B1 | 10/2002 | Newell et al. |
| 6,513,532 | B2 | 2/2003 | Mault et al. |
| 6,539,336 | B1 | 3/2003 | Vock et al. |
| 6,736,759 | B1 | 5/2004 | Stubbs et al. |
| 6,801,778 | B2 | 10/2004 | Koorapaty et al. |
| 6,816,782 | B1 | 11/2004 | Walters et al. |
| 6,823,036 | B1 | 11/2004 | Chen |
| 6,872,077 | B2 | 3/2005 | Yeager |
| 6,882,955 | B1 | 4/2005 | Ohlenbusch et al. |
| 7,062,225 | B2 | 6/2006 | White |
| 7,217,224 | B2 | 5/2007 | Thomas |
| 7,254,516 | B2 | 8/2007 | Case, Jr. et al. |
| 7,263,349 | B2 | 8/2007 | Sih et al. |
| 7,292,867 | B2 | 11/2007 | Werner et al. |
| 7,454,002 | B1 | 11/2008 | Gardner et al. |
| 7,480,512 | B2 | 1/2009 | Graham et al. |
| 7,645,213 | B2 | 1/2010 | Watterson et al. |
| 7,670,263 | B2 | 3/2010 | Ellis et al. |
| 7,706,815 | B2 | 4/2010 | Graham et al. |
| 7,771,320 | B2 | 8/2010 | Riley et al. |
| 7,805,149 | B2 | 9/2010 | Werner et al. |
| 7,805,150 | B2 | 9/2010 | Graham et al. |
| 7,905,815 | B2 | 3/2011 | Ellis et al. |
| 7,927,253 | B2 | 4/2011 | Vincent et al. |
| 7,931,562 | B2 | 4/2011 | Ellis et al. |
| 7,941,160 | B2 | 5/2011 | Werner et al. |
| 7,953,549 | B2 | 5/2011 | Graham et al. |
| 7,957,752 | B2 | 6/2011 | Werner et al. |
| 8,001,472 | B2 | 8/2011 | Gilley et al. |
| 8,033,959 | B2 | 10/2011 | Oleson et al. |
| 8,068,858 | B2 | 11/2011 | Werner et al. |
| 8,105,208 | B2 | 1/2012 | Oleson et al. |
| RE44,103 | E | 3/2013 | Williams |
| 8,579,767 | B2 | 11/2013 | Ellis et al. |
| 8,649,975 | B2 | 2/2014 | Nesbitt |
| 2002/0049535 | A1 | 4/2002 | Rigo et al. |
| 2002/0094776 | A1 | 7/2002 | Pulver |
| 2002/0102988 | A1 | 8/2002 | Myllymaki |
| 2002/0107433 | A1 | 8/2002 | Mault |
| 2002/0193107 | A1 | 12/2002 | Nascimento |
| 2002/0198612 | A1 | 12/2002 | Smith et al. |
| 2003/0091964 | A1 | 5/2003 | Yeager |
| 2003/0100315 | A1 | 5/2003 | Rankin |
| 2003/0191578 | A1 | 10/2003 | Paulauskas et al. |
| 2003/0224337 | A1 | 12/2003 | Shum et al. |
| 2004/0046692 | A1 | 3/2004 | Robson et al. |
| 2004/0102931 | A1 | 5/2004 | Ellis et al. |
| 2004/0171956 | A1 | 9/2004 | Babashan |
| 2004/0185870 | A1 | 9/2004 | Matsuda |
| 2004/0193415 | A1 | 9/2004 | Chaudhari et al. |
| 2004/0203789 | A1 | 10/2004 | Hammond et al. |
| 2004/0203873 | A1 | 10/2004 | Gray |
| 2005/0096933 | A1 | 5/2005 | Collins, III et al. |
| 2005/0172311 | A1 | 8/2005 | Hjelt et al. |
| 2005/0181347 | A1 | 8/2005 | Barnes et al. |
| 2005/0195094 | A1 | 9/2005 | White |
| 2005/0197063 | A1 | 9/2005 | White |
| 2005/0250458 | A1* | 11/2005 | Graham ............... G06Q 50/12 455/121 |
| 2005/0287499 | A1 | 12/2005 | Yeager |
| 2006/0064277 | A1 | 3/2006 | Jung et al. |
| 2006/0082472 | A1 | 4/2006 | Adachi et al. |
| 2006/0156356 | A1 | 7/2006 | Sato et al. |
| 2006/0176216 | A1 | 8/2006 | Hipskind |
| 2006/0178809 | A1 | 8/2006 | Couckuyt et al. |
| 2006/0189360 | A1 | 8/2006 | White |
| 2006/0205564 | A1 | 9/2006 | Peterson |
| 2006/0217877 | A1 | 9/2006 | Bodin et al. |
| 2006/0240865 | A1 | 10/2006 | White |
| 2007/0287596 | A1 | 12/2007 | Case et al. |
| 2008/0051993 | A1 | 2/2008 | Graham et al. |
| 2008/0059064 | A1 | 3/2008 | Werner et al. |
| 2008/0077620 | A1 | 3/2008 | Gilley et al. |
| 2008/0082254 | A1 | 4/2008 | Huhtala et al. |
| 2008/0096726 | A1 | 4/2008 | Riley et al. |
| 2008/0109158 | A1* | 5/2008 | Huhtala ............ A63B 24/0062 701/439 |
| 2008/0319661 | A1 | 12/2008 | Werner et al. |
| 2009/0047645 | A1 | 2/2009 | Dibenedetto et al. |
| 2009/0048044 | A1 | 2/2009 | Oleson et al. |
| 2009/0048070 | A1 | 2/2009 | Vincent et al. |
| 2009/0144639 | A1 | 6/2009 | Nims et al. |
| 2009/0233770 | A1 | 9/2009 | Vincent et al. |
| 2009/0291726 | A1 | 11/2009 | Svensson |
| 2010/0042427 | A1 | 2/2010 | Graham et al. |

(56) References Cited

U.S. PATENT DOCUMENTS

2010/0062818 A1 3/2010 Haughay, Jr. et al.
2010/0292600 A1 11/2010 DiBenedetto et al.

FOREIGN PATENT DOCUMENTS

WO WO 2005/087323 A2 9/2005
WO WO 2008/105651 A1 9/2008

OTHER PUBLICATIONS

Magellan Trailblazer GPS Satellite Navigator Reference Guide, Magellan System Corporation, San Dimas CA, 78 pages, 1995.
GPS II, Owner's Manual & Reference, 108 pages, Aug. 1996, Garmin Corp., Olathe, KS, USA.
GPS III, Owner's Manual & Reference, 100 pages, Aug. 1997, Garmin Corp., Olathe, KS, USA.
Redin, Maria S., "Marathon Man," Thesis, Department of Electrical Engineering and Computer Science, Massachusetts Institute of Technology (Jun. 15, 1998), 57 pages.
Sawhney et al., "Speaking and listening on the run: Design for wearable audio computing". IEEE International Symposium on Wearable Computing, Oct. 19-20, 1998, Pittsburgh, PA, USA.
HP 620LX/660LX Palmtop User Guide, Hewlett-Packard Co. (1998), 172 pages.
Nokia 6120: Owner's Manual, Nokia Mobile Phones, Inc., Tampa (1998), 93 pages.
GPS II Plus: Owner's Manual & Reference, Garmin Corporation, Taiwan (Feb. 1999), 112 pages.
Mehaffey et al., "Garmin's NavTalk Cell Phone and Road Map GPS Product Review", 5 pages, Nov. 2, 1999.
NavTalk™ Cellular Phone/GPS Receiver, Owner's Manual and Reference Guide, 128 pages, 1999-2000, Garmin Int'l Inc., Olathe, KS, USA.
Adler, Ari T., "A Cost-Effective Portable Telemedicine Kit for Use in Developing Countries," Thesis, Department of Mechanical Engineering, Massachusetts Institute of Technology, Cambridge (2000), 95 pages.
Almer et al., 3D-Visualisation of Leisure & Tourism Information Based on Remote Sensing Data, 8 pgs., Int'l Archives of Photogrammetry and Remote Sensing, vol. XXXIII, Suppl. B5, Amsterdam 2000.
Satava et al., "The Physiologic Cipher at Altitude: Telemedicine and Real-Time Monitoring of Climbers on Mount Everest," Telemedicine Journal and e-Health, vol. 6, No. 3 (2000), 11 pages.
ETrex Summit Personal Navigator: Owner's Manual and Reference Guide, Garmin International, Inc., Kansas (Feb. 2001), 73 pages.
Benefon ESC! Owner's Manual, Benefon Oyj, Finland (2001), 169 pages.
Garmin NavTalk GSM, product information, 6 pages, 2002.
Garmin, "NavTalk GSM Phone/GPS: Owner's Manuel and Reference Guide" (Copyright 2002), 130 pages.
J. Hjelm, Selected pages from "Creating Location Services for the Web" (Copyright 2002), 9 pages.

Defendant MapMyFitness, Inc.'s Supplemental Objections and Responses to Plaintiffs' First Set of Interrogatories (Nos. 6, 7, 10), *adidas AG and adidas America, Inc. v. Under Armour, Inc. and MapMyFitness, Inc.*, Civil Action No. 14-130-GMS, filed Sep. 18, 2014, 10 pages.
Defendant Under Armour, Inc.'s Supplemental Objections and Responses to Plaintiffs' First Set of Interrogatories (Nos. 6, 7, 10), *adidas AG and adidas America, Inc. v. Under Armour, Inc. and MapMyFitness, Inc.*, Civil Action No. 14-130-GMS, filed Sep. 18, 2014, 10 pages.
Information about Quokka Sports from The Free Library, Inventing Interactive and Microsoft News Center as provided by Defendants in *adidas AG and adidas America, Inc. v. Under Armour, Inc. and MapMyFitness, Inc.*, 1:2014-cv-00130 (D. Del.), 14 pages.
Screenshot from MapQuest.com via the Way Back Machine and "How it Works; Online Maps for Here, There and Everywhere" from The New York Times as provided by Defendants in *adidas AG and adidas America, Inc. v. Under Armour, Inc. and MapMyFitness, Inc.*, 1:2014-cv-00130 (D. Del.), 4 pages.
Screenshots from AustinExplorer.com via the Way Back Machine as provided by Defendants in *adidas AG and adidas America, Inc. v. Under Armour, Inc. and MapMyFitness, Inc.*, 1:2014-cv-00130 (D. Del.), 19 pages.
Screenshots from GPS-Tour.info via the Way Back Machine as provided by Defendants in *adidas AG and adidas America, Inc. v. Under Armour, Inc. and MapMyFitness, Inc.*, 1:2014-cv-00130 (D. Del.), 25 pages.
Screenshots from LocalHikes.com via the Way Back Machine as provided by Defendants in *adidas AG and adidas America, Inc. v. Under Armour, Inc. and MapMyFitness, Inc.*, 1:2014-cv-00130 (D. Del.), 12 pages.
Screenshots from Palmtop.nl and My2Cents.info via the Way Back Machine and TomTom Maps-on-Line Information from PocketGPSWorld.com as provided by Defendants in *adidas AG and adidas America, Inc. v. Under Armour, Inc. and MapMyFitness, Inc.*, 1:2014-cv-00130 (D. Del.), 24 pages.
J. Nieminen, Declaration of Jukka Nieminen (Feb. 4, 2015), Reexamination Control No. 90/020,093 of U.S. Pat. No. 7,292,867.
Revised Joint Claim Construction Statement, *Adidas AG and Adidas America, Inc. v. Under Armour, Inc. and MapMyFitness, Inc.*, Civil Action No. 14-130-GMS (N.D. Del.), filed Mar. 2, 2015.
Second Revised Joint Claim Construction Statement, *adidas AG and adidas America, Inc. v. Under Armour, Inc. and MapMyFitness, Inc.*, Civil Action No. 14-130-GMS, filed Apr. 6, 2015, 12 pages.
Order Construing the Terms of U.S. Patent Nos. 7,957,752; 8,244,226; 8,068,858; 7,905,815; 7,931,562; 8,652,009; 8,725,276; 8,579,767; 8,721,502, *adidas AG and adidas America, Inc. v. Under Armour, Inc. and MapMyFitness, Inc.*, Civil Action No. 14-130-GMS, filed Jun. 15, 2015, 6 pages.
Office Action from the Japanese Patent Office dated May 31, 2016 with an English translation, 10 pages.
Office Action dated Sep. 15, 2016, issued in European Patent Application.
Office Action dated Nov. 15, 2016, issued in Japanese Patent Application No. 2015-075804, 5 pages.

\* cited by examiner

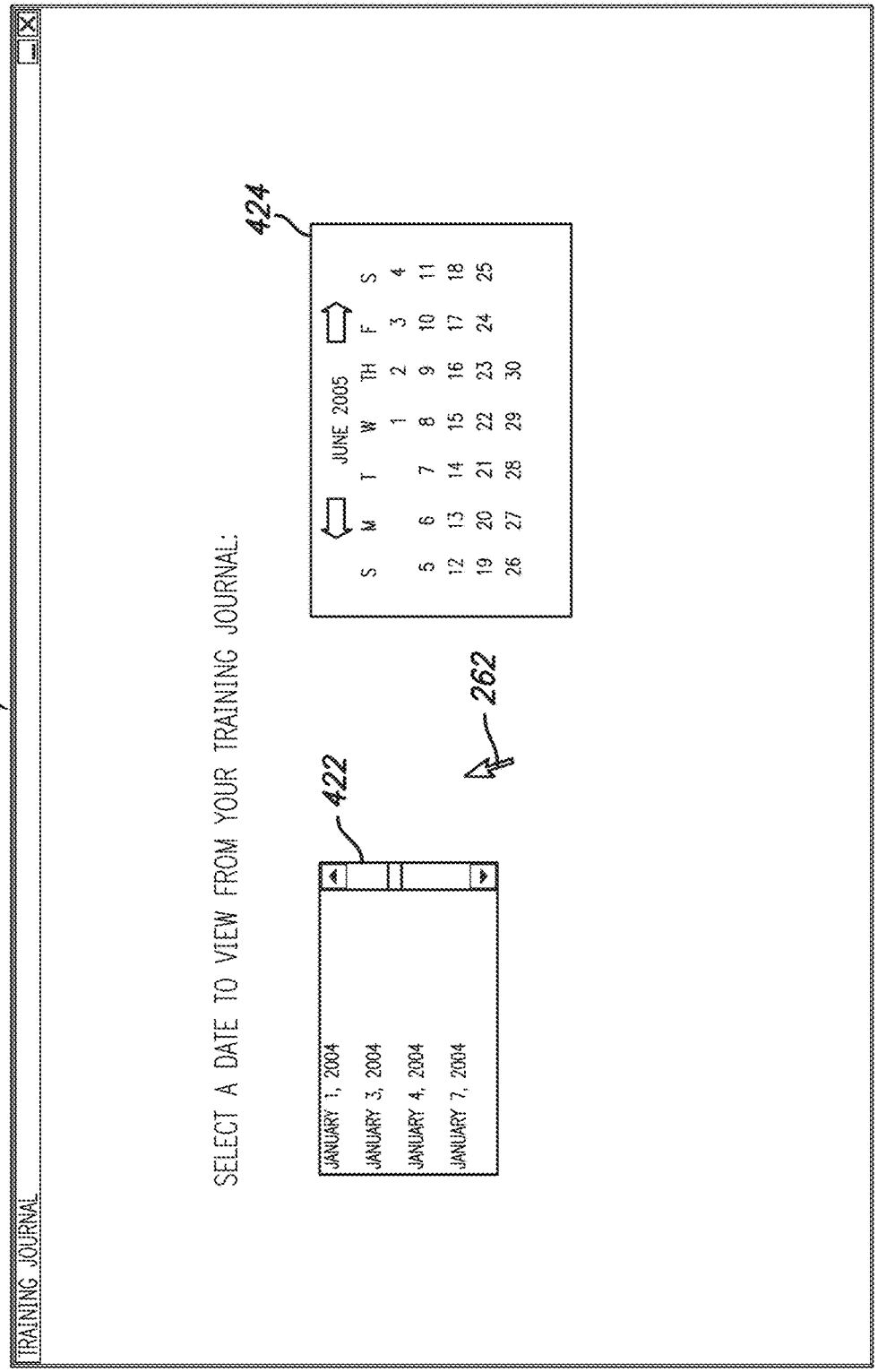

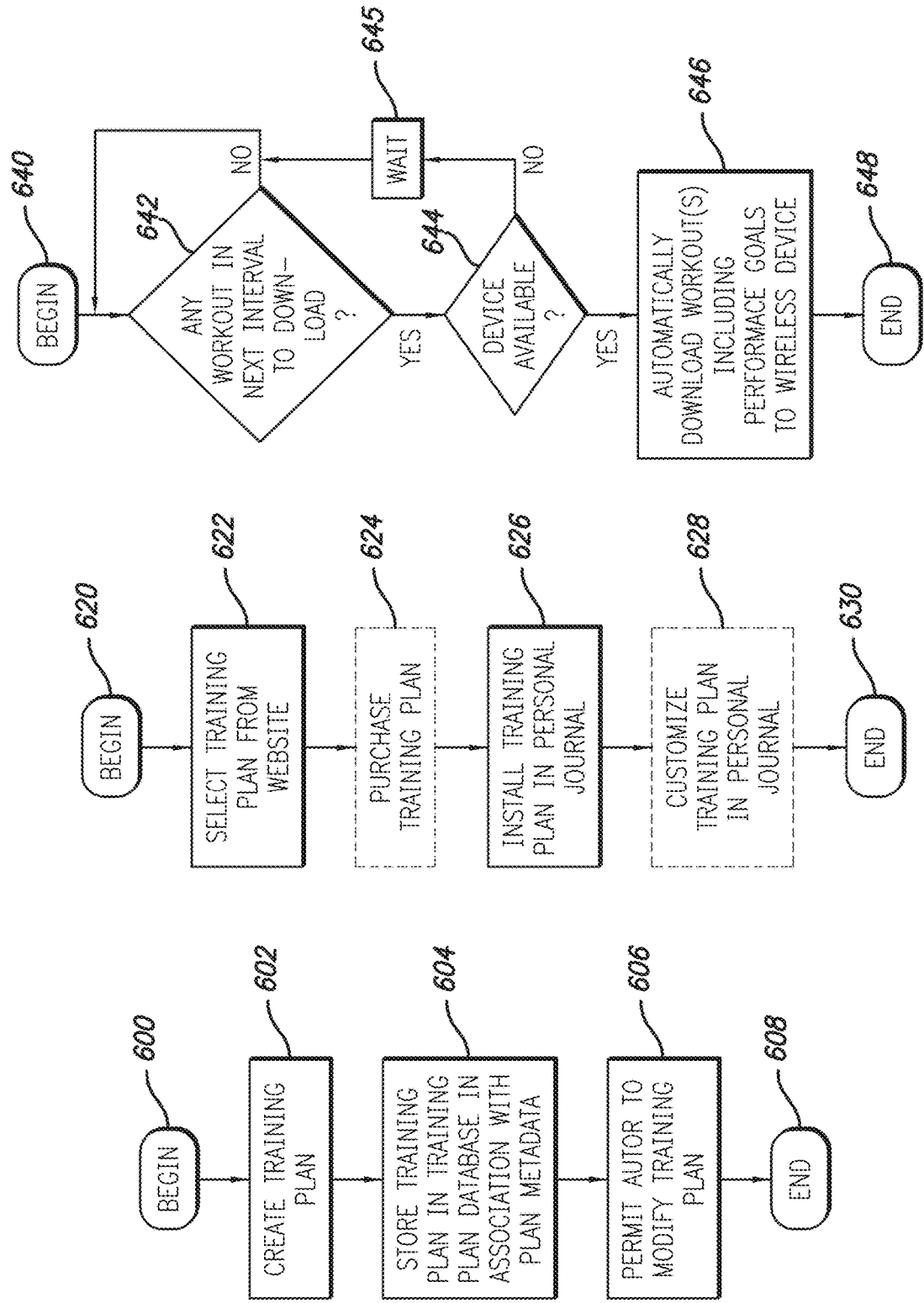

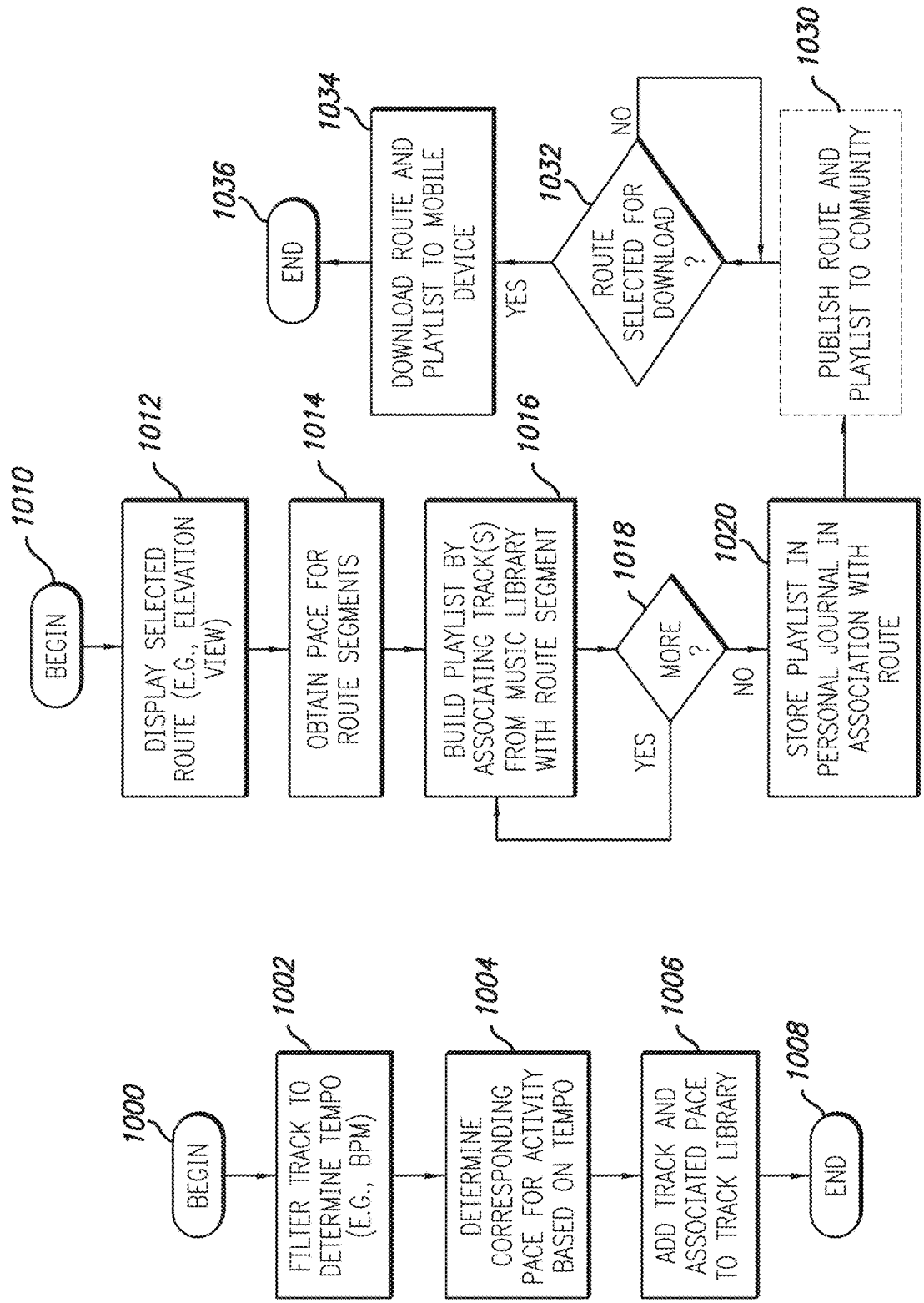

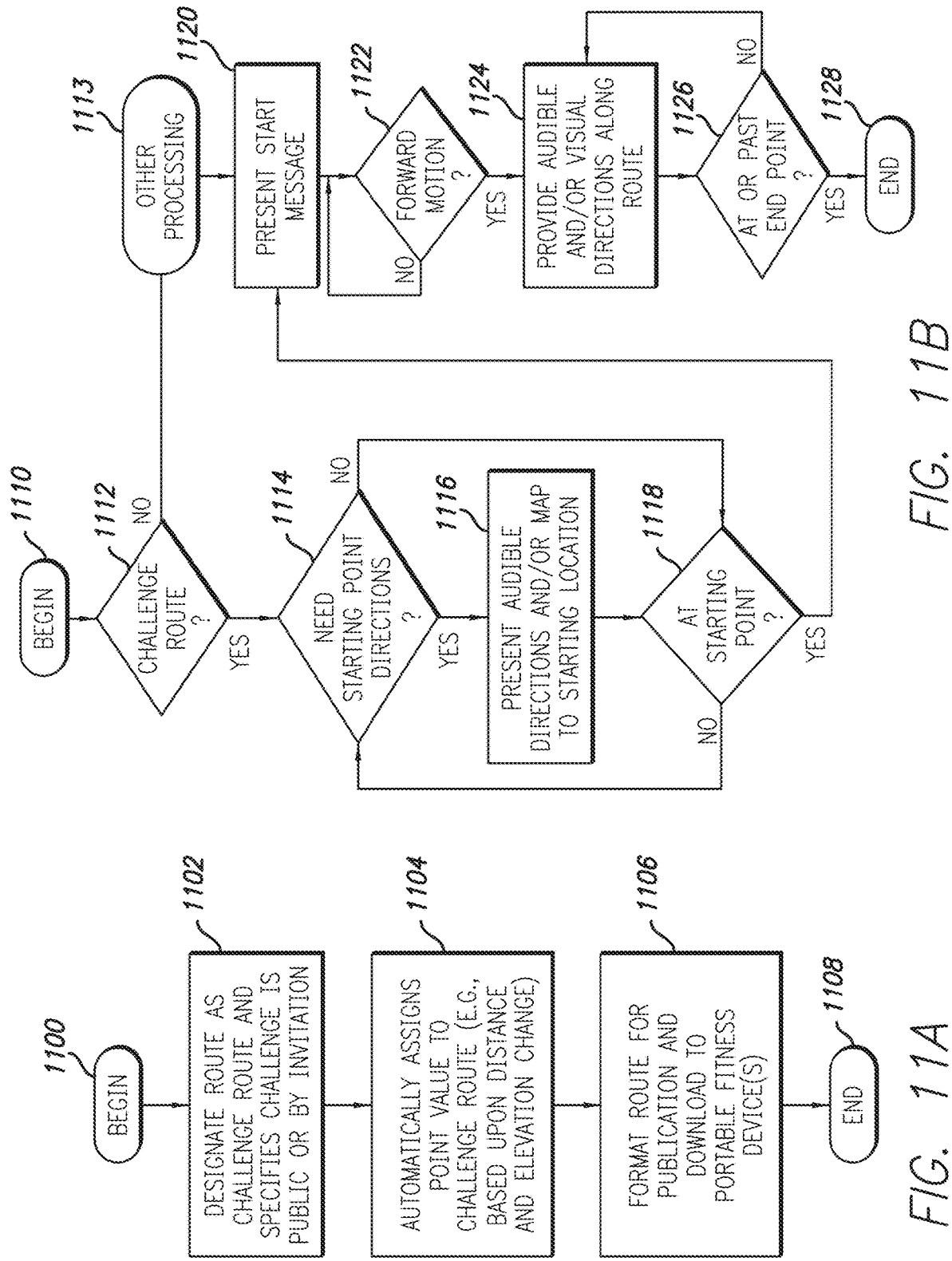

PROGRAM PRODUCTS, METHODS, AND SYSTEMS FOR PROVIDING LOCATION-AWARE FITNESS MONITORING SERVICES

PRIORITY CLAIM AND CROSS-REFERENCE TO RELATED APPLICATIONS

The present application claims priority to U.S. patent application Ser. No. 15/216,266, filed Jul. 21, 2016, which is a continuation of U.S. patent application Ser. No. 12/569,492, filed Sep. 29, 2009, now U.S. Pat. No. 9,409,052, issued Aug. 9, 2016, which claims the benefit of U.S. Provisional Patent App. No. 61/102,623, filed Oct. 3, 2008. These applications are incorporated herein by reference in their entirety.

FIELD OF THE INVENTION

Embodiments of the present invention generally relate to location-aware fitness monitoring services. More particularly, embodiments of the present invention relate to program products, methods, and systems for providing location-aware fitness monitoring services.

BACKGROUND OF THE INVENTION

Exercise is important to maintaining a healthy lifestyle and individual well-being. Accordingly, many individuals want to participate in an exercise program. The most successful exercise programs are ones tailored to a fitness level of an individual and aimed at assisting the individual to achieve one or more specific fitness or exercise goals.

Sports trainers, as well as other exercise and fitness professionals, are available to assist individuals in developing exercise programs appropriate for their individual fitness levels and their specific fitness or exercise goals. Hiring such professionals, however, can be expensive. Furthermore, the busy schedules of many individuals make it difficult for these individuals to set aside time to meet with an exercise and fitness professional on a routine basis. Thus, many individuals forego using the services of exercise and fitness professionals, and they never achieve the benefits that can be obtained from an exercise program tailored, for example, to one's fitness level.

Technology has resulted in the development of portable fitness monitoring devices capable of providing performance feedback to the individual during a physical activity. Some portable fitness monitoring devices are capable of transferring performance information obtained from an athlete during a workout to a remote computer for further analysis. These systems often provide a user interface on the portable fitness monitoring device and/or at the remote computer that allows the athlete or a third party user to review the athlete's past performance data.

As satellite navigational technology, such as Global Positioning System (GPS) technology, has matured, location-aware electronics have been integrated into a number of different mobile platforms, such as automobiles, mobile telephones, two-way radios, and hand-held GPS receivers, in order to provide location information.

Portable and/or wireless electronic devices have also been developed or adapted for use in various commercial, personal or leisure activities to assist people in performing the activity and/or to enhance the enjoyment and/or efficiency of the activity. Such electronic devices may or may not be GPS-enabled.

What is needed are improved program products, methods, and systems for providing location-aware fitness monitoring services that will allow athletes to, among other things, stay motivated during their fitness activities, obtain more accurate location-based fitness information, receive substantially real-time location-based output, and/or compete in substantially real-time and/or time-shifted challenge races.

SUMMARY OF THE INVENTION

Embodiments of the present invention relate to a method of displaying a route traversed by an athlete equipped with a location-aware portable fitness monitoring device including the steps of (a) receiving data describing a plurality of satellite navigational system waypoints that are acquired as the athlete engages in a fitness activity, (b) identifying a map area based on a location indicated by the data describing the plurality of satellite navigational system waypoints, (c) determining the route traversed by the athlete based on the data describing the plurality of satellite navigational system waypoints and based on the location of one or more known paths associated with the map area, and (d) displaying the route traversed by the athlete on top of the map area.

Embodiments of the present invention also relate to a method of displaying a route traversed by an athlete equipped with a location-aware portable fitness monitoring device including the steps of (a) receiving data describing a plurality of satellite navigational system waypoints that are acquired as the athlete engages in a fitness activity, (b) identifying a map area based on a location indicated by the data describing the plurality of satellite navigational system waypoints, (c) determining the route traversed by the athlete based on the data describing the plurality of satellite navigational system waypoints by (i) comparing the locations indicated by the data describing the plurality of satellite navigational system waypoints to the locations of points along the one or more known paths associated with the map area and (ii) comparing the locations indicated by the data describing the plurality of satellite navigational system waypoints to the locations of points along the one or more known routes previously traversed, and (d) displaying the route traversed by the athlete on top of the map area.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention by way of example, and not by way of limitation, and, together with the description, further serve to explain the principles of the invention and to enable a person skilled in the pertinent art to make and use the invention.

FIG. 5A illustrates an exemplary graphical user interface of a training journal through which a user may view routes traversed with a portable fitness monitoring device in accordance with an embodiment of the present invention;

FIG. 6A is a high level logical flowchart of an exemplary method of authoring a training plan in accordance with an embodiment of the present invention;

FIG. 6B is a high level logical flowchart of an exemplary method of installing a training plan into a training journal in accordance with an embodiment of the present invention;

FIG. 6C is a high level logical flowchart of an exemplary method of automatically downloading one or more workouts within a training plan to a portable fitness monitoring device in accordance with an embodiment of the present invention;

FIG. 10A is a high level logical flowchart of an exemplary method of pre-processing an audio track to determine a corresponding pace in accordance with an embodiment of the present invention;

FIG. 10B is a high level logical flowchart of an exemplary method of constructing a user playlist in accordance with an embodiment of the present invention;

FIG. 11A is a high level logical flowchart of an exemplary method of publishing a challenge route to a user community in accordance with an embodiment of the present invention;

FIG. 11B is a high level logical flowchart of an exemplary method of staging the traversal of a challenge route in accordance with an embodiment of the present invention;

Figure 12A:
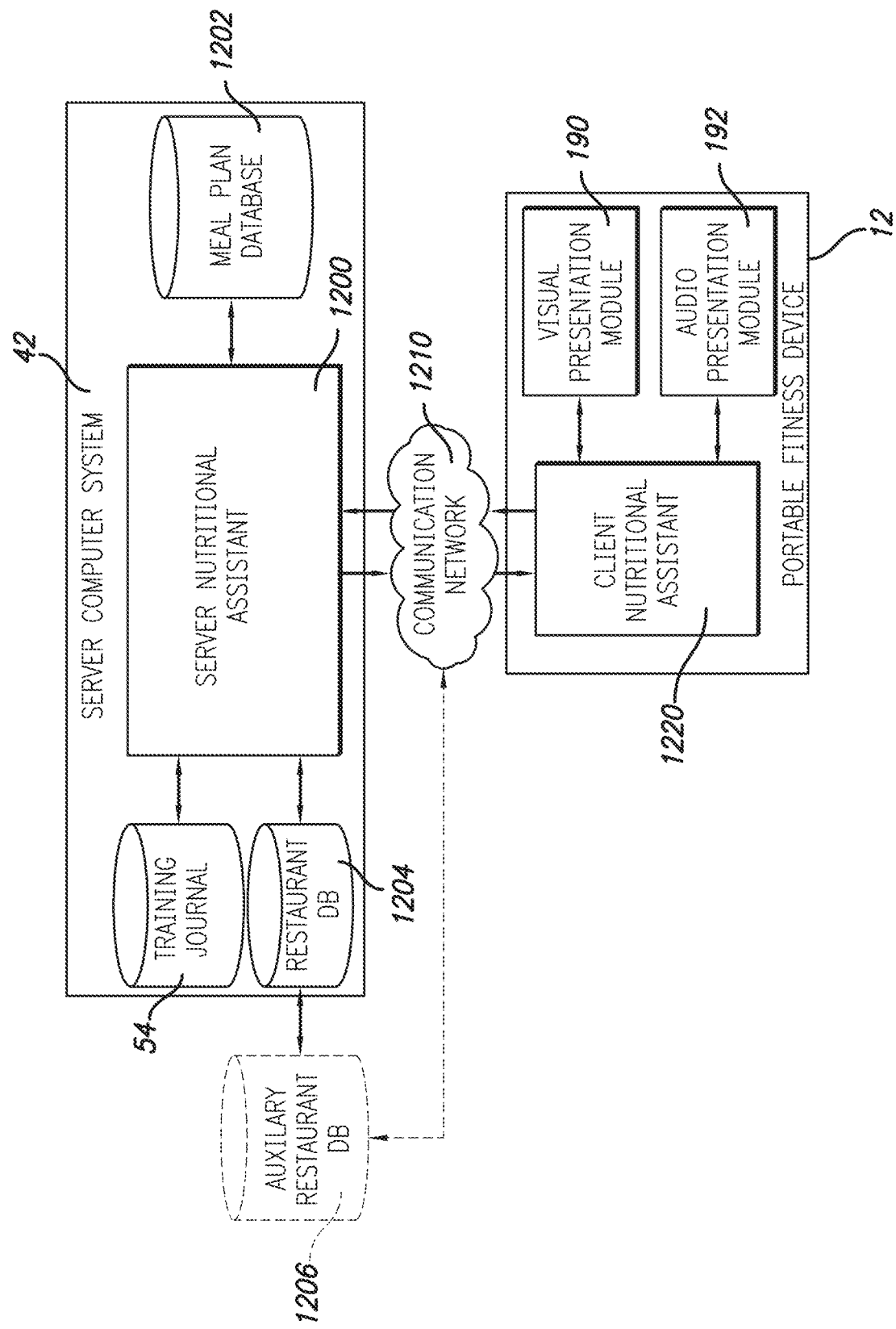
FIG. 12A is a high level block diagram of a system architecture that provides nutritional guidance to an athlete in accordance with an embodiment of the present invention.
Figure 12C:
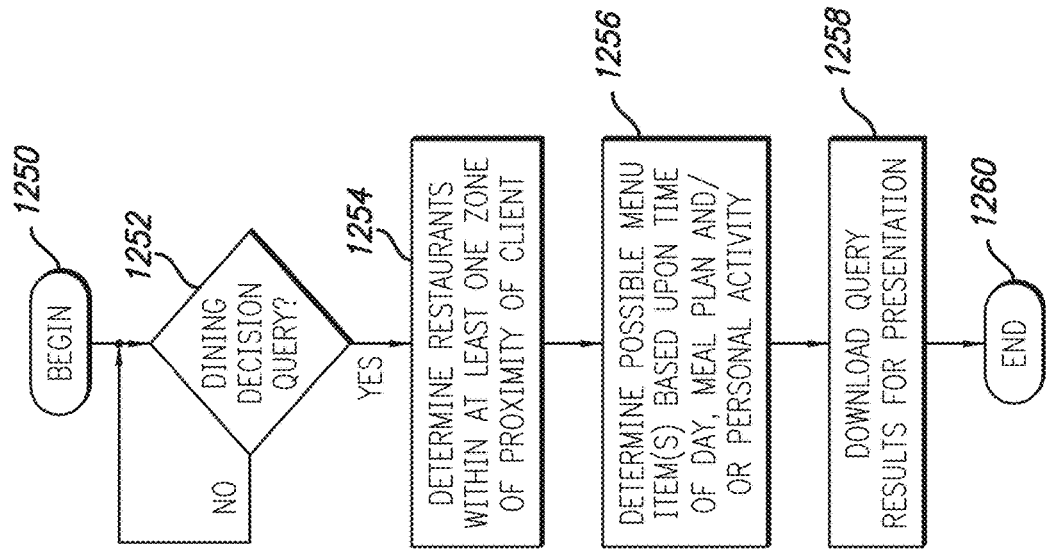
Figure 12B:
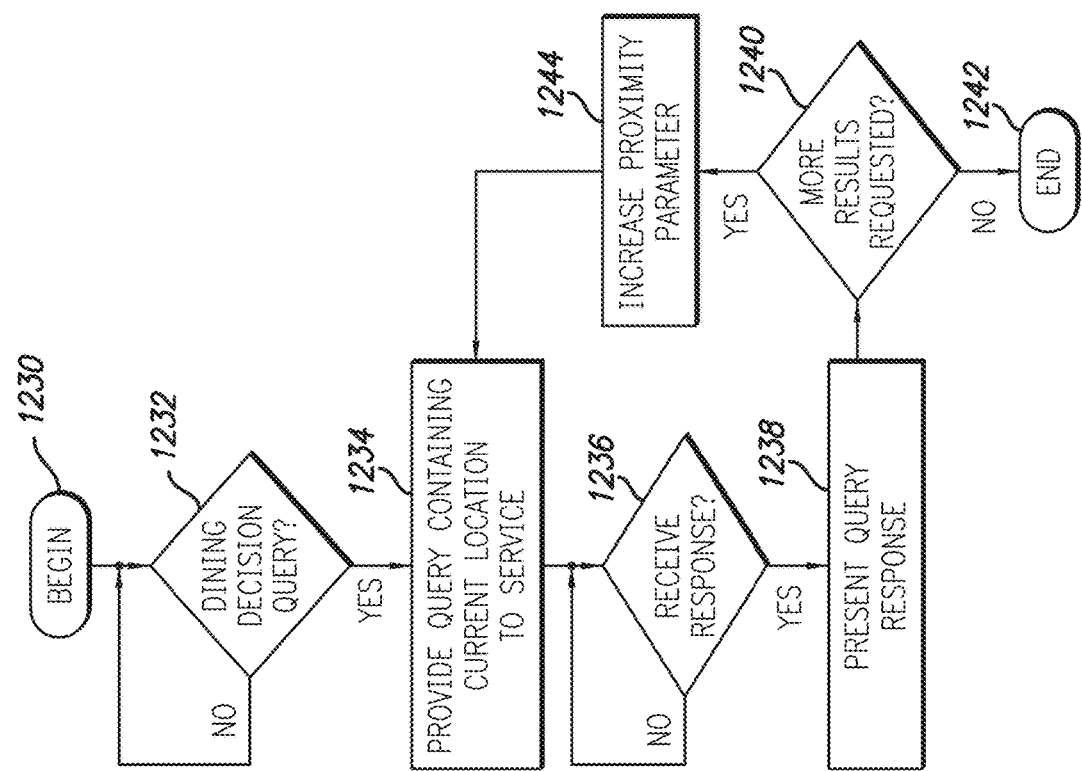

FIG. 12B is a high level logical flowchart of an exemplary method by which a portable fitness monitoring device queries a service for nutritional guidance in accordance with an embodiment of the present invention; and FIG. 12C is a high level logical flowchart of an exemplary method by which a server device responds to a query for nutritional guidance in accordance with an embodiment of the present invention.

DETAILED DESCRIPTION OF THE INVENTION

The present invention will now be described in detail with reference to embodiments thereof as illustrated in the accompanying drawings. References to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1:
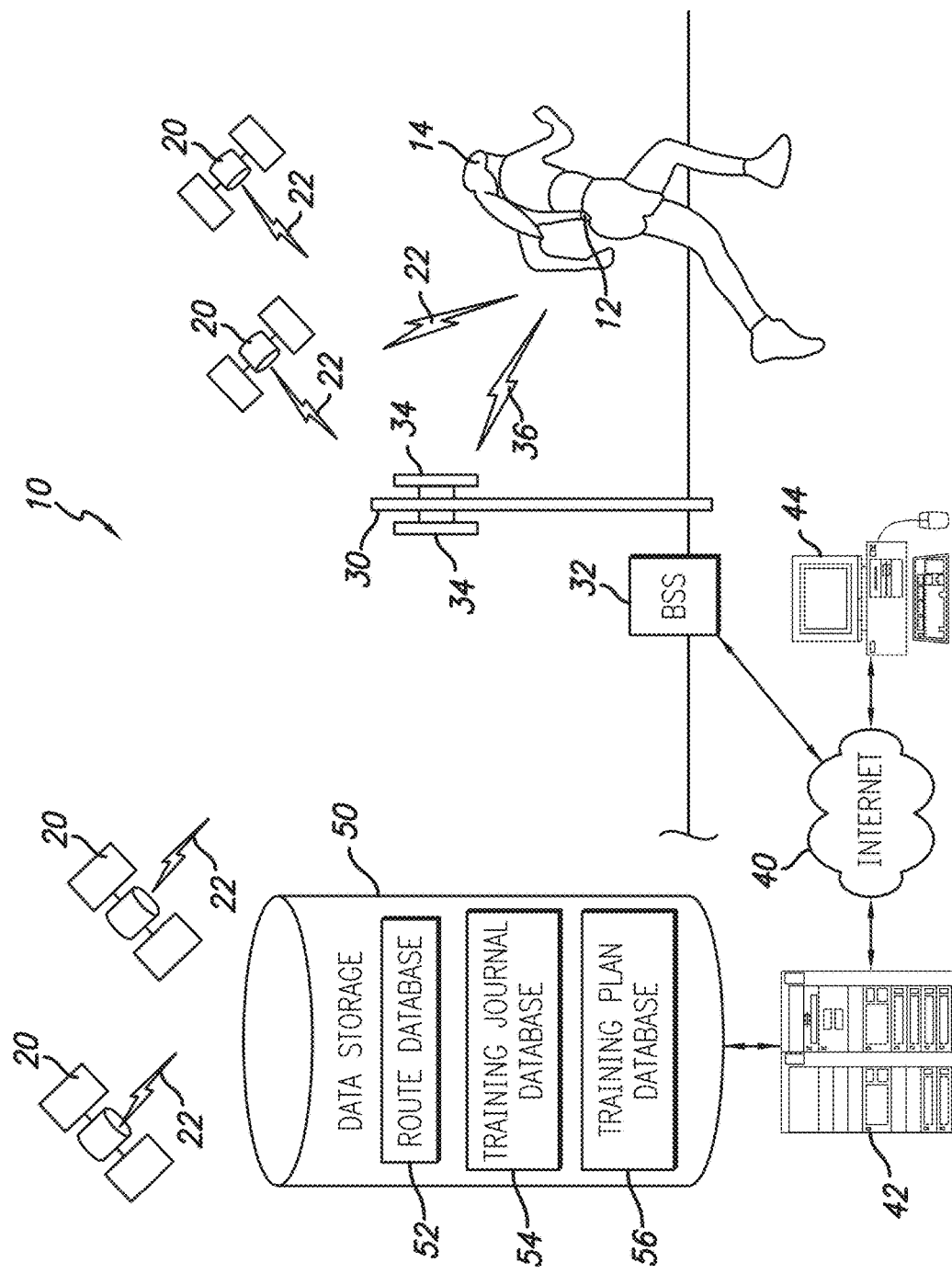
FIG. 1 is a schematic diagram of an exemplary environment in which an embodiment of the present invention may be practiced.

With reference now to the figures, and in particular with reference to FIG. 1, there is depicted an exemplary embodiment of an environment in which the methods, systems, and program products of the present invention may advantageously be practiced. In particular, FIG. 1 illustrates an environment 10 in which a location-aware portable fitness monitoring device 12 is utilized by an athlete 14 while engaged in a fitness activity including, but not limited to, running, walking, cycling, hiking, climbing, skating, swimming, skiing, performing aerobic exercises, weight lifting, or participating in various individual or team sports.

The term "athlete" is used herein to refer to a person who is presently, was previously, or in the future will conduct a monitored fitness activity. The term "user" is used herein more broadly to include the athlete 14 or another third party (such as, for example, a competitor athlete, a coach, a trainer, an event organizer, a spectator, or a friend), either of whom may interact with the system of the present invention in real-time, before, and/or after the monitored fitness activity has been completed by the athlete.

As shown in FIG. 1, environment 10 includes a constellation of earth-orbiting navigation satellites 20. In one embodiment of the present invention, the navigation satellites may be Global Positioning System (GPS) satellites 20. As is known in the art, GPS satellites 20 continuously emit GPS signals 22, which enable GPS-equipped devices, such as portable fitness monitoring device 12, to continuously determine their position, velocity, bearing and elevation as long as a sufficient number of GPS satellites 20 can be acquired. In other embodiments of the present invention, other global or regional satellite navigational systems besides GPS may be employed such as the European Union's Galileo system, Russia's GLONASS system, China's Compass system, or any other known or future developed satellite navigational systems.

In one embodiment, environment 10 further includes a wireless wide-area network (WAN) communication system including a plurality of geographically distributed communication towers 30 and base station systems (BSS) 32 (only one of each is illustrated for simplicity). Communication tower 30 may include one or more antennae 34 supporting long range two-way radio frequency communication wireless devices, such as portable fitness monitoring device 12. The radio frequency communication between antennae 34 and portable fitness monitoring device 12 may utilize radio frequency signals 36 conforming to any known or future developed wireless protocol, for example, CDMA, GSM, EDGE, 3G, IEEE 802.x (e.g., IEEE 802.16 (WiMAX)), etc. The information transmitted over-the-air by BSS 32 and cellular communication tower 30 to portable fitness monitoring device 12 may be further transmitted to or received from one or more additional circuit-switched or packet-switched communication networks, including, for example, the Internet 40.

As is well known to those skilled in the art, Internet 40 is a worldwide collection of servers, routers, switches and transmission lines that employ the Internet Protocol (IP) to communicate data. For example, Internet 40 may be employed to communicate data between a server computer system 42 and a client computer system 44, such as, for example, portable fitness monitoring device 12 or any other portable or stationary client computer system. For example, as described further below, Internet 40 may be utilized to communicate to portable fitness monitoring device 12 route information from a route database 52 stored within data storage 50 associated with server computer system 42. Similarly, portable fitness monitoring device 12 may transmit route and performance information to server computer system 42 for storage in training journal database 54 via Internet 40, BSS 32, and communication tower 30. In addition, a user utilizing a remote client computer system 44, for example, athlete 14, a competitor athlete, a coach, a trainer, an event organizer, a spectator, a friend, or other user, may access real-time or historical performance information regarding the training of athlete 14 via server computer system 42 and Internet 40.

The term "remote client computer system" may be used herein to refer to a remotely located stationary client computer system, such as a desktop computer, or a remotely located mobile client computer system, such as, for example, a laptop computer, a mobile phone, a personal digital assistant, or a dedicated portable fitness monitoring device.

Furthermore, the individual portable fitness monitoring devices 12 of athlete 14 and one or more other competitor athletes may communicate with one another. Such communication may occur in substantially real-time, before, or after the athletes's fitness activities are complete. Communication may occur, for example, via a WAN and the Internet 40, as described above.

Figure 2A:
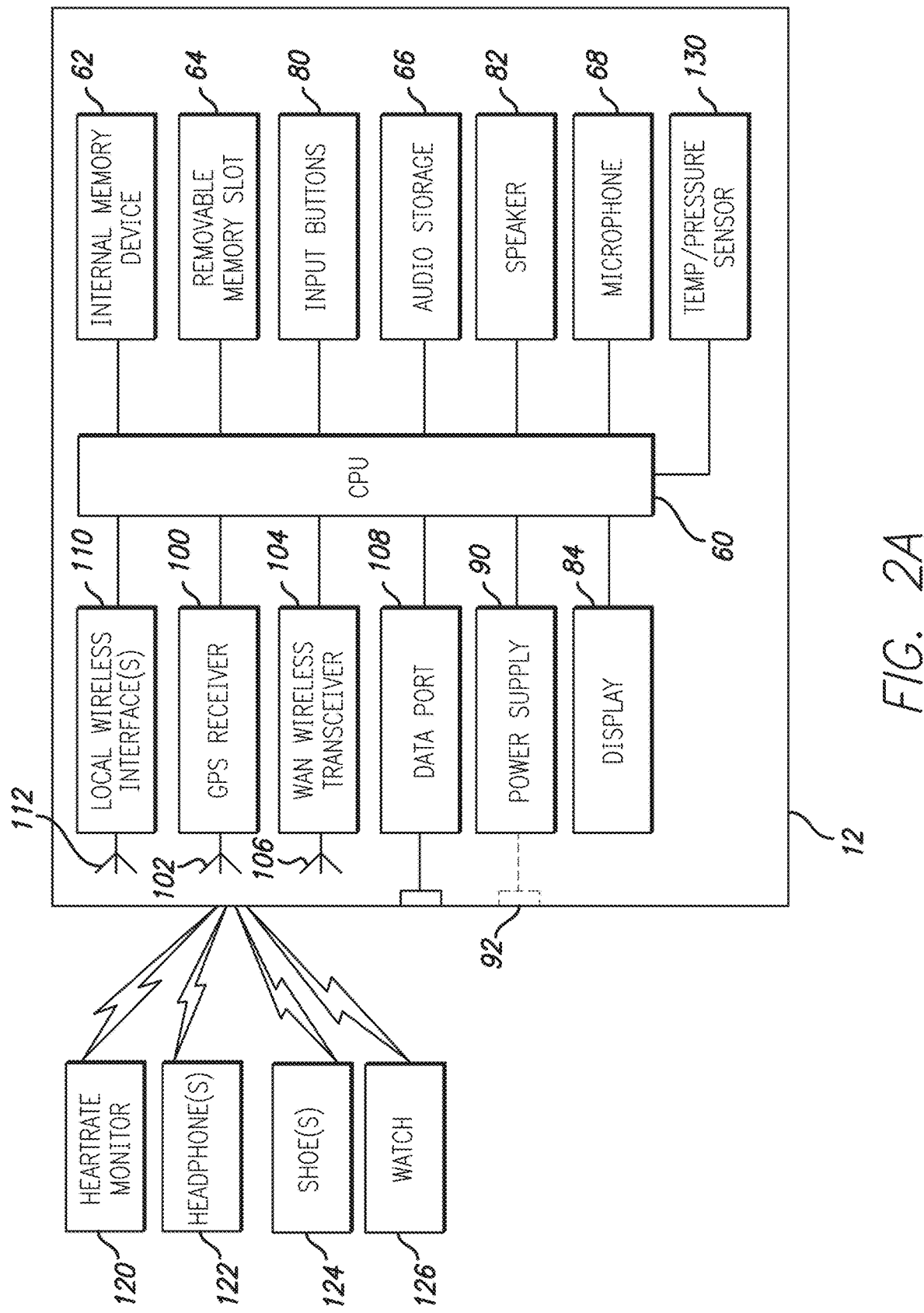
FIG. 2A is a block diagram of an illustrative portable fitness monitoring device in accordance with an embodiment of the present invention.

Referring now to FIG. 2A, there is illustrated a high-level block diagram of an exemplary implementation of portable fitness monitoring device 12 in accordance with the present invention. As illustrated, portable fitness monitoring device 12 includes a central processing unit (CPU) 60 that controls the operation of portable fitness monitoring device 12 in accordance with client software 154 described further below with respect to FIG. 2B. As shown, CPU 60 is coupled, either directly or indirectly, to a variety of different components within portable fitness monitoring device 12. For example, portable fitness monitoring device 12 includes an internal memory device 62 for storing the client software, as well as various route, performance and environmental information regarding a training activity of athlete 14. The storage provided by internal memory device 62 may be further augmented by a removable storage medium inserted within removable memory slot 64 and/or dedicated audio storage 66 for storing audio data. The audio data may include, for example, music tracks encoded in MP3 format, synthesized human speech tracks, voice tracks recorded by the athlete 14, a competitor athlete, a coach, a trainer, an event organizer, a spectator, a friend, or another user, voice annotations by athlete 14 recorded during the fitness activity via an internal or external microphone 68, as well as other audio data.

In addition to microphone 68, portable fitness monitoring device 12 may include a number of other input/output (I/O)

devices. For example, portable fitness monitoring device 12 may include one or more manually manipulable input buttons 80 that permit athlete 14 to start and stop recording of GPS data, annotate a route while athlete 14 is traversing the route, and/or to enter desired settings of portable fitness monitoring device 12. Portable fitness monitoring device 12 may also include a speaker 82 and display 84 through which portable fitness monitoring device 12 may present real-time performance information (e.g., elapsed distance, elapsed time, pace, distance to go, heart rate, etc.), turn-by-turn directions, real-time remote training recommendations, motivational content, point-of-interest information, challenge race announcements (discussed further below), maps, and other information in audio and/or visual format.

In one embodiment, portable fitness monitoring device 12 is equipped with a power supply 90 that powers CPU 60 and the other components of portable fitness monitoring device 12. Power supply 90 includes a battery and may further have an associated power port 92 through which the battery may be charged from an AC power source. Alternatively, the battery within power supply 90 may be charged utilizing a wireless inductive charging device, as is known in the art.

In one embodiment, portable fitness monitoring device 12 further includes a GPS receiver 100 and associated GPS antenna 102 that receive GPS signals 22 from GPS satellites 20. GPS receiver 100 processes GPS signals 22 to present to CPU 60 time-stamped waypoints, which include at least a time, a latitude, and a longitude. If at least four GPS satellites 20 have been acquired, the time-stamped waypoints presented to CPU 60 by GPS receiver 100 preferably further include an elevation. As discussed further below, the time and position information supplied by GPS receiver 100 is utilized by client software 154 running on CPU 60 to build a record of a route traversed by athlete 14 and to determine performance information (e.g., elapsed distance, elapsed time, pace, distance to go, heart rate, etc.) regarding the athlete's traversal of the route.

Portable fitness monitoring device 12 may support two-way wireless WAN communication with communication tower 30 with WAN transceiver 104 and its associated antenna 106. As known to those skilled in the art, WAN transceiver 104 includes a receiver for receiving radio frequency signals 36 and a transmitter for transmitting radio frequency signals 36. As discussed in greater detail below, radio frequency signals 36 may include route information transmitted to portable fitness monitoring device 12, route and performance information transmitted from portable fitness monitoring device 12, settings for portable fitness monitoring device 12, and one or two-way voice communication (e.g., a voice conversation between athlete 14 and a competitor athlete, a remote coach, a trainer, an event organizer, a spectator, or a friend, any of whom may or may not be utilizing a remote client computer 44). The data sent and received by WAN transceiver 104 may alternatively be communicated via an optional data port 108, which may employ short range wired or wireless communication (e.g., RS-232 or infrared).

In order to support communication with other electronics within close range, portable fitness monitoring device 12 may be further equipped with one or more local wireless interface(s) 110 and associated antennae 112. For example, local wireless interface(s) may include interfaces for 802.11x, Bluetooth, 900 mHz communication or the like. Utilizing such technologies, portable fitness monitoring device 12 may communicate with or sense data from a heart rate monitor 120, headphones 122, shoes 124, and a watch 126 worn by athlete 14 during a fitness activity. In this manner, portable fitness monitoring device 12 may gather information regarding athlete 14, such as his/her heart rate and body temperature, and if the athlete's shoes 124 are equipped with an RFID tag, the shoes 124 worn during the fitness activity. Portable fitness monitoring device 12 may similarly present to the athlete 14 performance, directional and training information, motivational content, point-of-interest information, and challenge race announcements (discussed further below) via watch 126 and/or headphones 122.

Of course, in alternative embodiments, portable fitness monitoring device 12 may sense or communicate with particular devices utilizing wired or wireless interfaces. For example, microphone 68 may alternatively be incorporated within wireless headphones 122, and heart rate monitor 120 may alternatively be coupled to CPU 60 via a wired interface. Thus, those skilled in the art will appreciate from the block diagram provided in FIG. 2A, that any number of internal or external devices and sensors, such as temperature and barometric pressure sensor 130, may be coupled to CPU 60 via either wired or wireless interfaces. In this manner, client software running on CPU 60 may associate with the time and position information provided by GPS receiver 100 various data of interest regarding athlete 14, his/her environment and the route being traversed. The data may be stored locally by portable fitness monitoring device 12, for example, within internal memory device 62, or transmitted over-the-air by WAN transceiver 104, possibly in real time.

It will further be appreciated that portable fitness monitoring device 12 may be implemented as a special purpose device or may alternatively be realized on a conventional portable device platform, such as a mobile telephone, MP3 player, digital camera, PDA, etc.

Figure 2B:
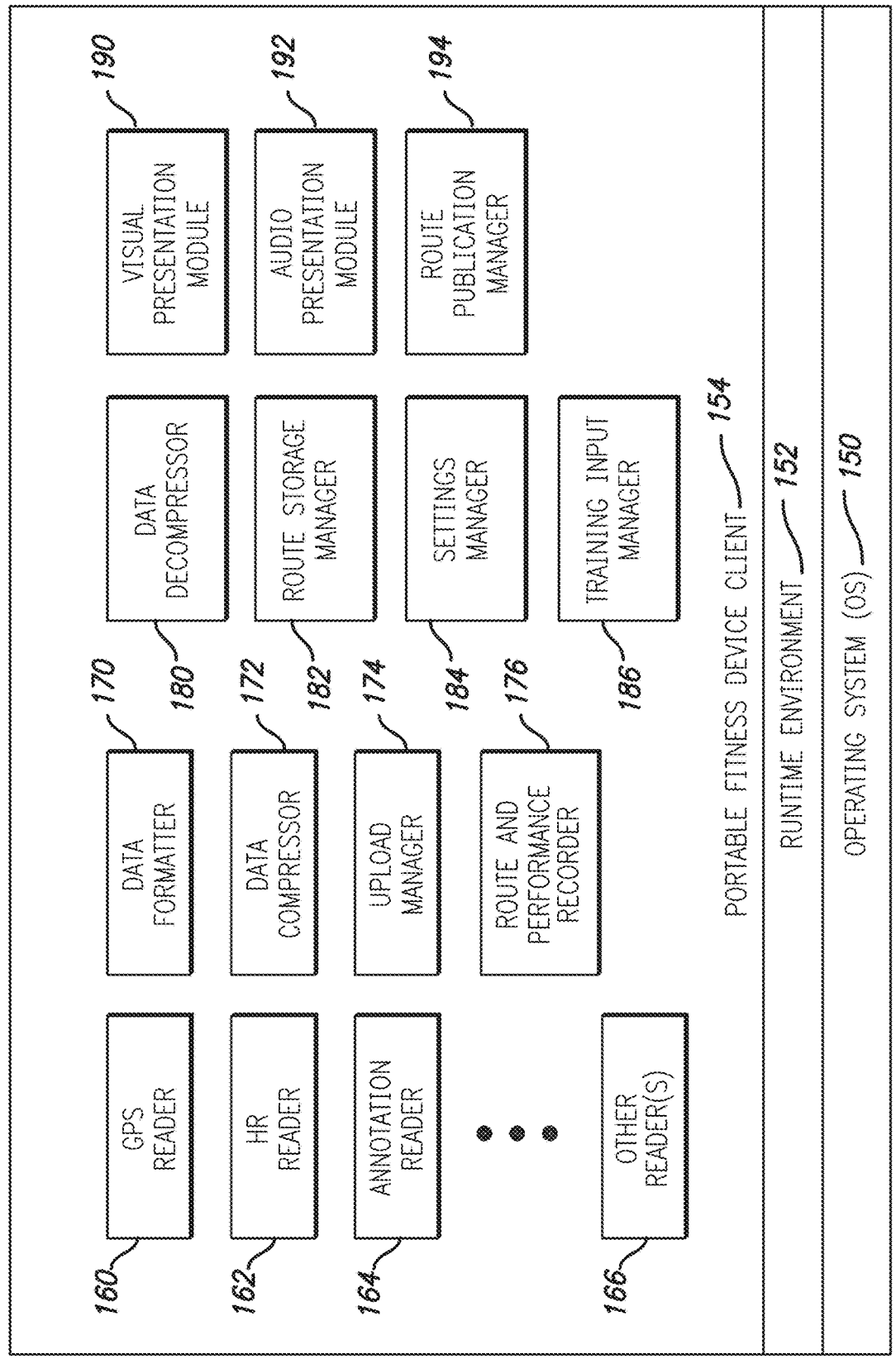
FIG. 2B is a layer diagram of an exemplary software configuration of a portable fitness monitoring device in accordance with an embodiment of the present invention.

With reference now to FIG. 2B, there is illustrated a layer diagram of an exemplary software configuration of portable fitness monitoring device 12 in accordance with one embodiment of the present invention. As illustrated, the software configuration of portable fitness monitoring device 12 includes at a lowest level an operating system (OS) 150 that provides a collection of services, such as thread scheduling, memory management, interrupts, etc., that may be accessed by higher-level software. Running on top of operating system 150 is a runtime environment 152, such as one of the JAVA or BREW runtime environments. Finally, the software configuration of portable fitness monitoring device 12 includes a portable fitness device client 154 running on top of runtime environment 152. Portable fitness device client 154 may be downloaded to portable fitness monitoring device 12 over-the-air, for example, via the wireless WAN and WAN transceiver 104.

As illustrated, portable fitness device client 154 comprises a number of individual modules, each performing a function of portable fitness monitoring device 12. Those skilled in the art will appreciate that the illustrated modules are illustrative rather than exhaustive, and that portable fitness device client 154 may include additional or alternative modules to support or extend the functionality of portable fitness monitoring device 12.

As shown in FIG. 2B, in one embodiment the modules within portable fitness device client 154 preferably may include a number of reader modules 160-166. GPS reader 160 receives from GPS receiver 100 time-stamped waypoints including at least time, latitude and longitude information, and, depending upon implementation and the number of GPS satellites 20 from which GPS signals 22 were received, elevation and error information. Utilizing the time-stamped waypoints received from GPS receiver 100, GPS reader 160 calculates performance and route information for athlete 14. For example, GPS reader 160 may determine the start and stop times at which a route was begun and ended, an elapsed time, an elapsed distance, distance remaining in the route, elevation change, average elevation, current pace, average pace, bearing, etc.

The remainder of readers 160-166, for example, heart rate reader 162 and annotation reader 164, may similarly obtain input data and associate the input data with a corresponding time-stamped waypoint obtained by GPS reader 160. Readers 162-166 may also perform additional calculations to determine instantaneous, differential or cumulative quantitative characterizations of the route, the performance of athlete 14 or of his/her environment. Thus, for example, heart rate reader 162 may obtain an instantaneous heart rate reading from heart rate monitor 120, associate that heart rate reading with the time-stamped waypoint obtained by GPS reader 160, and calculate an average heart rate. Similarly, annotation reader 164 may store a route annotation entered by athlete 14 via input buttons 80 or microphone 18 with a time-stamped waypoint obtained by GPS reader 160.

The data gathered and calculated by readers 160-166 are then parsed and formatted by formatter 170 into a predetermined data format that associates the performance and route data with a timestamp and geographical location. The particular data format employed by data formatter 170 is implementation-dependent, but is preferably compact to conserve the capacity of internal memory device 62 and the bandwidth of the communication link between portable fitness monitoring device 12 and the wireless WAN. Storage capacity and wireless communication bandwidth may further be conserved by applying a data compressor 172 to the formatted data produced by data formatter 170.

After data obtained and calculated by readers 160-166 have been formatted by data formatter 170 and optionally compressed by data compressor 172, the data may be either stored within internal memory device 62 (or audio storage 66 or a removal memory loaded in removable memory slot 64) or transmitted over-the-air via WAN transceiver 104. Upload manager 174 and route and performance recorder 176 determine whether or not to upload and/or store data locally based upon one or more criteria, for example, whether WAN transceiver 104 can acquire a connection to the wireless WAN, the available storage within internal memory device 62, an indication of whether or not a remote user (such as, for example, a competitor athlete, a coach, a trainer, an event organizer, a spectator, or a friend) is tracking the training of athlete 14 in real-time, and/or other criteria. If, based upon these and/or other criteria, upload manager 174 decides to upload the formatted and compressed data, upload manager 174 outputs the data via WAN transceiver 104 and antenna 106 to client computer system 44 and/or server computer system 42 utilizing radio frequency signals 36. In one embodiment, data transmitted to client computer system 44 is typically graphically presented within a display device, and data transmitted to server computer system 42 is typically stored within training journal database 54.

As noted above, portable fitness monitoring device 12 may alternatively receive data over-the-air from the wireless WAN. In a preferred embodiment, the data received over-the-air from the wireless WAN may include route information transmitted by server computer system 42 from route database 52, settings of portable fitness monitoring device 12 transmitted by server computer system 42 or client computer system 44, training recommendations transmitted from server computer system 42 or client computer system 44, motivational content transmitted by server computer system 42 or client computer system 44, point-of-interest information transmitted by server computer system 42, or challenge race announcements (discussed further below) transmitted by server computer system 42. Route information, which may be identified as such, for example, by an XML header, is received, processed and stored by route storage manager 182. The route information may be, for example, turn-by-turn directions keyed to particular geographical areas defined by a latitude and longitude range duple. By storing route information in this format, when GPS reader 160 obtains a time-stamped waypoint falling within a particular geographic area defined by a latitude and longitude range duple, audio presentation module 192 can present an audible instruction to athlete 14 via speaker 82 and/or headphones 122 to direct athlete 14 how to traverse a desired route.

In one embodiment, settings data, which may be identified as such, for example, by an XML, header, is initially received, processed, and output by data decompressor 180 is then subsequently processed by settings manager 184. For example, settings manager 184 may utilize settings data to update storage locations within internal memory device 62 governing particular aspects of the operation of portable fitness monitoring device 12. In addition, based upon the received settings, settings manager 184 may notify upload manager 174 or route and performance recorder 176 to initiate upload or storage of route and performance information.

Training recommendations received, processed and output by data decompressor 180 are subsequently processed by training input manager 186. These training recommendations may take the form of either voice data communicated by a human coach or trainer utilizing, for example, a voice-over-IP (VoIP) connection to portable fitness monitoring device 12, or a predetermined data command representing an audio message. In the former case, training input manager 186 exports the audio data directly to audio presentation module 192, which, in turn, directly presents the audio data to athlete 14 via headphones 122 and/or speaker 82. If, however, the training recommendation takes the form of a data command representing an audio message, training input manager 186 locates an audio track within audio storage 66 or internal memory device 62 corresponding to the data command and presents the audio track to audio presentation module 192 for subsequent presentation to athlete 14. In this manner, a remote human coach or trainer (who may be utilizing a client computer system 44) or an automated training plan service may provide training recommendations directly to athlete 14 in substantially real-time. And, if portable fitness monitoring device 12 is equipped with a microphone 68, athlete 14 may similarly communicate audibly with the remote coach or trainer (e.g., via VoIP) through the execution of annotation reader 164 data formatter 170, data compressor 172 and upload manager 174. As described in further detail below, competitor athletes, event organizers, spectators, or friends may similarly be able to communicate with and provide motivation to the athlete 14 in substantially real time, audibly or via data command.

Audio presentation module 192 is also preferably equipped to present, in audio format, turn-by-turn directions correcting the course of an athlete 14 to return to a route if a turn is missed, as well as turn-by-turn directions providing the most direct return path to the starting point. Such turn-by-turn directions are preferably computed by server computer system 42 based upon real time location information received over-the-air from portable fitness monitoring device 12 and then transmitted to portable fitness monitoring device 12, again utilizing over-the-air communication via the wireless WAN. Audio presentation module 192 may also be utilized to decode and present audio entertainment tracks, such as the MP3 files stored within audio storage 66.

As further depicted in FIG. 2B, portable fitness device client 154 includes a visual presentation module 190 that manages the presentation of route, performance and environmental information to athlete 14 via optional display 84 and/or the display of watch 126.

Finally, route publication manager 194 of portable fitness device client 154 supports the sharing of routes between multiple portable fitness monitoring devices 12, for example, utilizing the local wireless interface 110, WAN transceiver 104, or data port 108. In this manner, an athlete 14 can directly share selected routes (e.g., as identified utilizing input buttons 80) to other athletes having compatible portable fitness monitoring devices 12, such as, for example, competitor athletes that the athlete 14 is competing with in a race.

Figure 3:
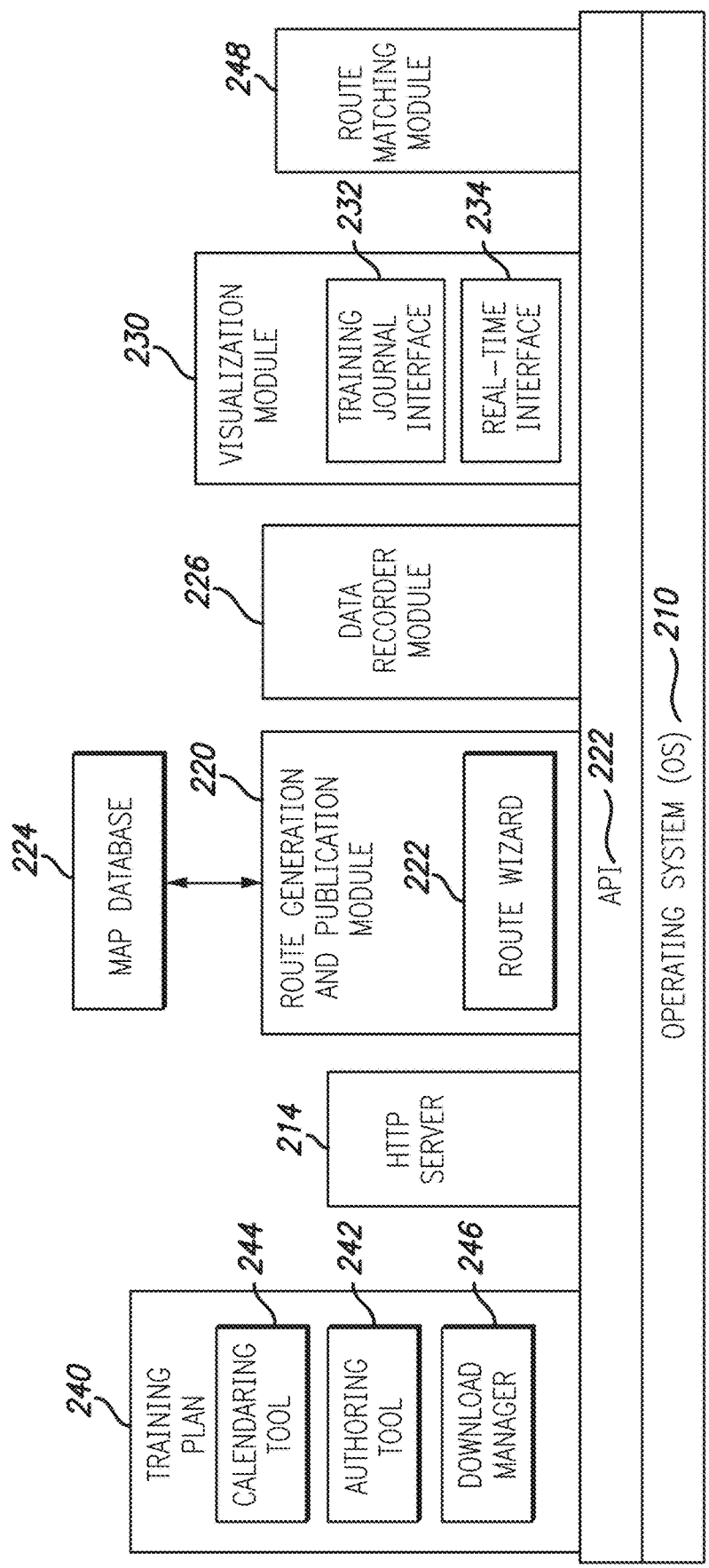
FIG. 3 is a layer diagram of an illustrative software configuration of a server computer system in accordance with an embodiment of the present invention.

Referring now to FIG. 3, there is depicted a layer diagram of an exemplary software configuration of server computer system 42 of FIG. 1 that, in accordance with the present invention, provides an automated web-based route generation, route journaling, route visualization and other services. The services may be offered to a plurality of athletes 14 or other users forming a user community, may be restricted to users that have been issued login IDs and passwords for accessing server 42, and may further be offered in exchange for a subscription fee. The user community may include, for example, athletes and their coaches, trainers, event organizers, spectators, or friends of the athletes.

As shown, at the lowest layer the software configuration of server computer system 42 includes an operating system (OS) 210, which is preferably one of the commercially available operating systems, such as Windows, UNIX, LINUX, AIX, etc. OS 210 has an associated application programming interface (API) 212 though which middleware and application programs may access the services of OS 210.

Running on top of OS 210 is a hypertext transport protocol (HTTP) server 214, which, as is well known in the art, communicates data over Internet 40 utilizing HTTP. In particular, HTTP server 214 supports data communication with portable fitness monitoring device 12 and one or more remote client computers 44 utilizing HTTP. Communication with server computer system 42 may alternatively or additionally be conducted utilizing a sockets layer interface or other lower layer protocol running over IP.

In addition to HTTP server 214, the application software of server computer system 42 includes a number of different modules supporting the client-side functionality provided by portable fitness device client 154. In the depicted embodiment, these modules include a route generation and publication module 220, a data recorder module 226, and a visualization module 230. Those skilled in the art will again appreciate that alternative or additional modules may be implemented within server computer system 42 in order to provide or extend the described or additional functionality.

Route generation and publication module 220 may generate routes to be traversed by athletes 14 during fitness activities, store the routes within route database 52 (FIG. 1) for subsequent access, and/or download the routes to portable fitness monitoring devices 12. In one embodiment, route generation and publication module 220 may include a route wizard 222, which, as described below with respect to FIG. 4A-4F, guides a user through a step-by-step process for generating routes having desired parameters and attributes. As shown in FIG. 3, route generation and publication module 220 preferably accesses a local or remote map database 224 that stores street and/or trail information (collectively, "path information") in association with at least latitude and longitude information, and preferably elevation information. Thus, given at least one terminal point (e.g., a starting point), route generation and publication module 220 is able to construct one or more routes having a desired length, elevation profile, and other parameters and attributes. Routes generated by route generation and publication module 220 are stored for subsequent access within route database 52.

Once a particular route is scheduled by an athlete 14 as discussed further below, route generation and publication module 220 transforms the route into a sequence of turn-by-turn instructions and publishes the route to a portable fitness monitoring device 12 via HTTP server 214 and the wireless WAN. Because route generation and publication module 220 can obtain elevation information along a desired route directly from map database 224, route generation and publication module 220 is also able to advantageously supply, in conjunction with a route, elevation information for the route. In this manner, the elevation information supplied by route generation and publication module 220 can assist or replace the elevation information provided by GPS receiver 100. Thus, if less than four GPS satellites 20 are acquired, or if GPS receiver 100 is not designed to process elevation information, portable fitness monitoring device 12 can still determine elevation-dependent route and performance data regarding a route traversed by athlete 14.

Data recorder module 226 receives route and performance information from portable fitness monitoring device 12 via the wireless WAN and/or local wireless interface 110 and/or dataport 108 and utilizes such data to build a virtual training journal for athlete 14 within training journal database 54. As noted previously, depending upon the operation of the upload manager 174 and route and performance recorder 176 within portable fitness device client 154, data recorder module 226 can build a journal entry describing the traversal of a particular route in substantially real time (i.e., during traversal of the route). Data recorder module 226 also preferably supports an interface through which a route recorded by data recorder module 226 can be exported to route database 52 for subsequent viewing, selection and scheduling within an athlete's 14 training journal.

The exemplary software configuration of server computer system 42 may further include visualization module 230. Visualization module 230 supports one or more interfaces through which users of remote client computer systems 44 can view and/or annotate the data recorded within training journal database 54 by data recorder module 226. In the depicted embodiment, visualization module 230 includes training journal interface 232, which, as described in detail below, permits an athlete 14 or other user to view and/or annotate a journal entry describing a route traversed during a fitness activity after completion of the route traversal. In a preferred embodiment, visualization module 230 further includes a real-time interface 234 through which a user utilizing a remote client computer system 44, such as athlete 14, a competitor athlete, a coach, a trainer, an event organizer, a spectator, or a friend, may view, in substantially real time, data logged within training journal database 54 for one or more athletes. Thus, for example, a spectator having access to Internet 40 can view the real-time standings of multiple competitors in a fitness activity, such as a marathon, cycling race, or other competitive event. Similarly, a remotely located coach or trainer having access to Internet 40 via a client computer 44 can view the progress of one or more athletes 14 engaged in one or more training activities in substantially real time.

Visualization module 230 also preferably includes support for the export of selected journal entries between accounts of different users of the back-end service provided by server computer system 42. For example, visualization module 230 preferably permits a user to transmit a journal entry representing a traversal of a route via email. In addition, visualization module 230 may permit a user to create a "buddy" account that may be accessed and even annotated by guest users, such as a competitor an athlete, a coach, a trainer, an event organizer, a spectator, or a friend. In this manner, if the services provided by server computer system 42 are provided for a subscription fee, marketing of the service is enhanced by the ability of non-subscribers or subscriber having reduced-cost subscriptions to view journal entries created by others.

Referring now to FIGS. 4A-4F, there are illustrated a sequence of graphical user interface (GUI) windows presented by route wizard 222 to a user of client computer system 44 by HTTP server 214. As noted above, route wizard 222 provides a graphical and intuitive interface through which a remote user can automatically build, search for, and/or schedule routes to be traversed during a fitness activity.

In order to access route wizard 222, a user utilizing a remote client computer system 44 first logs into server computer system 42 via Internet 40 and HTTP server 214. As is well known to those skilled in the art, the login process typically includes the entry by the remote user of a login ID and password or other authentication information to server computer system 42, which then authenticates the identity of the user by reference to the user database or the like.

Following the preliminary authentication process, an exemplary embodiment of route wizard 222 first presents a graphical user interface (GUI) window 250 to the user. Within GUI window 250, the user is prompted to select one of three options 252, 254 and 256, which are each associated with a respective one of radio buttons 258a-258c. Thus, the user is permitted to build a new route (option 252), search for an existing route within route database 52 (option 254), and access one or more routes within a pre-packaged training plan (option 256). After the user has indicated a preference among options 252-256 by selecting one of radio buttons 258a-c utilizing cursor 262 or a keyboard, the user selects Next button 260 to proceed to the next step.

If the user selected option 256 indicating that the user desires to select a pre-packaged training plan, route wizard 222 may subsequently present the user with one or more additional windows in which a training plan meeting the user's needs and desires is designed. Route wizard 222 then automatically populates the training journal of the athlete 14 with a schedule of fitness activities that conform to the distance, time, goal event (e.g., marathon) and/or other parameters of the training plan. Thereafter, the user may be permitted to build or search for routes within route database 52 as described below with respect to FIGS. 4B-4F in order to fulfill the requirements of the scheduled fitness activities.

Figure 4A:
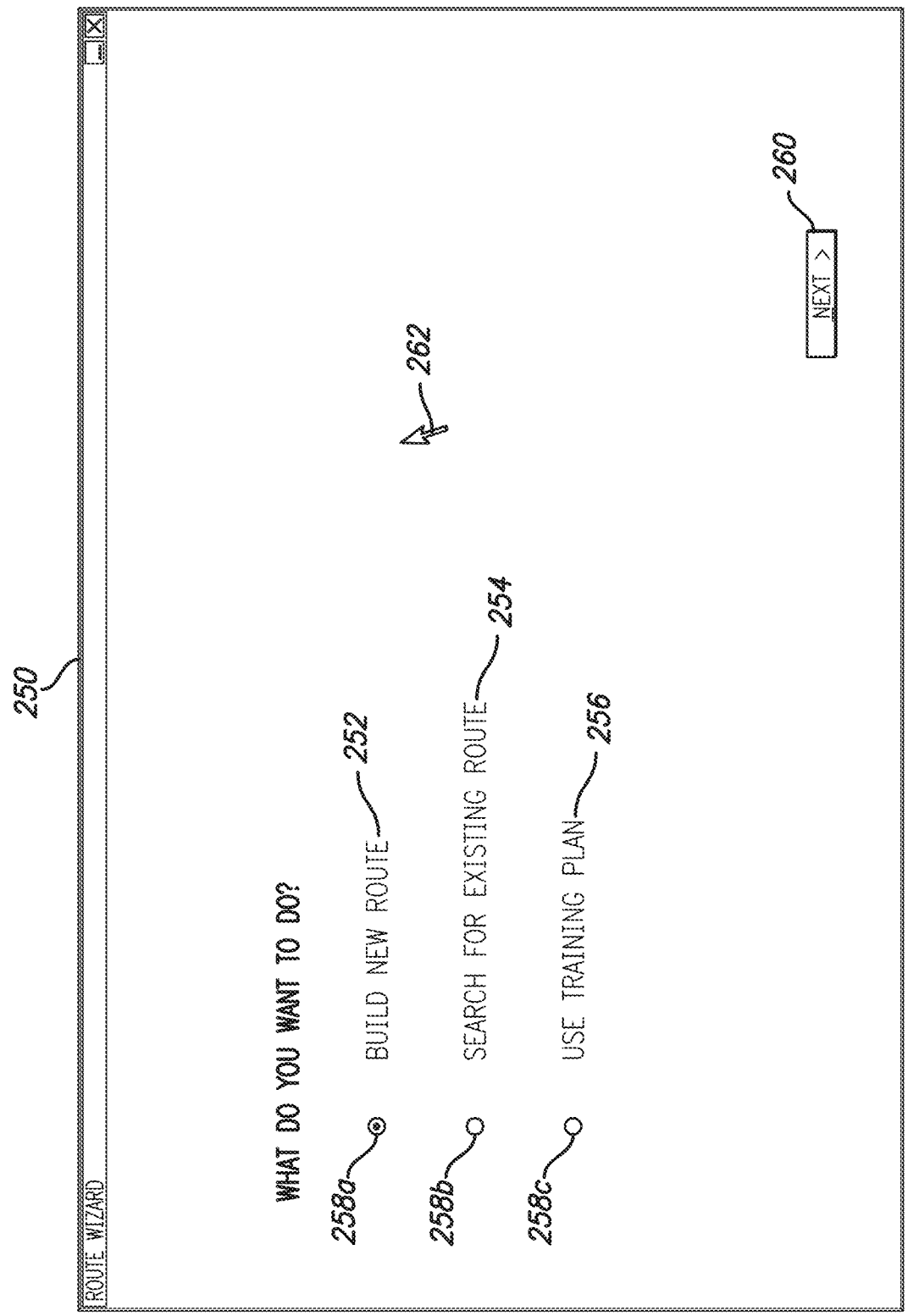
FIG. 4A depicts an exemplary graphical user interface of a route wizard through which a remote user may build a route, search for a route within a route database, and select routes within a predetermined training plan, in accordance with an embodiment of the present invention.
Figure 4B:
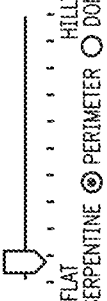
FIG. 4B illustrates an exemplary route wizard graphical user interface through which a user may enter parameters and attributes of a new route, in accordance with an embodiment of the present invention.

Assuming that the user selects option 252 of GUI window 250 in order to build a new route, route wizard 222 next presents to the user the GUI window 270 shown in FIG. 4B. As shown in FIG. 4B, window 270 includes a number of GUI components prompting the user to enter parameters for the new route to be built and, optionally, desired attributes of the route.

Specifically, the user is first prompted in section 272 to designate a starting point of the route (which in this embodiment is also the ending point) by entering a street address or ZIP code or by selecting a route within route database 52 having the desired starting point. Next, the user is prompted in section 274 to enter a desired overall length of the route, specified either by distance or by time. If time is utilized to specify the length of the route, a desired or historical average pace is preferably entered so that a route distance can be computed. In addition to the route parameters collected in sections 272 and 274, GUI window 270 may also prompt the user to enter optional route attributes. In the illustrated embodiment, the optional route attributes include a maximum distance that the route may extend from the starting point, a desired elevation profile of the route, a desired pattern of the route, a desired safety characterization of the route, a desired flow of the route, and whether or not the route may be a pre-existing route stored within route database 52.

Once the user has entered all required parameters and any optional route attributes within GUI window 270, the user selects Next button 280 utilizing cursor 262. In response, route generation and publication module 220 builds one or more routes conforming as closely as possible to the route parameters and route attributes entered through GUI window 270. The presentation of such routes by route wizard 222 is described below with respect to FIG. 4E.

Figure 4C:
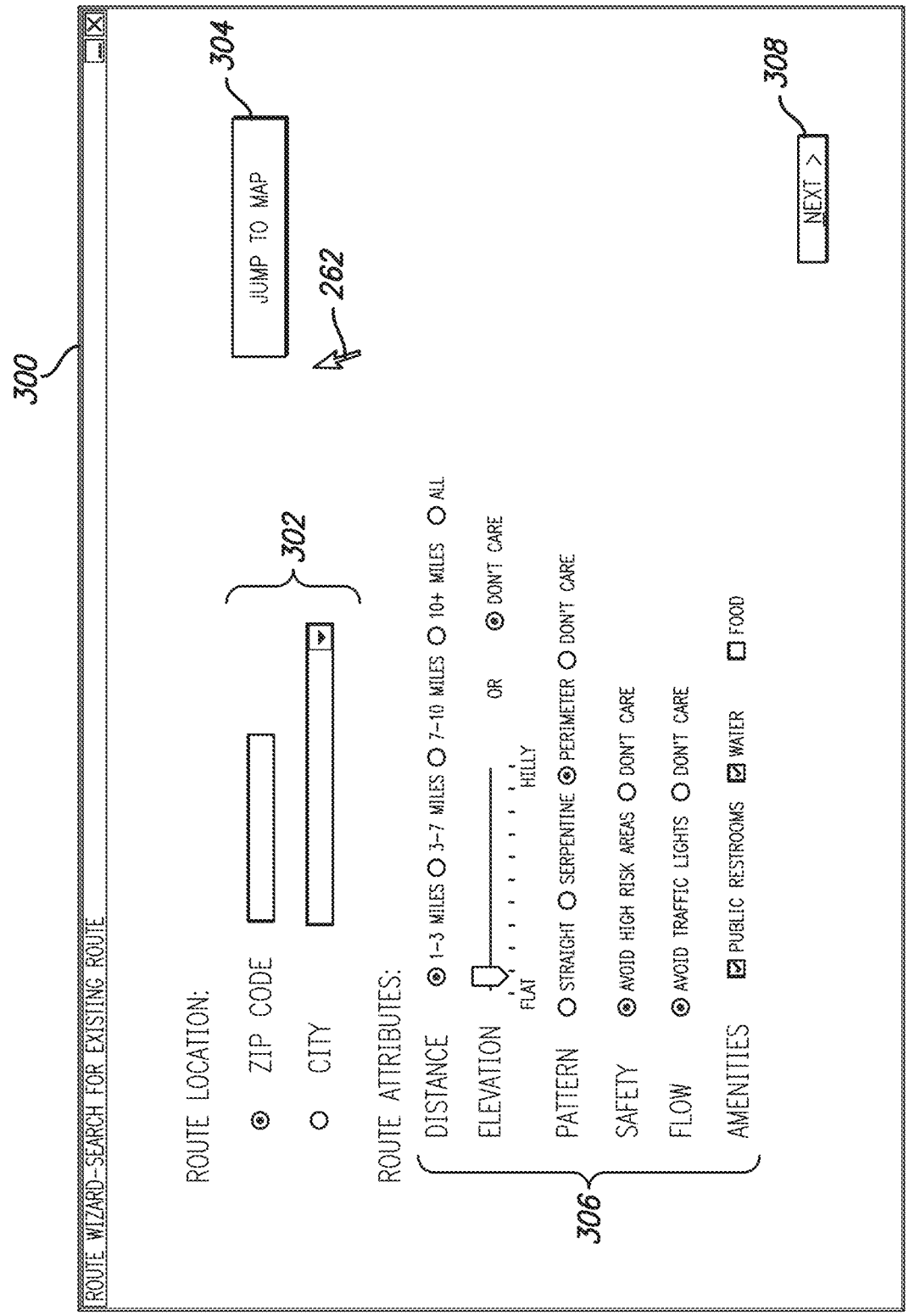
FIG. 4C depicts an exemplary route wizard graphical user interface through which a user may search a route database for an existing route, in accordance with an embodiment of the present invention.

Referring now to FIG. 4C, there is illustrated an exemplary embodiment of a GUI window 300 presented by route wizard 222 to a user of client computer system 44 is response to selection of option 254 in GUI window 250 of FIG. 4A. That is, in response to a user input indicating that the user desires to search for a pre-existing route within route database 52, route wizard 222 prompts the user through GUI window 300 to enter parameters and attributes of routes of interest to the user.

In the depicted embodiment, GUI window 300 includes two modalities by which the user may specify parameters for the route. In particular, in section 302, the user is permitted to specify a location of the route by ZIP code or city name. Alternatively, as represented by button 304, the user may specify a geographic location of the route or routes to be located by the search through a map interface. For example, if the user selects button 304 utilizing cursor 262, route wizard 222 may present window 320 of FIG. 4D, which is described below.

Still referring to FIG. 4C, in section 306 of GUI window 300, the user is permitted to input into route wizard 222 desired attributes of the route to be located through the search of route database 52. For example, in the illustrated embodiment, the route attributes include a range of route distance, an elevation profile, a route pattern, a route safety profile, a route flow, and amenities adjacent to the route. After the user has successfully entered a route location and any desired route attributes, the user may select Next button 308 utilizing cursor 262 to invoke a search of route database 52 by route generation and publication module 220 to locate one or more routes, if any, characterized by the desired route location and any route attributes. Assuming route generation and publication module 220 locates one or more routes of interest within route database 52, route wizard 222 presents the routes to the user through an interface such as that depicted in FIG. 4E, which is described below.

Figure 4D:
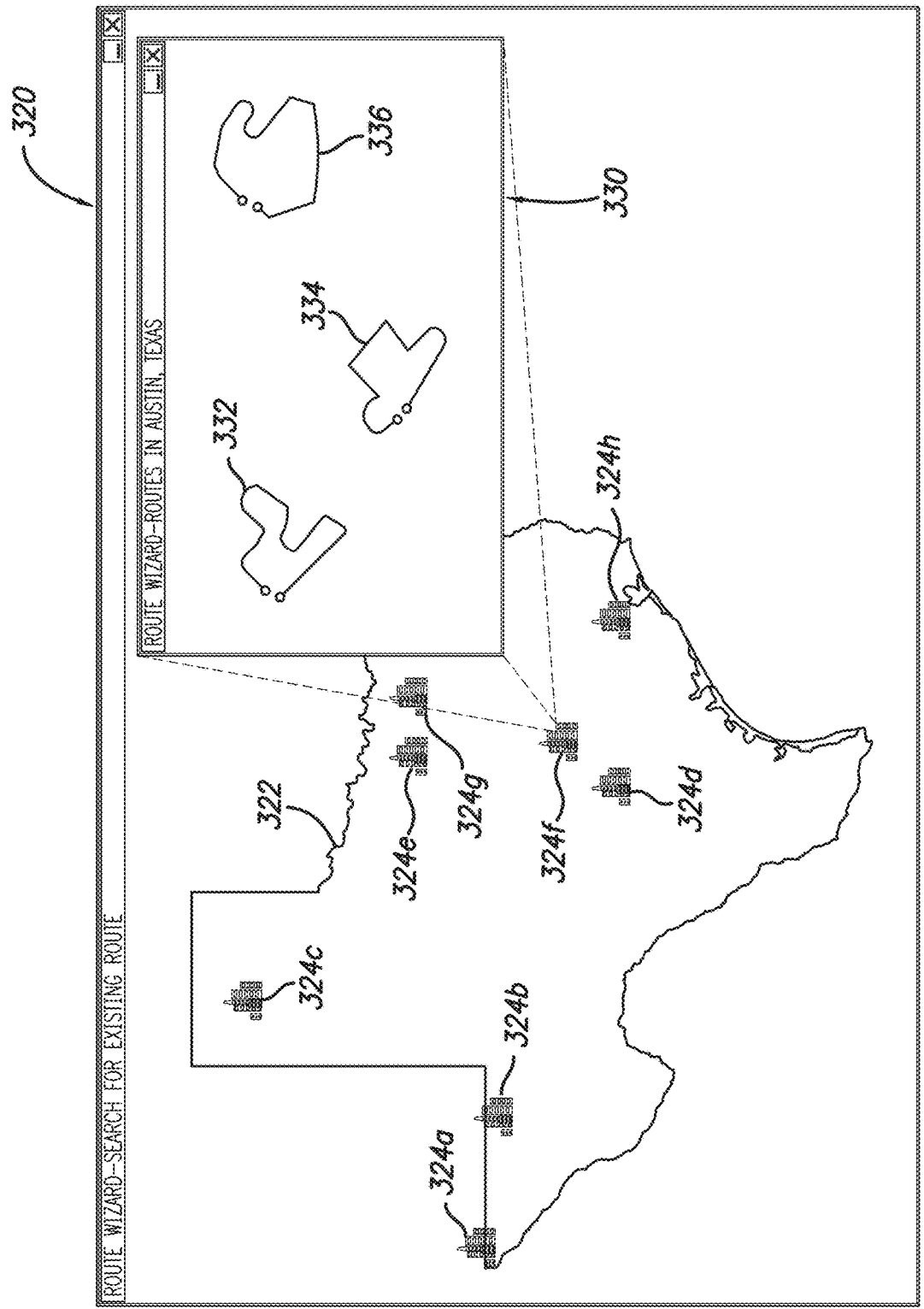
FIG. 4D illustrates an exemplary route wizard graphical user interface that presents a navigable geographical map populated with graphical indications of locations for which preexisting maps are stored within the route database, in accordance with an embodiment of the present invention.

Referring now to FIG. 4D, there is illustrated an exemplary GUI window 320 in which route wizard 222 presents a navigable geographical map populated with graphical indications of locations for which preexisting routes are stored within the route database 52. In the depicted embodiment, GUI window 320 includes a graphical representation 322 of a geographical area, for example, a political, cultural, or regional boundary. Within geographical representation 322, route wizard 22 presents a number of indicia 324a-h identifying geographic locations of one or more pre-existing routes for which route database 52 stores route data.

In response to the user flying over one of indicia 324 utilizing cursor 262, route wizard 222 displays in a separate window or frame 330 route maps 332-336 of the routes in the geographic location corresponding to the selected indicia 324. Graphical representations 332-336 may be advantageously presented overlaying a street or topographical map within window 330. If the user visually identifies one or more routes of interest at a particular geographical location through visual inspection of indicia 324 and/or the route maps 332-336 displayed within windows 330, the user may select that geographical location by clicking on the associated indicia 324. In this manner, GUI window 320 and its associated functionality provide the user with a graphical and intuitive way of viewing and selecting route locations of interest.

Figure 4E:
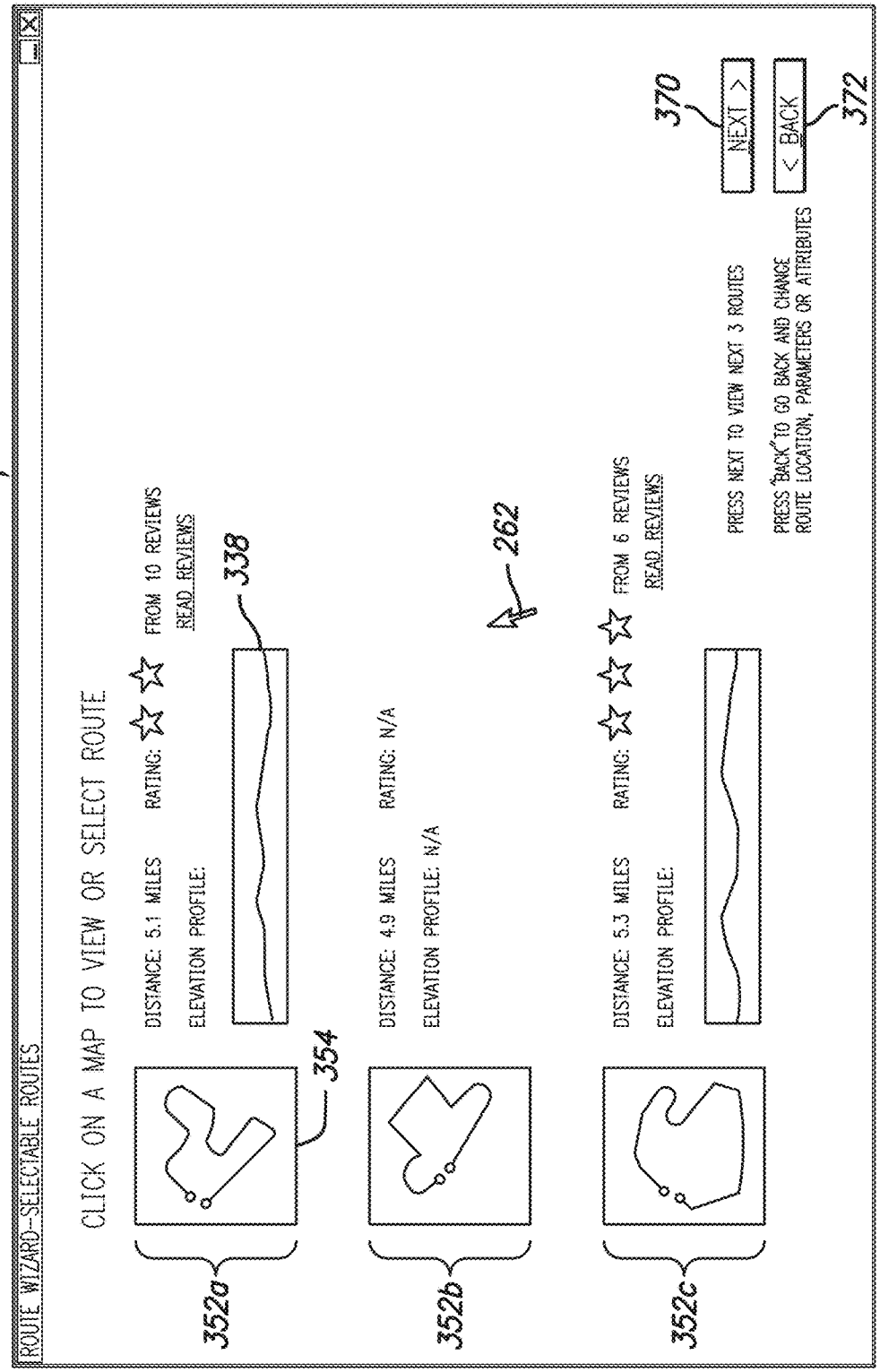
FIG. 4E depicts an exemplary route wizard graphical user interface within which a user may identify a selected route for detailed viewing, in accordance with an embodiment of the present invention.

With reference now to FIG. 4E, there is illustrated an exemplary GUI window 350 presented by route wizard 22 in order to permit a user to select from among one or more pre-existing routes that were located within route database 52 or that were built by route generation and publication module 220 in response to the input gathered by route wizard 222 within GUI window 270. As shown, in the depicted embodiment proposed routes that may be selected by the user are presented to the user in the form of route summaries 352a-c. Although such route summaries 352 may take any of a number of formats, in one preferred embodiment, each route summary 352 includes at least a route thumbnail 354 and a route distance 356. The route summary 352 may further include an elevation profile 358, which in the depicted embodiment is illustrated in graphical form, a route rating 360, and one or more audio or textual reviews or links thereto 362.

The user has a number of different navigation options from GUI window 350. First, by clicking on any of route thumbnails 354, the user is next presented with a graphical component through which the user may select or view detailed information regarding the selected route, as described further below with respect to FIG. 4F. Alternatively, the user may utilize cursor 262 to select Next button 370 in order to view one or more additional route summaries 352 of additional routes satisfying the user's route parameters and/or route attributes. In addition, by selecting Back button 372 utilizing cursor 262, the user is presented with one or more of the previously described GUI windows in order to permit the user to modify the route location or other route parameters or attributes.

Figure 4F:
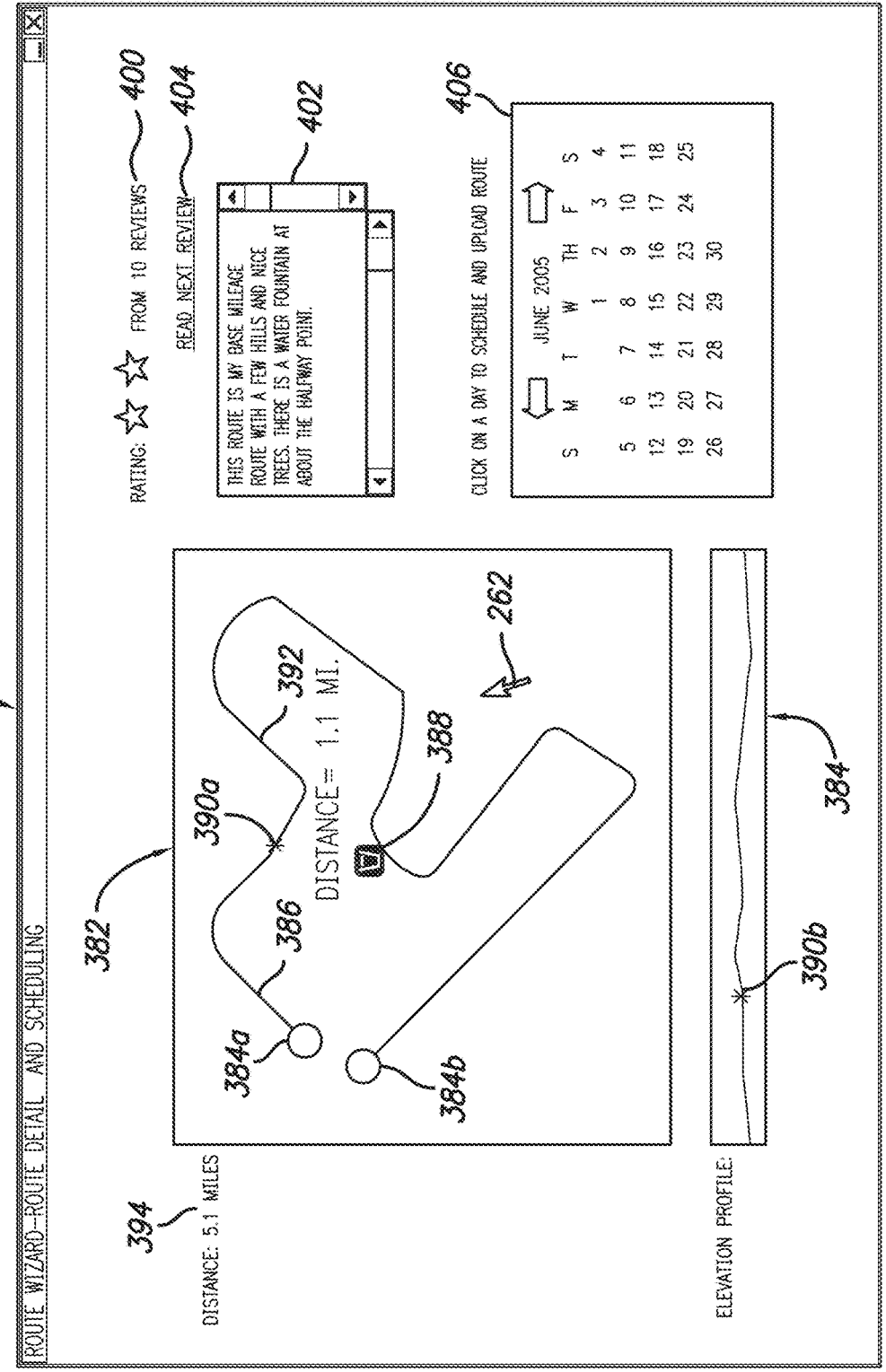
FIG. 4F depicts an exemplary route wizard graphical user interface that presents a detailed description of a route and permits the user to upload the route to a portable fitness monitoring device, in accordance with an embodiment of the present invention.

With reference now to FIG. 4F, there is illustrated an GUI window 380 presented by route wizard 222 to provide a detailed view of a proposed route and an interface through which the user can upload route data to portable fitness monitoring device 12 and schedule traversal of the route. In the illustrative embodiment, window 380 includes a detailed route map 382 indicating the geographical path of the route. Route map 382 includes terminal points 384a, 384b and a route path 386. Route map 382 may optionally further include one or more annotations 388 associated with a route, which may be stored in route database 52 or accessed from map database 224. For example, in FIG. 4F, route diagram 382 contains an annotation 388 indicating a geographical location of a potable water source.

By clicking on route path 386 utilizing cursor 262, the user invokes display by route wizard 222 of a marker 390a, which may then be selectively slid to any desired location along route path 386 utilizing cursor 262. Route wizard 222 preferably displays marker location information 392 in association with marker 390a to indicate the geographic location of marker 390 (e.g., the distance between marker 390a and terminal 384a along route path 386). In addition, route wizard 322 preferably displays a corresponding second marker 390b in association with elevation profile 384. In this manner, by manipulating either of markers 390a or 390b utilizing cursor 262, the user can visualize the location of particular elevation features or annotations 388.

As further shown in FIG. 4F, window 380 further includes a rating of the route, which in this case includes between one and four "stars" and an indication of a number of reviews. In addition, window 380 may optionally include a number of written reviews, for example, displayed within text box 402. The user may navigate to a next review of the route by selecting link 404.

GUI window 380 of FIG. 4F finally includes an interface through which the user may invoke the upload of route information pertaining to the route currently being viewed to portable fitness monitoring device 12. In the depicted embodiment, the user can invoke upload of the route information to portable fitness monitoring device 12 by scheduling the route utilizing calendar interface 406. For example, in order to upload route information pertaining to the illustrated route to portable fitness monitoring device 12, the user may select a desired present or future date by clicking on that date within calendar interface 406 utilizing cursor 262. In response to this input, route generation and publication module 220 enters the route to the athlete's training journal in training journal database 54 as a prospective event and uploads route information to portable fitness monitoring device 12 via Internet 40 and the wireless WAN. Importantly, in order to conserve data storage capacity within portable fitness monitoring device 12, the upload by route generation and publication module 220 is preferably deferred until a selectable time interval of the scheduled date. In this manner, route information is provided to portable fitness monitoring device 12 automatically and as needed.

Figure 5B:
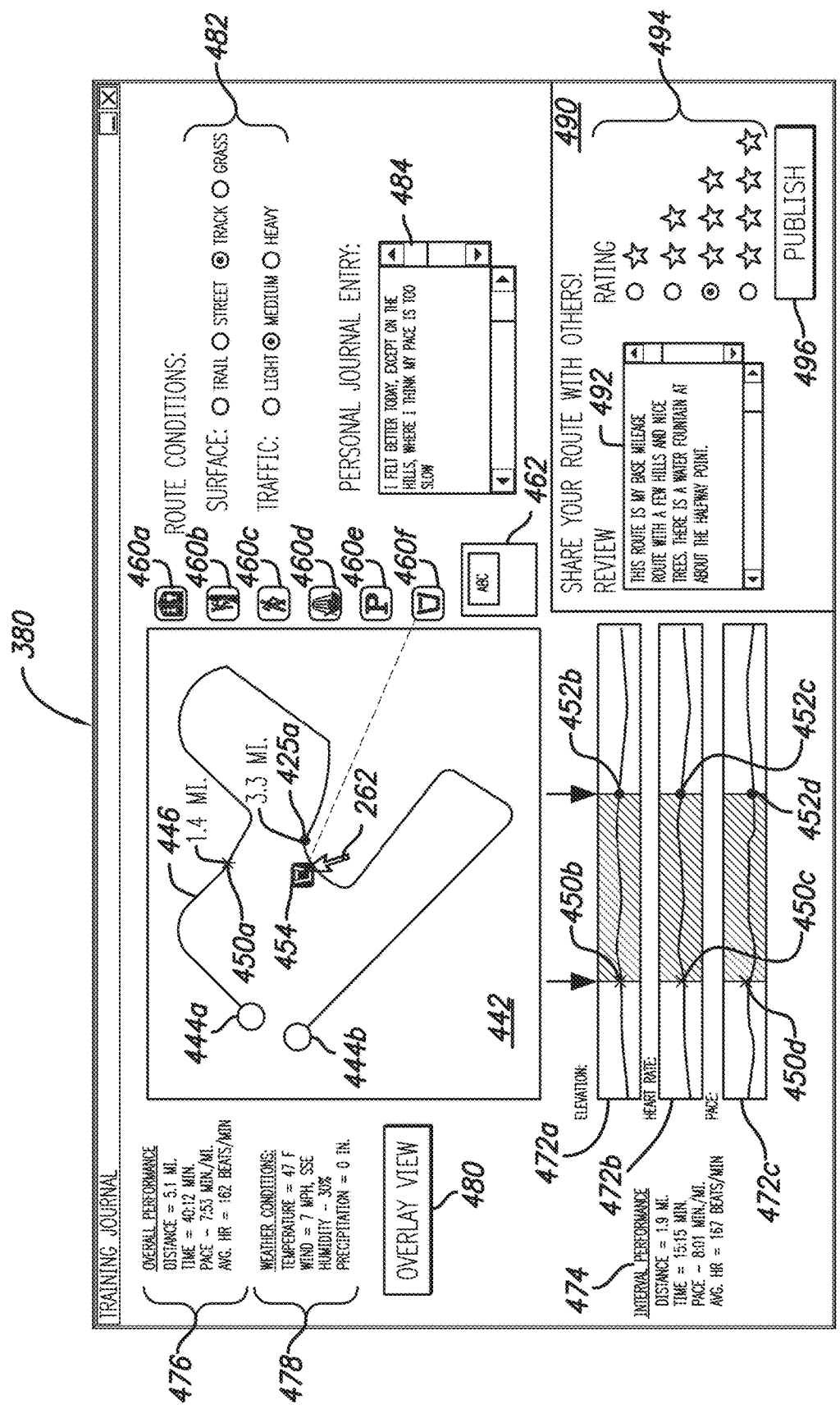
FIG. 5B depicts an exemplary graphical user interface of a training journal entry detailing a particular route traversed with a portable fitness monitoring device in accordance with an embodiment of the present invention.
Figure 5C:
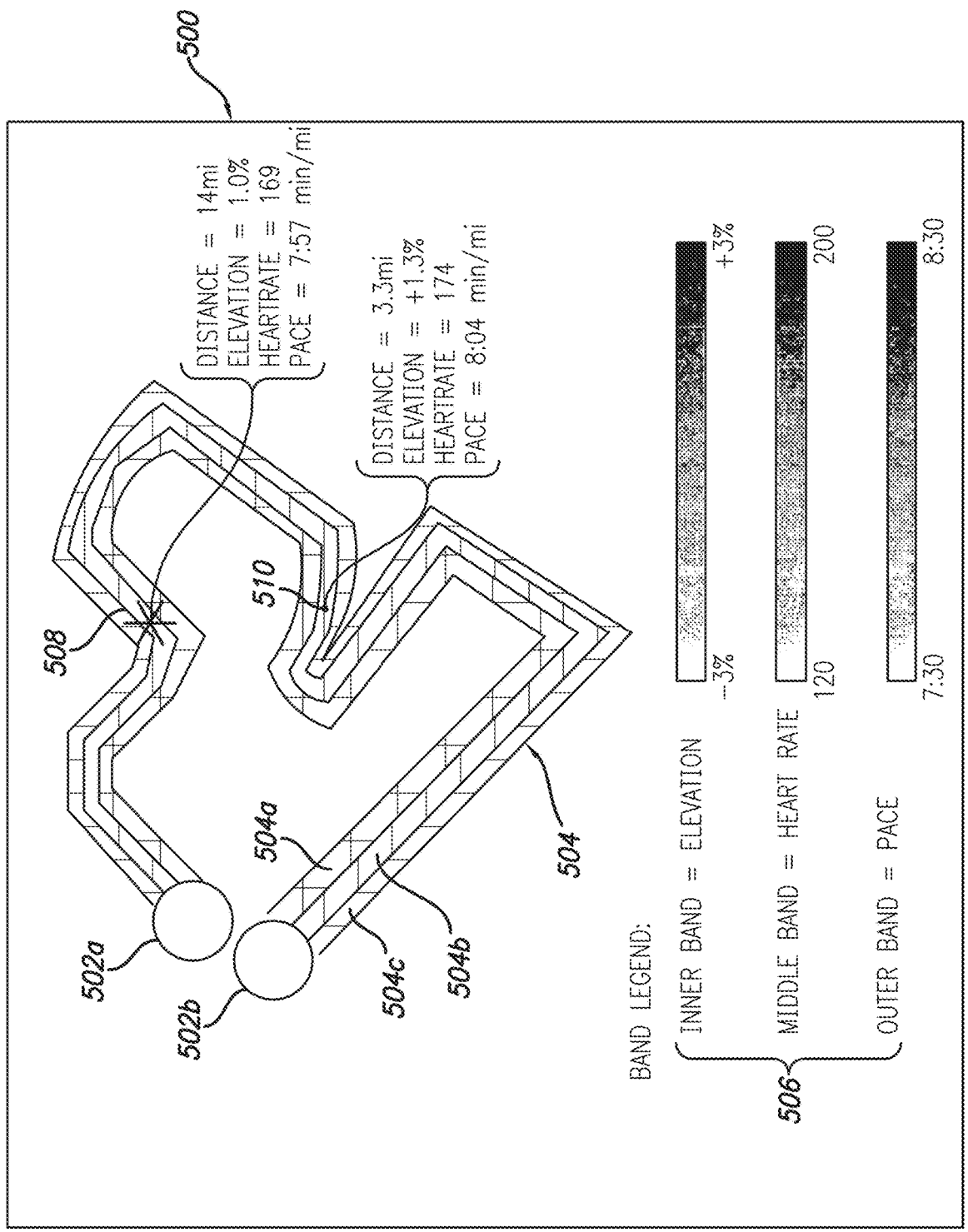
FIG. 5C illustrates an exemplary graphical user interface of a training journal entry showing a route view in which multiple route and/or performance parameters are concurrently graphically presented in a banded format along a route path, in accordance with an embodiment of the present invention.

Referring now to FIGS. 5A-C, there are illustrated a series of GUI windows presented by training journal interface 232 of visualization module 230 of server computer system 42 to permit a user to view, annotate and share training journal entries created utilizing data received over-the-air from portable fitness monitoring device 12. In order to access training journal interface 232, a user stationed at a remote client computer system 44 first logs into server computer system 42 via Internet 40 and HTTP server 214. As is well known to those skilled in the art, the login process typically includes the entry by the remote user of a login ID and password or other authentication information to server computer system 42, which then authenticates the identity of the user by reference to the user database or the like.

Following the preliminary authentication process, training journal interface 232 of visualization module 230 presents GUI window 420 to the remote user via HTTP server 214 and Internet 40. As illustrated, GUI window 420 includes a calendar interface 424 through which the user can select a past, current or future calendar month of interest utilizing cursor 262. An associated list box 422 presents for selection dates within the selected calendar month having journal entries within training journal database 54 for the specified login ID. Thus, by navigating utilizing cursor 262, the user can select for viewing journal entries detailing past or real-time routes previously traversed or currently being traversed by an athlete 14, or prospective routes scheduled for the athlete 14.

Assuming that the user selects a past journal entry within training journal database 54 from list box 422, training journal interface 232 presents GUI window 440 of FIG. 5B, again utilizing HTTP serve 214. As shown, the journal entry presented by training journal interface 232 within GUI window 440 provides detailed information regarding a route previously traversed by athlete 14, the athlete's 14 performance, environmental features or conditions such as points-of-interest, as well as the athlete's 14 or other users' personal comments and annotations. In an embodiment, comments and/or motivational content sent to the athlete 14 by a competitor athlete, coach, trainer, event organizer, spectator, or friend may also be presented in the journal entry. In particular, the training journal entry presented within GUI window 440 includes a route map 442 having terminal points 444a-b and a route path 446 showing the geographical path traversed by the route. As discussed above, route map 442 may advantageously be presented as an overlay of a trail or street map retrieved from map database 224.

The overall performance of athlete 14, in traversing the route depicted in route map 442, is preferably summarized in a performance summary section 476. As indicated, performance summary section 476 may indicate the route distance, total elapsed time, average pace, average heart rate of athlete 14, as well as other route and performance information. Weather conditions at the time and geographical location at which athlete 14 traversed the route may optionally be presented in a weather condition section 478. For example, weather condition section 478 may specify the temperature, wind speed and direction, humidity, and precipitation. The weather condition information presented within weather condition section 478 may advantageously be accessed by visualization module 230 from any of the multiple publicly accessible weather databases available via Internet 40.

The user may interact with route map 442 in a number of ways. For example, the user may annotate route map 442 by dragging any of icons 460a-f to a selected location along route path 446 utilizing cursor 262. For example, in the illustrated embodiment, the user is dragging an annotation 454 representing a potable water source onto route map 442. A variety of other points-of-interest markers could be added to the map such as, for example, those indicating the location of bathroom facilities, parking lots, food service areas, first aid stations, information booths, event registration booths, or the like. The user may alternatively drag callout box icon 462 onto route map 442 in order to enter a textual annotation.

In addition, in response to clicking on route path 446 utilizing cursor 262, training journal interface 232 displays one or more markers 450a, 452a along route path 446, preferably in association with one or more items of route or performance information (e.g., a distance) for the geographical location identified by the marker 450a, 452a. By adding markers 450a, 452a in this manner, the user can graphically and intuitively ascertain the geographical location of features of interest and performance and route information at selected locations along route path 446. Training journal interface 232 may alternatively or additionally present route and performance information for a selected geographical location in response to the user causing cursor 262 to "fly over" the corresponding location on route path 446.

In association with route map 442, training journal interface 232 preferably presents other performance information, route information, and/or environmental information in graphical format. For example, in the depicted embodiment, training journal interface 232 presents an elevation profile 472a, a heart rate profile 472b, and a pace profile 472c in association with route map 442. When the user adds markers 450a, 452a to route path 446, training journal interface 232 automatically presents corresponding markers 450b-d and 452b-d at corresponding locations along graphical profiles 472a-c. As discussed above, all of markers 450 and all of markers 452 are synchronized so that movement of any of markers 450 moves all of markers 450 and movement of any of markers 452 moves all of markers 452. In this manner, the user is able to graphically and intuitively define an interval over which performance, route and/or environmental information may be viewed. For example, in the depicted embodiment, interval information is depicted in interval section 474, which informs the user of the interval distance, time taken by the athlete 14 to traverse the route interval, average pace over the route interval and average heart rate over the route interval.

Of course, the particular types of route, performance and environmental information shown in FIG. 5B are not exhaustive and other types of route, performance, and environmental information may be captured in association with the traversal of a route. If additional route, performance or environmental information is captured in association with the route, that information is preferably presented in a profile 472, within interval section 474, and/or within overall performance section 476 in like manner. For example, GUI window 440 may present information regarding what pair of shoes 24 the athlete was wearing during the fitness activity, together with a lifetime mileage total for that specific pair of shoes 24.

In a preferred embodiment of the present invention, the user may alternatively or additionally view route, performance and environmental information regarding a previously traversed route in an overlay view in which a graphical representation of the route, performance and/or environmental information is depicted along route path 446. For example, in the illustrated embodiment, in response to user selection of overlay view button 480 utilizing cursor 262, training journal interface 232 presents route map 500 of FIG. 5C in place of route map 442 of FIG. 5B.

Like route map 442, route map 500 includes terminal points 502a and 502b defining the starting and ending points of a route path 504. In contrast to route map 442, however, route path 504 of route map 500 comprises a plurality of bands 504a-c, each of which represents a respective route, performance or environmental parameter quantified at the waypoints recorded along the route. The value of the respective route, performance or environmental parameter is preferably charted along route path 504 utilizing gray scale or color shade variation to represent the instantaneous quantity of the route, performance or environmental parameter at each point along the route. Thus, in FIG. 5C, the different hatching applied to each of bands 504a-504c represents a different color and a varying spacing between the hatches represents the display of the colors at varying levels of intensity along the route path, depending upon the value of the parameters at each point along the path. The value associated with each shade of color or each level of gray scale is generally graphically represented in an accompanying legend 506. Training journal interface 232 preferably further presents instantaneous route and performance data at any point along the route path in response to a flyover of cursor 262 or in response to the user adding markers 508, 510 to the route path, as described above. For example, in association with the display of marker 508, training journal interface 232 displays information regarding the traversed distance, relative elevation, heart rate and pace associated with a distance 1.4 miles from the beginning of the route.

Returning to FIG. 5B, in addition to supporting user annotation of route maps 442 and 500, GUI window 440 preferably permits the user to enter additional information regarding environmental and route conditions and personal thoughts. For example, GUI window 440 includes a route condition section 482 that permits the user to record the surface and traffic conditions observed along the route, as well as a text box 484 in which the user may enter personal reflections about the training activity.

Finally, GUI window 440 preferably includes a GUI component that permits the user to review and/or rate the route. For example, in the exemplary embodiment, GUI window 440 contains a second text box 492 in which the user can compose a review of the route and a ratings section 494 in which the user can award the route between one and four "stars". After the route has been reviewed and/or rated, the user can select Publish button 496, which causes training journal interface 232 to store the review and rating within route database 52 in association with the route. In this manner, the review and rating are available for access by other users through route wizard 222, as described above.

Training journal interface 232 preferably permits a user to view prospective routes that have been scheduled utilizing a similar interface to that illustrated in FIG. 5B. In particular, in response to a user selecting a journal entry for a future date within list box 422 of FIG. 5A, training journal interface 232 presents a journal entry containing a route map 442 of the prospective training activity as shown in FIG. 5B. Of course, the journal entry will not contain any performance information (e.g., time, pace, heart rate, etc.) because the athlete 14 has not yet traversed the route.

Training journal interface 232 also preferably permits a user to view routes currently being traversed in substantially real time through an interface similar to that depicted in FIG. 5B. In this case, training journal interface 232 presents a journal entry containing a route map 442 and a marker 450a showing the athlete's 14 current location with respect to route path 446. In addition, training journal interface 232 may present a summary section 476 summarizing the athlete's 14 performance to the current position, a weather condition section 478, an interval section 474, and one or more graphical profiles 472. In this manner, a competitor athlete, a coach, a trainer, an event organizer, a spectator, or a friend utilizing a client computer system 44 may track an athlete's 14 performance information, route information and environmental information in substantially real time.

If a user utilizing a client computer system 44, such as athlete 14, a competitor athlete, a coach, a trainer, an event organizer, a spectator, or a friend, desires to view a substantially real time view of the activities of multiple athletes traversing a common route, the user preferably logs into real-time interface 234 through HTTP server 214. Assuming the user has the appropriate subscription and/or permissions, real-time interface 234 builds from the training journals of multiple athletes a web page containing a single route map on which multiple markers, each representing a respective athlete, are presented. The web page may further present separate performance and route information for each athlete. In this manner, a remote user stationed at a client computer system 44 may track performance information, route information and environmental information in substantially real time for multiple athletes traversing the same or substantially the same route.

An athlete 14 may desire that a competitor athlete, a coach, a trainer, an event organizer, a spectator, a friend or other remote user hold the athlete 14 accountable for meeting the athlete's 14 fitness goals and keep the athlete 14 motivated during and between fitness training sessions. Embodiments of the portable fitness monitoring device 12 and system of the present invention may help to meet this desire.

In an embodiment of the present invention, the portable fitness monitoring device 12 may be capable of presenting motivational content to the athlete 14 equipped with the portable fitness monitoring device 12. First, the portable fitness monitoring device 12 may wirelessly receive data from a remote user while the athlete 14 is participating in a fitness activity. Then, based on the wireless reception of the data from the remote user, the portable fitness monitoring device 12 may present motivational content to the athlete while the athlete is participating in the fitness activity. In one embodiment, the steps of receiving the data from the remote user and presenting the motivational content are executed by a processor, such as CPU 60, located within the portable fitness monitoring device 12. In another embodiment, one or more of the steps of receiving the data from the remote user and presenting the motivational content may be executed by a processor that is remote to the portable fitness monitoring device 12.

In another embodiment of the present invention, the portable fitness monitoring device 12 may be capable of notifying the remote user that the athlete 14 is participating in a fitness activity. In this embodiment, the data that is wirelessly received by the portable fitness monitoring device 12 may have been sent from the remote user in response to the notification of the remote user.

As described above, the portable fitness monitoring device 12 supports two-way wireless WAN communication with communication tower 30 with WAN transceiver 104 and its associated antenna 106 for transmitting and receiving radio frequency signals 36. Accordingly, in an embodiment of the present invention, the radio frequency signals 36 may include data transmitted from the portable fitness monitoring device 12 directly to server computer system 42, directly to client computer system 44, or to client computer system 44 via server computer system 42. Likewise, the radio frequency signals 36 may include data received by the portable fitness monitoring device 12 that was transmitted directly from server computer system 42, directly from client computer system 44, or from client computer system 44 via server computer system 42.

In one embodiment, the data exchanged between two or more of the portable fitness monitoring device 12, the server computer system 42, and the client computer system 44 may be a message including motivational content (or a message in response to the receipt of motivational content). In another embodiment, the data exchanged may be a signal capable of presenting motivational content (or a message in response to the receipt of motivational content) on the receiving device or system.

In embodiments of the present invention in which the portable fitness monitoring device 12 notifies the remote user that the athlete 14 is currently participating in a fitness activity, such notification may be achieved in one or more ways. For example, the portable fitness monitoring device 12 may initiate the sending of one or more of the following: an email message, a text message (such as, for example, a SMS message), a multimedia message (such as, for example, a MMS message), a voice message, a voice mail message, a video message, and/or a voice-over-IP call to the remote user. In an alternate embodiment, the notification of the remote user is initiated by the server computer system 42.

As is known by those of skill in the art, online communities (such as, for example, MySpace, Facebook, Twitter, StudiVZ, and MeinMV) allow users to create personal profiles, link their accounts to those of other users, send and receive messages among users, post pictures to share, join and create groups according to their interests or areas of expertise, and update their personal profiles to provide various notifications to other users. Some services provide a space on every user's profile page that allows friends to post messages for the user to see. Other services allow users to send a brief notification that tells a user that they have been "poked." Still other services provide "status" updates that allow users to inform their friends of their whereabouts and actions.

Accordingly, in another embodiment, notification of the remote user that the athlete 14 is currently participating in a fitness activity may occur when the remote user observes that the athlete's 14 status has been updated—or a similar change has been made—to the athlete's 14 account in an online community. For example, a user logged into their online community may notice a status update for the athlete 14, whose online community account may be linked to that of the user. In an embodiment of the present invention, the remote user may be notified when an activity and/or location specific indicator is activated. For example, an indicator capable of conveying messages such as "I am working out," "The monitored athlete is working out," or "David is working out" may be activated. In another embodiment, the indicator may further identify the location of the athlete 14. For example, the indicator capable of conveying a message such as "David is running HERE" that includes the display of a real-time map indicating the athlete's 14 location. Alternatively, instead of providing the map within the indicator itself, the indicator may provide a hyperlink capable of presenting the real-time map content from a target source. The indicator may appear on the remote computer 44, for example, in the online community web browser window the user is already viewing, in another window, in a pop-up window, in a web browser tab, in a browser widget, in a desktop widget, or in any other suitable GUI element known in the art. In some embodiments, the indicator may include textual content and/or multimedia content such as audio content, video content, or image-based content. The online community may be a general purpose social networking community, such as, for example, Facebook, or an athletic-targeted online community.

Whether by email message, text message, multimedia message, voice message, voice-over-IP call, online community status update, or other suitable means, in an embodiment, the notification of the remote user may be automatically initiated by the portable fitness monitoring device in response to the athlete undertaking a fitness activity. In an alternate embodiment, the athlete must take an affirmative action beyond commencing the fitness activity in order to provide notification to the user such as, for example, by manipulating input button 80.

In an embodiment, automatic notification of remote users that the athlete is participating in a fitness activity is initiated in response to the portable fitness monitoring device 12 recording a time-stamped GPS waypoint. In other embodiments, automatic notification may be initiated in response to the device 12 determining that the athlete's 14 speed has increased to a predetermined velocity, or in response to the cessation of motion for greater than a predetermined period of time. Notification may also be initiated in response to the receipt of data from other sensors, such as heart rate monitor 120, in response to the transmission of data to server 42, or any other suitable events. For example, in one embodiment, the portable fitness monitoring device 12 may receive data from the heart rate monitor 120 indicating that the athlete's heart rate exceeds a predetermined value, at which point notification may be sent to one or more remote users.

Setting information may also include which users the athlete 14 would like to notify of the athlete's 14 activity and/or how often users should be updated. The athlete may be able to turn real-time feedback permission on or off for all users, specific individuals, and/or groups of individuals. These permissions may match or be different than permissions that allow a user to merely follow the athlete's 14 progress in real-time from a remote computer 44.

As described above, the portable fitness monitoring device 12 may be implemented as a special purpose device or may alternatively be realized on a conventional portable device platform, such as a mobile telephone, MP3 player, digital camera, PDA, etc. Accordingly, the motivation-related data may be sent and received via any of these devices.

Likewise, as described above, the remote user may be utilizing a remote client computer 44 which may be any suitable remotely located stationary client computer system, such as a desktop computer, or remotely located mobile client computer system, such as, for example, a laptop computer, a mobile phone, a personal digital assistant, or a dedicated portable fitness monitoring device. Accordingly, the motivation-related data may be sent and received via any of these devices.

The content of the notification provided to the remote user may include one or more of textual content and/or multimedia content such as audio content, video content, image-based content. In one embodiment, regardless of its form, the notification may include, for example, an indication that "David Jones is currently participating in a fitness activity," that "David Jones is out for a run," or a relatively simple indication such as "On a bike ride." In an embodiment, the notification may indicate the athlete's 14 performance during the present physical activity such as, for example, "David Jones is running at an 8 minute-mile pace," "David Jones has one more mile left to go on his run" or "David Jones is 5 seconds behind his personal record pace." In one embodiment, the notification may include a graphic indication that David Jones is participating in a fitness activity. For example, the notification may include a photo of David Jones on a bike. In still other embodiments, the notification may include a video clip or an animation. Also, as described above with respect to online communities, the notification may indicate the real-time location of the athlete 14 on a map or provide a hyperlink thereto.

As described above, the motivational-related data sent from the remote user to the athlete 14 may simply be a signal capable of presenting motivational content on the receiving device or system. In this case, the CPU 60 of the portable fitness monitoring device 12 processes the data sent from the remote user and determines what motivational content stored in the memory (such as internal memory 62) of the portable fitness monitoring device 12 should be provided to the athlete. In an embodiment, the motivational content output may be relatively simple such as an audio tone or the illumination of an LED or other light source.

Alternatively, the motivational-related data sent from the remote user to the athlete 14 may simply be a message including motivational content itself. Such motivational content may be created by the user or selected from a collection of pre-defined motivational content that may be available, for example, from an online community or server 42.

Regardless of whether it is stored in the memory of the portable fitness monitoring device 12 or elsewhere, the motivational content may be textual content and/or multimedia content such as audio content, video content, or image-based content. Textual or audio content may include messages like "Keep going, David," "Pick up the pace," "One more mile," or "Great job, David." Audio content may further include a song or other music clip or the sound of cheering spectators. Video or image-based content may include, for example, video or images of family members or friends, motivational images, symbols, or video clips such as those involving an athlete in motion, an athlete crossing a finish line, a "thumbs up" sign, spectators cheering, a gold medal, a trophy, or the like. In one embodiment, two or more of textual, audio, video, and image-based content are included in the same motivational message.

In an embodiment, the remote user determines the particular content that will be output to the athlete 14. In other embodiments, the athlete 14 may control or pre-select the output.

In embodiments where the motivation content includes a song or other music clip, the athlete 14 may predetermine which song or music clip is played in response to receiving a motivational data input from the remote user.

In an embodiment of the present invention, the motivational content includes an indication of the identity of the remote user who sent the motivational-based data signal to the portable fitness monitoring device 12. The identity of the remote user may be apparent based on an image or picture of the remote user, a textual display of the remote user's name, an audio announcement of the remote user's name, or other suitable indicators. Audio announcements may take the form of a live VoIP transmission, a short personal message spoken by the remote user, and/or a pre-recorded message that indicates the identity of the remote user in some way. In one embodiment, the indication of the identity of the remote user is a particular audio track stored in a memory device of the portable fitness monitoring device and associated with the particular remote user.

In other embodiments, motivational content may be sent from remote users and provided to the athlete 14 when the athlete is not participating in fitness activity—i.e. between fitness activities.

Users providing motivational content to the athlete 14 as described above may or may not be tracking the athlete 14 in real-time or otherwise utilizing training journal interface 232 while providing the motivational content to the athlete 14.

By employing such features, the portable fitness monitoring device 12 and system of the present invention may enable other users to hold the athlete 14 accountable for meeting the athlete's 14 fitness goals and keep the athlete 14 motivated during and between fitness training sessions.

With reference now to FIG. 6A, there is illustrated a high level logical flowchart of an exemplary method of authoring a training plan in accordance with the present invention. As illustrated, the process begins at block 600 and then proceeds to block 602, which depicts a user utilizing a client computer 44 describing a fitness training plan for an activity, for example, through a browser interface served over Internet 40 by authoring tool 242 of training plan module 240 (FIG. 3) via web server 214. The training plan includes one or more workouts and preferably includes at least a relative scheduling of the workouts. The training plan may further include specific routes and specific performance metrics, such as a target distance, target duration, target repetitions, target pace, target heart rate, target intervals or other performance goals for one or more of the workouts. The user may further associate metadata such as keywords (e.g., author name, plan length, fitness event, etc.) with the training plan so that it may be more easily located utilizing a conventional search tool. As described further below, the user may further enter information indicating a preferred adaptive behavior of the training planning in response to actually observed athletic performance of an athlete using the training plan.

After the training plan has been described, the user invokes storage of the training plan by authoring tool 242 within a training plan database 56 in data storage 50 of FIG. 1. In response, in one embodiment, authoring tool 242 generates an XML-formatted document specifying the training plan, and as indicated at block 604, stores the training plan within training plan database 56. The metadata contained in the XML-formatted training plan enables users to browse the contents of training plan database 56 utilizing a conventional search tool, such as the keyword search tool of a web browser. As further shown at block 606, the author of the training plan is preferably permitted by authoring tool 242 to subsequently access and modify training plans created by that author that reside within training plan database 56. Following block 606, the process ends at block 608. Of course, in other embodiments, the training plan may be electronically encoded in other ways, with or without reliance on the XML serialization protocol, and subsequently stored.

Referring now to FIG. 6B, there is depicted a high level logical flowchart of an exemplary method of installing a training plan into an athlete's 14 training journal in accordance with the present invention. The process begins at block 620 and then proceeds to block 622, which illustrates a user utilizing a client computer system 44 selecting a training plan from training plan database 56 of server computer system 42, for example, through a browser GUI served over Internet 40 by calendaring tool 244 of training plan module 240 via HTTP server 214. The selection may be aided by a conventional browser search tool, menus, pick lists, calendars or other conventional user interface components. As described above, the presentation of the interface components utilized to select the training plan may be invoked by selection of option 256 within GUI window 250 of FIG. 4A. In response to user selection of the training plan, calendaring tool 244 installs the selected training plan within the athlete's 14 personal training journal residing within training journal database 54. As noted, at block 624, installation of the training plan within the athlete's 14 personal journal may optionally require payment of a fee (e.g., authorization to charge a credit card number) and/or user agreement to abide by the terms of a copyright license in the training plan (e.g., as signified by selection of an "I Agree" button within the GUI displayed at client computer system 44).

When calendaring tool 244 of training plan module 240 installs the training plan within the athlete's 14 training journal, calendaring tool 244 preferably presents a calendar view similar to GUI window 420 of FIG. 5A or other GUI component(s) to enable user input of preferred scheduling and other preferences for the training plan. The user preferences may include, for example, desired starting and/or ending dates for the plan, preferred workout and/or rest days, the date of a race or other event to which the training plan pertains, audible alerts the user desires to be received during a workout, preferences relates to motivational output, etc. In response to the user scheduling input(s) and any other preferences, calendaring tool 244 automatically populates the calendar in the athlete's 14 training journal with the workouts within the selected training plan based upon the user's inputs and/or the relative scheduling of the workouts in the training plan. After the training plan has been installed within the athlete's 14 training journal, the athlete 14 is preferably permitted to further modify or customize the training plan, as depicted at block 628. In addition, training plan module 240 may automatically customize a training plan in an athlete's 14 personal training journal in response to the athlete's 14 activities recorded in the personal training journal if the adaptive behavior is specified by the training plan. For example, training plan module 240 may automatically remove prospective workouts from the training plan in response to the athlete 14 exceeding a weekly mileage target in order to prevent pre-event injury or may automatically add additional workouts (e.g., to the end of the training plan) if the personal training journal of athlete 14 indicates a failure to meet mileage goals. Alternatively or additionally, training plan module 240 may automatically decrease a target pace for one or more prospective workouts if the athlete 14 has had a lower than target pace over one or more previous workouts. Those skilled in the art will recognize that any number of other modifications to distance, pace and scheduling may similarly be automatically implemented in response to actual measured athletic performance. Following block 628, the process terminates at block 630.

With reference now to FIG. 6C, there is illustrated a high level logical flowchart of an exemplary method of automatically downloading one or more workouts within a training plan to a portable fitness monitoring device 12 in accordance with the present invention. As shown, the process begins at block 640 and then proceeds to block 642, which depicts a download manager 246 of training plan module 240 monitoring an athlete's 14 personal training journal to determine if any workout of a training plan installed within the athlete's 14 training journal falls within a next download time interval (e.g., within the upcoming week). If not, download manager 246 continues to monitor the athlete's 14 training journal.

However, if download manager 246 determines at block 642 that at least one workout of a training plan falls within the next download time interval, download manager 246 attempts to establish communication with the athlete's 14 portable fitness monitoring device 12 via Internet 40 and the wireless WAN, as depicted at block 644. If download manager 236 determines at block 644 that communication cannot be established, for example, because portable fitness monitoring device 12 is turned off or is out of range of the wireless WAN, download manager 246 waits a predetermined interval, as shown at block 645. The process then returns to block 642, which has been described.

Returning to block 644, if download manager 246 determines that the portable fitness monitoring device 12 is available to receive a download, the process proceeds to block 646. Block 646 depicts download manager 246 automatically downloading the workouts within the next download time interval to the portable fitness monitoring device 12 using an XML or other appropriate schema. As noted in block 646, the workout(s) preferably include at least one performance metric that may form the basis of a substantially real time alert during the associated workout. Following block 646, the process ends at block 648. Thus, workouts may be downloaded to portable fitness monitoring device 12 on an as-needed basis rather than all at once, which reduces utilization of storage in portable fitness monitoring device 12. Of course, in other embodiments, the download interval can be longer than the training plan, and all workouts within the training plan can be downloaded at once.

Figure 6D:
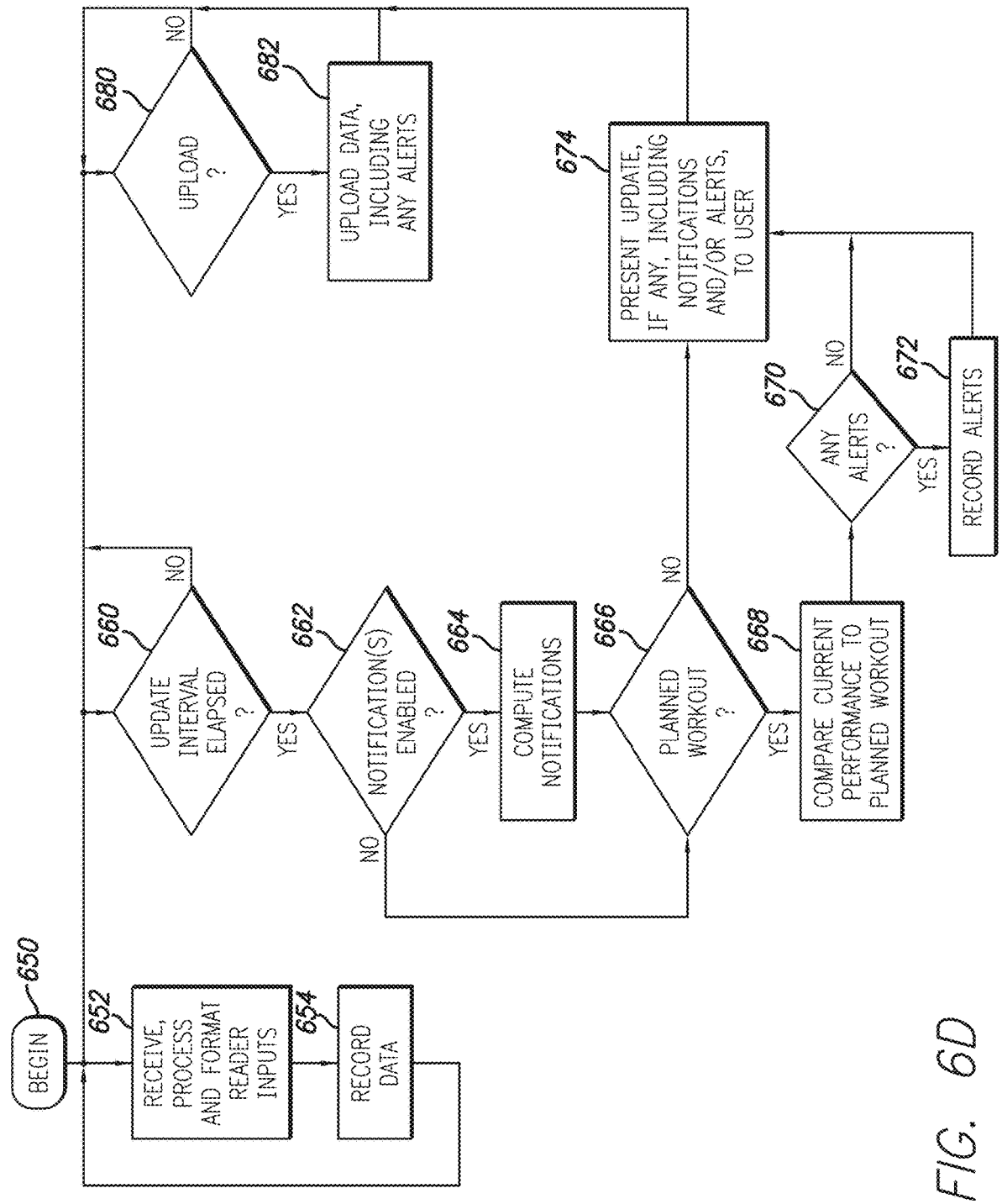
FIG. 6D is a high level logical flowchart of an exemplary method by which a portable fitness monitoring device presents comparative performance information in substantially real time in accordance with an embodiment of the present invention.

Referring now to FIG. 6D, there is depicted a high level logical flowchart of an exemplary method by which a portable fitness monitoring device 12 presents comparative performance information in substantially real time in accordance with the present invention. The process begins at block 650 in response to an athlete 14 initiating a monitored activity, for example, by selecting a route or planned workout from the internal memory device 62 of portable fitness monitoring device 12 and entering a "Start" command utilizing one of input buttons 80 of portable fitness monitoring device 12. The process then trifurcates and proceeds in parallel to each of block 652, 660 and 680.

Block 652 depicts data formatter 170 receiving and formatting input data regarding the athlete's activity from readers 160-166 as described above. After optional compression by data compressor 172, the input data received and formatted by data formatter 170 are recorded by route and performance recorder 176 within internal memory device 62 (or audio storage 66 or a removal memory loaded in removable memory slot 64), as depicted at block 654. The formatting and recording steps shown at blocks 652 and 654 are performed for the duration of the fitness activity.

Referring now to blocks 660-674, the operations of training input manager 186 described above may be extended to present notifications and alerts to the athlete 14 in substantially real time during the activity. As shown at block 660, training input manager 186 determines from the activity-related data recorded by route and performance recorder 176 whether or an update interval (e.g., an interval time and/or interval distance) has elapsed. The time and/or distance update interval(s) are preferably determined by the settings established by settings manager 184. If a time or distance update interval has not elapsed, the process iterates at block 660 until a time or distance update interval has elapsed. The process then proceeds to block 662, which illustrates training input manager 186 determining whether notifications are currently enabled by reference to the settings established by settings manager 184. These notifications provide feedback to athlete 14 of his performance (e.g., distance traveled, pace, split time, heart rate, etc.) in substantially real time without reference to performance goals.

If notifications are not currently enabled, the process passes to block 666, which is described below. If, however, notifications are currently enabled, training input manager 186 computes one or more notifications to be presented to athlete 14 (e.g., distance traveled, pace, split time, heart rate, etc.). Next, training input manager 186 determines at block 666 whether or not the current activity is a planned workout within a training plan downloaded to portable fitness monitoring device 12. This determination can be made based upon the athlete's 14 selection of a planned workout at block 650 or by dynamic matching of the route data recorded by route and performance recorder 176 and route information associated with a workout route downloaded to portable fitness monitoring device 12. If the current activity is not a planned workout, the process passes to block 674, which is described below. If the current activity is a planned workout, the process proceeds to block 668.

Block 668 depicts training input manager 186 comparing at least one metric of the athlete's current performance to a corresponding performance goal provided to portable fitness monitoring device 12 as part of the planned workout. Training input manager 186 next determines at block 670 whether or not any alerts should be presented to athlete 14 based upon the performance comparison performed at block 186. These alerts may include, for example, the following:

Speed/pace too slow or too fast
Total distance reached
Heart rate too slow or too fast
Distance or elevation gain milestone reached
Split time too fast or too slow.

The alerts determined at block 670, if any, are then recorded in association with the reader data in internal memory device 62 at block 672 so that the guidance provided to athlete 14 may be subsequently reviewed. Following a negative determination at block 670 or following block 672, training input manager 186 presents a performance update to athlete 14 in audible format that includes at least one notification or alert. That is, training input manager 186 locates an audio track within audio storage 66 or internal memory device 62 corresponding to a notification (e.g., "Pace is 8:30") or an alert (e.g., "Pace under target by 10 seconds") and presents the audio track to audio presentation module 192 for subsequent audible presentation to athlete 14. Of course, such updates may additionally be presented visually to athlete 14 by visual presentation module 190. Thereafter, the process returns to block 660, which has been described.

Referring now to blocks 680-682, the operation of upload manager 174 is illustrated. As described above, upload manager 174 and route and performance recorder 176 determine at block 680 whether or not to upload activity-related data based upon one or more criteria, for example, whether WAN transceiver 104 can acquire a connection to the wireless WAN, the available storage within internal memory device 62, an indication of whether or not a remote user, such as a competitor athlete, coach, trainer, event organizer, spectator, or friend, is tracking the training of athlete 14 in real-time, and/or other criteria. If, based upon these and/or other criteria, upload manager 174 decides not to upload activity-related data, the process returns to block 680. If, however, upload manager 174 decides to upload the formatted and compressed activity-related data, upload manager 174 outputs the activity-related data, including any alerts, via WAN transceiver 104 and antenna 106 to client computer system 44 and/or server computer system 42 utilizing radio frequency signals 36. Thereafter, the process returns to block 680.

Figure 7A:
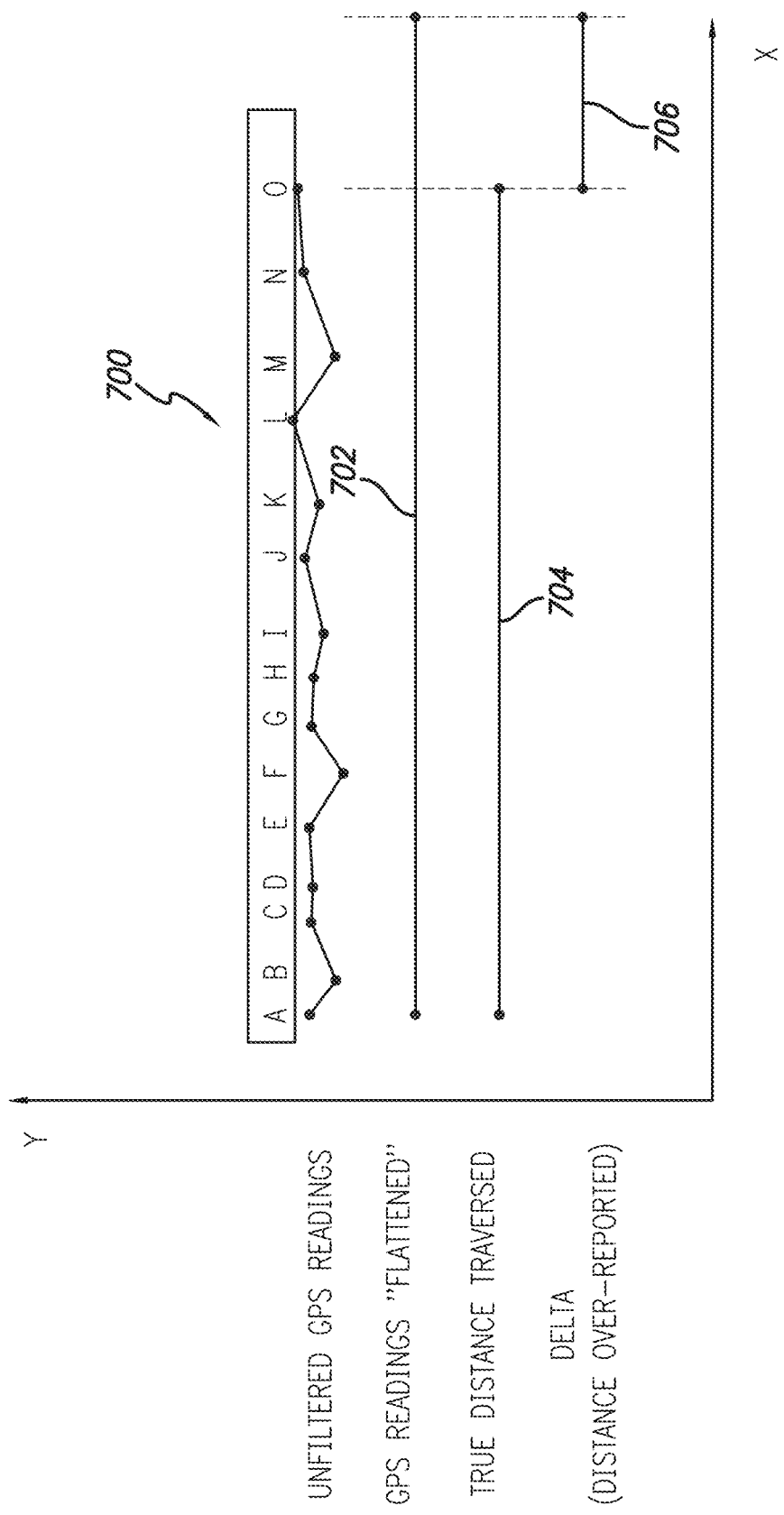
FIG. 7A depicts the over-reporting of distance traveled by unfiltered GPS waypoints when a GPS receiver is traveling at low velocity, in accordance with an embodiment of the present invention.

With reference now to FIG. 7A, there is illustrated a Cartesian graph illustrating the over-reporting of distance traveled by "raw" or unprocessed GPS waypoints when GPS receiver 100 is traveling at low velocity (e.g., less than 30 miles per hour and, more particularly, less than 15 miles per hour). As GPS receiver 100 is transported by athlete 14 equipped with the portable fitness monitoring device 12, GPS receiver 100 receives GPS signals 22 from GPS satellites 20, where each GPS signal 22 contains a timestamp. From these GPS signals 22, GPS reader 160 computes time-stamped waypoints A through O, which are plotted on an arbitrary Cartesian graph. As indicated by the varying spacing between the time-stamped waypoints and the irregular path of route 700, time-stamped waypoints are subject to at least two types of error, namely, timing error and positional error.

As can be seen, positional readings are based on a timestamp that may or may nor reflect the actual elapsed time between GPS readings. This timing error may be induced by a low performance processor driving GPS receiver 100 that does not have sufficient cycles to dedicate to GPS processing. Alternatively or additionally, timing error may be inserted by the use of assisted GPS (A-GPS), which requires round trip communication over the wireless WAN to validate a GPS reading, or by local filtering performed by GPS receiver 100 and/or GPS reader 160.

Additional positional error may also be caused by the inherent positional error of commercial (as opposed to military) GPS signals, which is typically between 3-5 meters. Consequently, when the sampling rate of the GPS signal causes more than one sample to be taken during time interval required to traverse the positional error distance, a zigzag route will be reported even if a relatively straight path is followed. As indicated by "flattened" GPS reading 702, the cumulative distance between adjacent pairs of time-stamped waypoints A through O is thus greater than the true distance traversed 704 by a delta distance 706. This distance error will also negatively impact any average or instantaneous velocity computations that depend on a correct reporting of distance traversed.

Figure 7B:
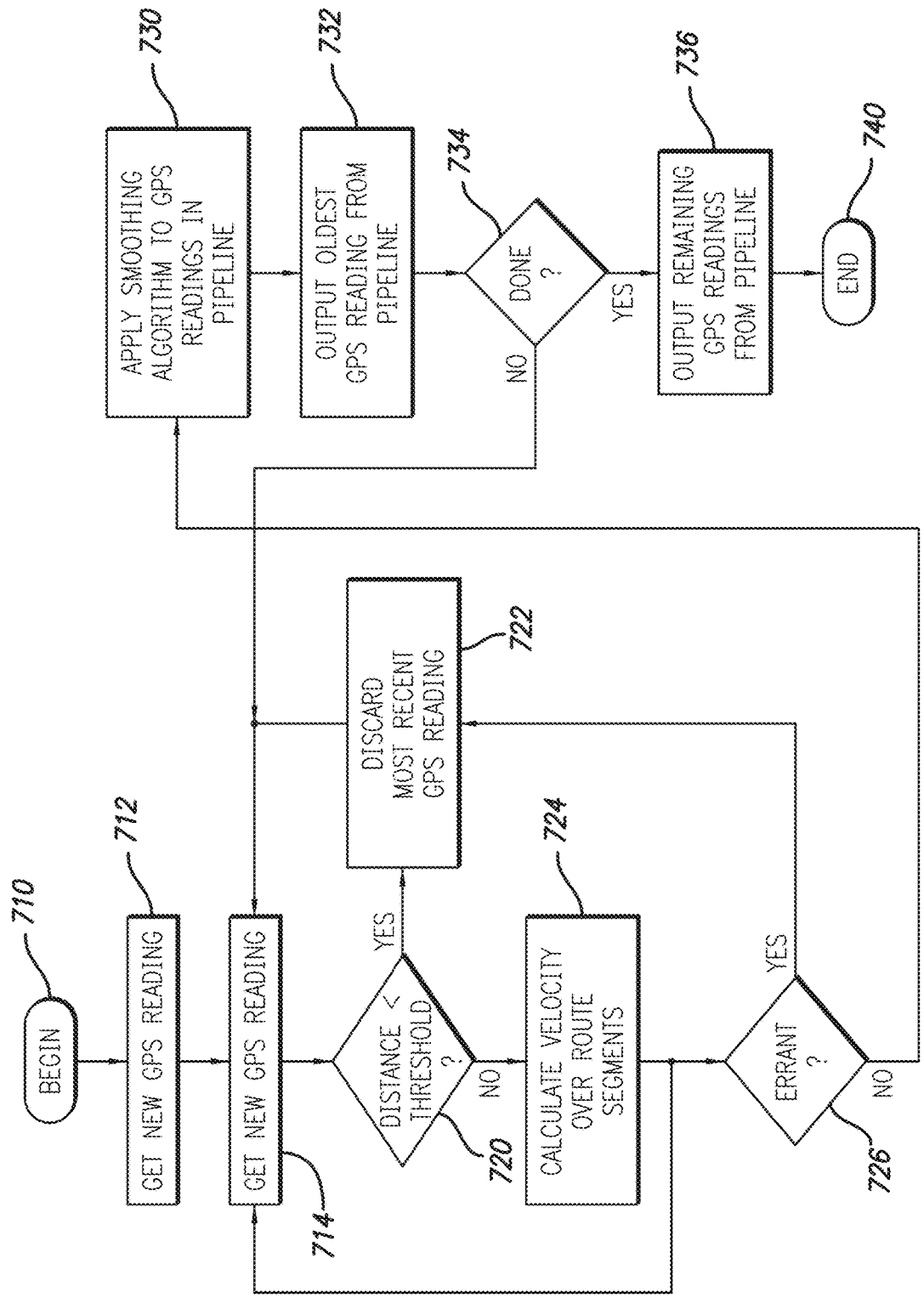
FIG. 7B is a high level logical flowchart of an exemplary method of processing raw GPS readings in accordance with an embodiment of the present invention.

Referring now to FIG. 7B, there is depicted a high level logical flowchart of an exemplary method of GPS filtering in accordance with the present invention. The illustrated method can be performed in hardware (e.g., by GPS receiver 100) and/or in software (e.g., by GPS reader 160).

The process begins at block 710 and then proceeds to blocks 712-714, which illustrates receiving and queuing in a pipeline a new GPS reading including at least a time stamp and a latitude/longitude duple, and optionally, a positional accuracy/uncertainty. After some time interval, a subsequent GPS reading is received and queued, as shown at block 714. Although the present invention is not limited to such embodiments, it will hereafter be assumed that the pipeline holds a maximum of 3 GPS readings, identified in order of receipt as A, B and C. Next, at block 720, a determination is made whether or not the length of the route segment between the two GPS readings most recently entered into the queue (i.e., B and C) is less than a first threshold, which in one embodiment is based upon (e.g., equal to) the (possibly variable) positional accuracy associated with the readings. If so, the process passes to block 722, which illustrates discarding the most recent GPS reading (C) from the pipeline. Thereafter, the process returns to block 714, which has been described.

Returning to block 720, in response to a determination that the distance traversed between the two most recent GPS readings (B and C) is not less than the threshold, the process bifurcates and proceeds to each of blocks 714 and 724. Block 724 illustrates calculating the velocity of GPS receiver 100 over the route segments AB, BC and AC based upon the length of the route segments and the time intervals between the GPS readings. Next, the process passes to block 726, which depicts determining whether or not a GPS reading in the pipeline is errant and should therefore be discarded.

In one embodiment, the middle GPS reading (B) is determined to be errant if:

(velocity $AB$)/velocity $AC$)>Threshold2, or (velocity $BC$)/(velocity $AC$)>Threshold2, where "velocity XY" refers to a velocity over route segment between points X and Y and "Threshold2" is a second threshold. In one embodiment, a second threshold ranging between 2 and 5, and preferably, about 3 is employed.

In response to a determination at block 726 that a GPS reading in the pipeline is errant, the errant GPS reading is discarded from the pipeline, as shown at block 722. Thereafter, the process returns to block 714. If, on the other hand, a determination is made at block 726 that a GPS reading in the pipeline is not errant, the process proceeds to block 730. Block 730 depicts the application of a smoothing algorithm to the GPS readings in the pipeline. In one embodiment, a curve fitting formula, such as least-squares curve fitting, is employed. A less computationally intensive alternative that may be employed is an equally weighted averaging algorithm such as:

$$(latB', lonB') = ((latA+latB+latC)/3, (lonA+lonB+lonC)/3)$$

where latX, lonX is the latitude, longitude duple for GPS reading X and (latB', lonB') is a replacement latitude, longitude duple for GPS reading B.

If an uncertainty or error "u" is available for each of GPS readings A, B and C (e.g., the uncertainties are supplied by GPS receiver 100 or derived based upon a heuristic that may account for the number of GPS satellites 20 available), a weighted averaging algorithm with possibly different weights for each GPS reading can alternatively be applied to "smooth" GPS reading B as follows:

$$U = (1/uA) + (1/uB) + (1/uC)$$

$$w1 = (1/uA)/U$$

$$w2 = (1/uB)/U$$

$$w3 = (1/uC)/U$$

$$(latB', lonB') = (w1*latA+w2*latB+w2*latC, w1*lonA+w2*lonB+w3*lonC)$$

Yet another alternative is a partially weighted smoothing algorithm that applies a percentage of emphasis given to the uncertainties "u":

P=percentage emphasis of uncertainties;

$$U = (1/uA) + (1/uB) + (1/uC)$$

$$w1 = [(1/uA)/U]*P + (1-P)/3$$

$$w2 = [(1/uB)/U]*P + (1-P)/3$$

$$w3 = [(1/uC)/U]*P + (1-P)/3$$

$$(latB', lonB') = (w1*latA+w2*latB+w2*latC, w1*lonA+w2*lonB+w3*lonC)$$

Experimentally, a value of P=0.5 has been found to be effective in smoothing GPS readings.

Following block 730, the oldest GPS reading (C) is output from the pipeline at block 732 and recorded as route data. A determination is then made at block 734 whether or not more "raw" GPS readings will be received for the current route (e.g., whether a "Stop" input has been received in response to manipulation of an input button 80). If not, the process returns to block 714, which has been described. If, however, no more "raw" GPS readings will be received for the current route, the process passes to block 736, which illustrates outputting and recording as route data any remaining GPS readings in the pipeline. Thereafter, the process ends at block 740.

The smoothed GPS data output from the pipeline is preferably what is recorded by route and performance recorder 176 within internal memory device 62. The process depicted in FIG. 7B can alternatively be implemented by software on a remote data processing system (e.g., server computer system 42 or client computer system 44) to correct the GPS data by post-processing or in real time. If the GPS data is corrected in real-time by the remote data processing system (e.g., server computer system 42), the corrected GPS data can be transmitted back to the source portable fitness monitoring device 12 or other GPS-enabled device for presentation or analysis.

With reference to FIGS. 7C through 7F, in addition to the types of errors described above, in one embodiment time-stamped waypoints may be subject to an additional type of error. Specifically, the characteristics of certain external environments may deflect or otherwise interfere with GPS signals 22 emitted from GPS satellites 20, which may cause false GPS readings by potable fitness monitoring device 12.

For example, GPS readings taken during a monitored fitness activity where the athlete 14 is near tall buildings or other closely spaced vertical features may include errors induced by the deflection of the GPS signals off of these vertical structures. Accordingly, the GPS readings and performance parameters that may depend therefrom (such as speed and distance) may be diminished in accuracy. Environmental characteristics that may interfere with GPS readings taken during a monitored fitness activity may include, for example, buildings, trees, hills, mountains, canyon or narrow valley walls, nearby bodies of water such as lakes or rivers, bridges, overpasses, and tunnels.

Figure 7D:
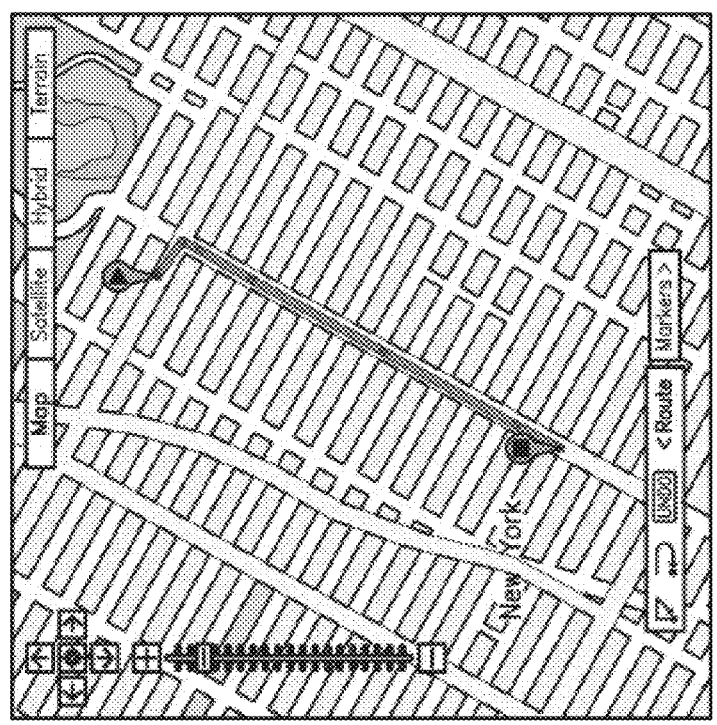
FIG. 7D is an exemplary graphical user interface detailing the route traversed with a portable fitness monitoring device referred to in FIG. 7C after a route adjustment has been applied, in accordance with an embodiment of the present invention.
Figure 7C:
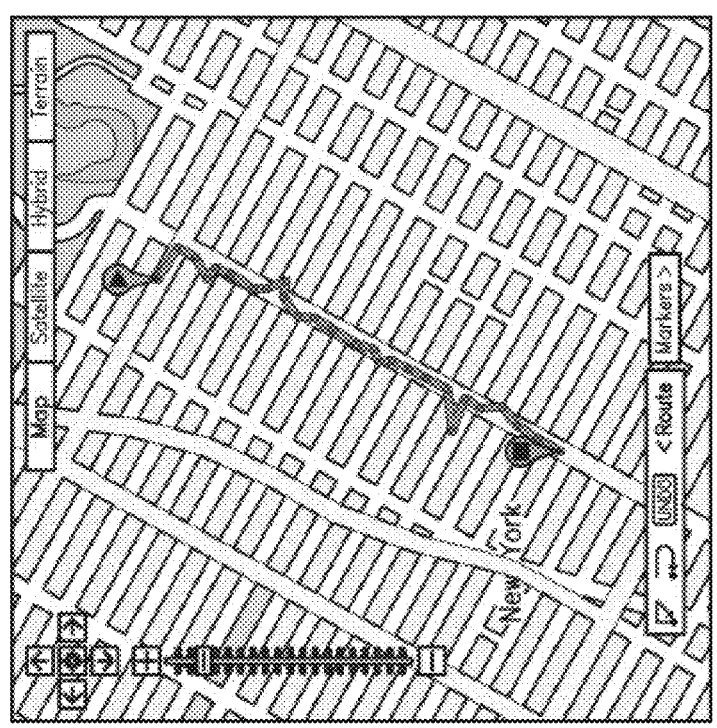
FIG. 7C is an exemplary graphical user interface detailing a particular route traversed with a portable fitness monitoring device in accordance with an embodiment of the present invention.
Figure 7F:
FIG. 7F is an exemplary graphical user interface detailing the route traversed with a portable fitness monitoring device referred to in FIG. 7E after a route adjustment has been applied, in accordance with an embodiment of the present invention.
Figure 7E:
FIG. 7E is an exemplary graphical user interface detailing a particular route traversed with a portable fitness monitoring device in accordance with an embodiment of the present invention.

FIG. 7C illustrates how tall buildings in New York City may deflect GPS signals, resulting in an unrealistic route when the GPS waypoints are superimposed over (or otherwise provided on) two dimensional map data corresponding to the location at which the monitored fitness activity took place (in this case, streets and/or sidewalks in New York City). Similarly, FIG. 7E illustrates how street overpasses, dense foliage, and water near a bike trail in Austin, Texas may also contribute to deflection of GPS signals and unrealistic waypoint data.

However, in an embodiment of the present invention, processing may advantageously be applied to make smart assessments of probable locations of the GPS readings based on map path data and/or historical route data collected from portable fitness monitoring devices 12 and to make corresponding adjustments to one or more of the raw GPS waypoints comprising the recorded route. FIGS. 7D and 7F illustrate how adjusting the routes depicted in FIGS. 7C and 7E, respectively, may yield a more probable route. In an embodiment, topographical data, which may include, for example, data regarding elevation or other surface feature data may also be used in making smart assessments.

Accordingly, in one embodiment of the present invention, a method for displaying a route traversed by an athlete equipped with a location-aware portable fitness monitoring device 12 may include one or more steps. First, data is received describing a plurality of GPS waypoints that are acquired as the athlete 14 engages in a fitness activity. Then, a map area is identified based on a location indicated by the data describing the plurality of GPS waypoints. Next, the route traversed by the athlete is determined based on the data describing the plurality of GPS waypoints. Finally, the route traversed by the athlete is displayed on top of the map area.

The above mentioned steps may be executed, for example, using a processor (such as CPU 60) located within the portable fitness monitoring device, using the server 42, using a remote computer 44, or using one or more processors located within two or more of these devices. Furthermore, the GPS data and/or corresponding may be corrected by post-processing or in real time.

As descried in further detail above, the system according to an embodiment of the present invention may preferably access a local or remote map database 224 that stores path information in association with at least latitude and longitude information, and preferably elevation information. In an embodiment, the map database 224 may include one or more path data layers. A path data layer may define paths by stored path segments that extend between nodes that correspond to path intersections.

In one embodiment, the route traversed by the athlete 14 is determined based on the location of one or more known paths associated with the map area. Paths associated with the map area may include paved paths such as paved roads, paved bike paths, or sidewalks. Paths may also include unpaved surfaces such as, for example, gravel or dirt roads or paths, hiking or biking trails, or any other known paths capable of being used for fitness activities.

In an embodiment, the route determination is made by comparing the locations indicated by the data describing the plurality of GPS waypoints with the locations of points along the one or more known paths associated with the map area.

For example, if the distance between a latitude/longitude duple associated with a GPS waypoint and a latitude/longitude duple of a point along a known path is less than a predetermined minimum distance (e.g., +/−10 meters), then the location of the GPS waypoint may be discarded in favor of the location of the point along the known path. In other embodiments, two or more points making up a route segment may be compared to two or more points of a known path in order to determine if a location substitution is necessary.

In one embodiment of the present invention, when it appears that the athlete 14 traversed a route entirely composed of one or more known paths, the entire route may be "locked" to locations(s) of the closest available path(s) at any given time along the route.

However, the location of the point along the known path need not be entirely substituted for the location of the recorded GPS waypoint. In an embodiment, the location of the relevant point along the route may be determined by factoring in both the location of the GPS waypoint and the location of the point along the known path. In one embodiment, the locations may be averaged and the location of the relevant point along the route may be determined to be in between these two points. Various weightings may be applied based on a variety of criteria that may weigh in favor of locating the final pathway closer to the location of the recorded GPS waypoint in some situations and closer to the point along the known path in other situations.

In one embodiment, the route traversed by the athlete 14 is determined based on the location of one or more known routes previously traversed by a person equipped with a location-aware portable fitness monitoring device. These known previously traversed routes may or may not follow one or more known paths associated with the map area data, as described above. In some embodiments, at least one of the one or more known routes may have been previously traversed by the athlete 14. In other embodiments, at least one of the one or more known routes may not have been previously traversed by the athlete 14.

A local or remote database may store the known routes previously traversed in association with at least latitude and longitude information, and preferably elevation information. Such a database may be, for example, route database 52 of server 42, as described above.

In an embodiment, the route determination is made by comparing the locations indicated by the data describing the plurality of GPS waypoints with the locations of points along the one or more known routes previously traversed.

For example, if the distance between a latitude/longitude duple associated with a GPS waypoint and a latitude/longitude duple of a point along a known routes previously traversed is less than a predetermined minimum distance (e.g., +/−10 meters), then the location of the GPS waypoint may be discarded in favor of the location of the point along the known routes previously traversed. In other embodiments, two or more points making up a route segment may be compared to two or more points of a known routes previously traversed in order to determine if a location substitution is necessary.

In one embodiment of the present invention, when it appears that the athlete 14 traversed a route entirely composed of one or more known routes previously traversed, the entire route may be "locked" to locations(s) of the closest available previous route(s) at any given time along the route.

However, the location of the point along the known routes previously traversed need not be entirely substituted for the location of the recorded GPS waypoint. In an embodiment, the location of the relevant point along the route may be determined by factoring in both the location of the GPS waypoint and the location of the point along the known routes previously traversed. In one embodiment, the locations may be averaged and the location of the relevant point along the route may be determined to be in between these two points. Again, various weightings may be applied based on a variety of criteria that may weigh in favor of locating the final pathway closer to the location of the recorded GPS waypoint in some situations and closer to the point along the known route previously traversed in other situations.

In an embodiment, when determining the route traversed by the athlete 14 based on one or more known routes previously traversed, whatever the precise calculation, any previous routes that were previously traversed by the athlete 14 himself may be given more weight in the relevant calculation than those previous routes that were not previously traversed by the athlete himself.

In other embodiments, both a known path associated with the map area and a known route previously traversed may be used in determining the route traversed by the athlete 14.

In one embodiment, a user may be able to adjust the device or system settings to determine which sources to use to determine the "final" version of the route traversed. For example, the user may be able to choose to have the final route determined based on: (1) recorded GPS waypoints only, (2) "locking" the route to the closest available path(s)/previously traversed route(s), or (3) using processing to make a smart assessment based on a combination of (1) and (2).

In another embodiment, route adjustments are made when necessary according to the following sequence of events. First, a determination is made as to whether a raw GPS waypoint corresponds to a known path associated with a map area. If such correspondence exists, the process makes adjustments to each GPS waypoint that deviates from the known path. If the raw GPS waypoints do not correspond to a known path associated with the map area from a map database, then a lookup into the known previously traversed route database is performed to determine if an existing known previous route has already been mapped in the system. If such correspondence exists, the process makes adjustments to each GPS waypoint that deviates from the known previously traversed route.

In some embodiments of the invention, a software module similar to route matching module 248, described in further detail below, may be employed to determine the route traversed by the athlete.

In other embodiments, raw GPS waypoints are provided to the athlete's 14 training journal database 54 on server 42, and the athlete 14 or other authorized user may later choose to employ one or more of the route error correction methods described above (i.e. post activity processing).

After the route traversed by the athlete is determined, the route may be displayed superimposed on the relevant map area. In various embodiments, the route may be displayed on the map on the portable fitness monitoring device 12 carried by the athlete 14 and/or the route may be displayed on the map on a remote computer 44.

The correction of the errors caused by the characteristics of certain external environments, as described above, may take place before, after, or simultaneously with the correction of errors due to the timing or positional errors described above. In some embodiments of the present invention, one or all of the preceding error correction methods may be omitted.

Accordingly, these methods may provide much better accuracy of measurements for both urban and rural fitness activity routes that will continue to get better over time as the content of the user-generated, known previously traversed route database grows.

Figure 8:
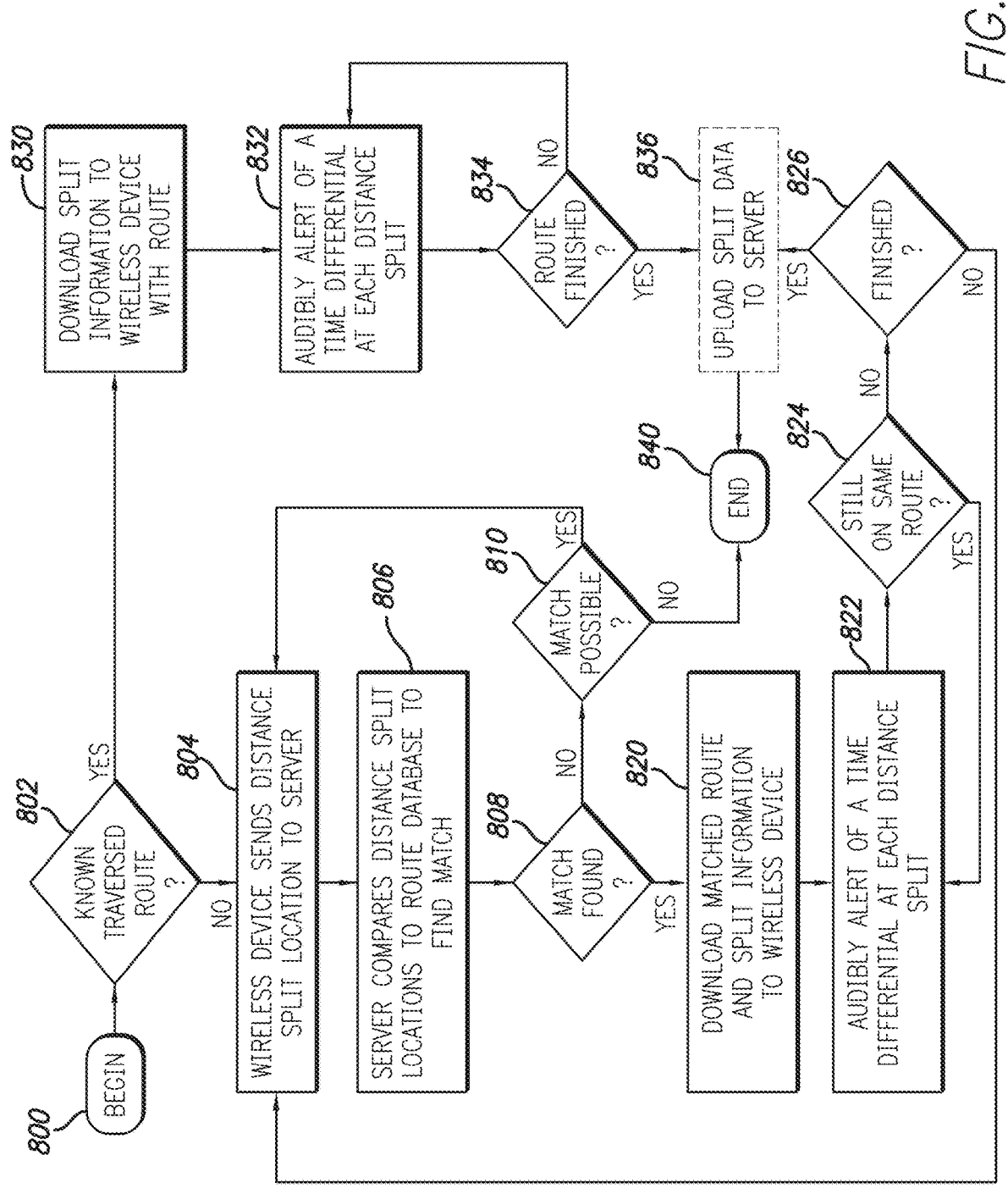
FIG. 8 is a high level logical flowchart of an exemplary method of automatically presenting comparative split information in accordance with an embodiment of the present invention.

While the correction of certain satellite navigational system errors has been described above with respect to a GPS system, as indicated previously, embodiments of the present invention may also encompass other global or regional satellite navigational systems in addition to, or instead of, GPS such as, for example, the European Union's Galileo system, Russia's GLONASS system, China's Compass system, or any other known or future developed satellite navigational systems With reference now to FIG. 8, there is depicted a high level logical flowchart of an exemplary method of automatically presenting comparative split information to an athlete in substantially real-time in accordance with the present invention. The process can be implemented, for example, as an extension to training input manager 186 of FIG. 2B.

The process begins at block 800 in response to an athlete 14 initiating a monitored activity, for example, by entering a "Start" command utilizing one of input buttons 80 of portable fitness monitoring device 12. The process then proceeds to block 802, which illustrates a determination of whether or not athlete 14 is traversing a route previously traversed by athlete 14. In a preferred embodiment, the determination depicted at block 802 can be made in response to athlete 14 input (e.g., the athlete 14 selecting a route or planned workout from the internal memory device 62 of portable fitness monitoring device 12) or can be made dynamically by route matching.

In response to a determination at block 802 that the route being traversed is known to be a route that was previously traversed (e.g., because of athlete 14 input), the process proceeds to block 830, which illustrates training input manager 186 requesting and receiving a download from server computer system 42 of split information for the current route stored within the athlete's 14 personal training journal within training journal database 54. The split information, which preferably provides a split for each equal sized route segment (e.g., quarter mile, half kilometer, etc.), may indicate a most recent, average and/or personal record split time for the athlete 14. Based upon the split information, training input manager 186 generates and presents a performance update to athlete 14 in audible format, as described above with respect to block 674 of FIG. 6D (block 832). That is, training input manager 186 locates an audio track within audio storage 66 or internal memory device 62 corresponding to the alert (e.g., "Mile 1 under PR by 6 seconds") and presents the audio track to audio presentation module 192 for subsequent audible presentation to athlete 14. Of course, such alerts may additionally be presented to athlete 14 by visual presentation module 190.

The process next passes to block 834, which depicts training input manager 186 determining whether or not the route has been completed, for example, by determining whether athlete 14 has indicated "Stop" utilizing one of input buttons 80 and/or by determining whether a known terminal waypoint of the route has been reached. If training input manager 186 determines at block 834 that athlete 14 has completed the route, training input manager 186 optionally uploads the split information for each segment of the route to the athlete's personal training journal within training journal database 54 on server computer system 42. (Data recorder module 226 of server computer system 42 could recompute the split information to reduce data transmission over the wireless WAN.) Thereafter, the process ends at block 840.

Referring again to block 802, in response to training input manager 186 determining that athlete 14 is traversing an unknown route, the process proceeds to block 804. Block 804 illustrates training input manager 186 uploading the GPS reading at a first or next split distance (e.g., 0 miles, ¼ mile, etc.) to a route matching module 248 running on server computer system 42. In response to receipt of the GPS reading, route matching module 248 compares the location specified by the GPS reading with previously traversed routes recorded within the athlete's personal training journal within training journal database 54 on server computer system 42 (block 806). If no location match with a previously traversed route is found within a given range (e.g., +/−10 meters), the process passes to block 810, which illustrates route matching module 248 determining whether or not a possible match still may exist (e.g., whether a previously traversed route is found within 2000 meters of the GPS reading received from portable fitness monitoring device 12).

If route matching module 248 determines at block 810 that a match may still be possible, the process returns to block 804, with route matching module 248 optionally signaling training input manager 186 that no match has been found but that a match is still possible. If, on the other hand, route matching module 248 determines that no match is possible (e.g., no previously traversed route was found within 2000 meters of the GPS reading received from portable fitness monitoring device 12), the process ends at block 840, with route matching module 248 optionally signaling training input manager 186 that no match has been found or is still possible.

Returning to block 808, in response to route matching module 248 determining that a matching previously traversed route resides in the athlete's personal training journal, route matching module 248 downloads split information for the route to training input manager 186, as illustrated at block 820. Training input manager 186 then utilizes the downloaded split information to generate and presents a performance update to athlete 14 in audible and/or visual format in substantially real time, as described above with respect to block 832 of FIG. 6D (block 822). Training input manager 186 thereafter monitors the GPS data recorded by route and performance recorder 176 as shown at block 824 to determine whether athlete 14 remains on the matched route downloaded from server computer system 42. If training input manager 186 determines that athlete 14 is remaining on the matched route downloaded from server computer system 42, training input manager 186 continues to present comparative split information, as depicted at block 822.

If, however, training input manager 186 determines that athlete 14 has left the matched route, training input manager 186 further determines at block 826 whether athlete 14 has finished the route, for example, by determining whether athlete 14 has indicated "Stop" utilizing one of input buttons 80 and/or by determining whether a known terminal waypoint of the matched route has been reached. If training input manager 186 determines at block 826 that athlete 14 has not finished the matched route, training input manager 186 attempts to match a new route, as indicated by the process returning to block 804. If, however, training input manager 186 determines at block 826 that athlete 14 has finished the matched route, the process passes to blocks 836 and 840, which have been described.

Figure 9:
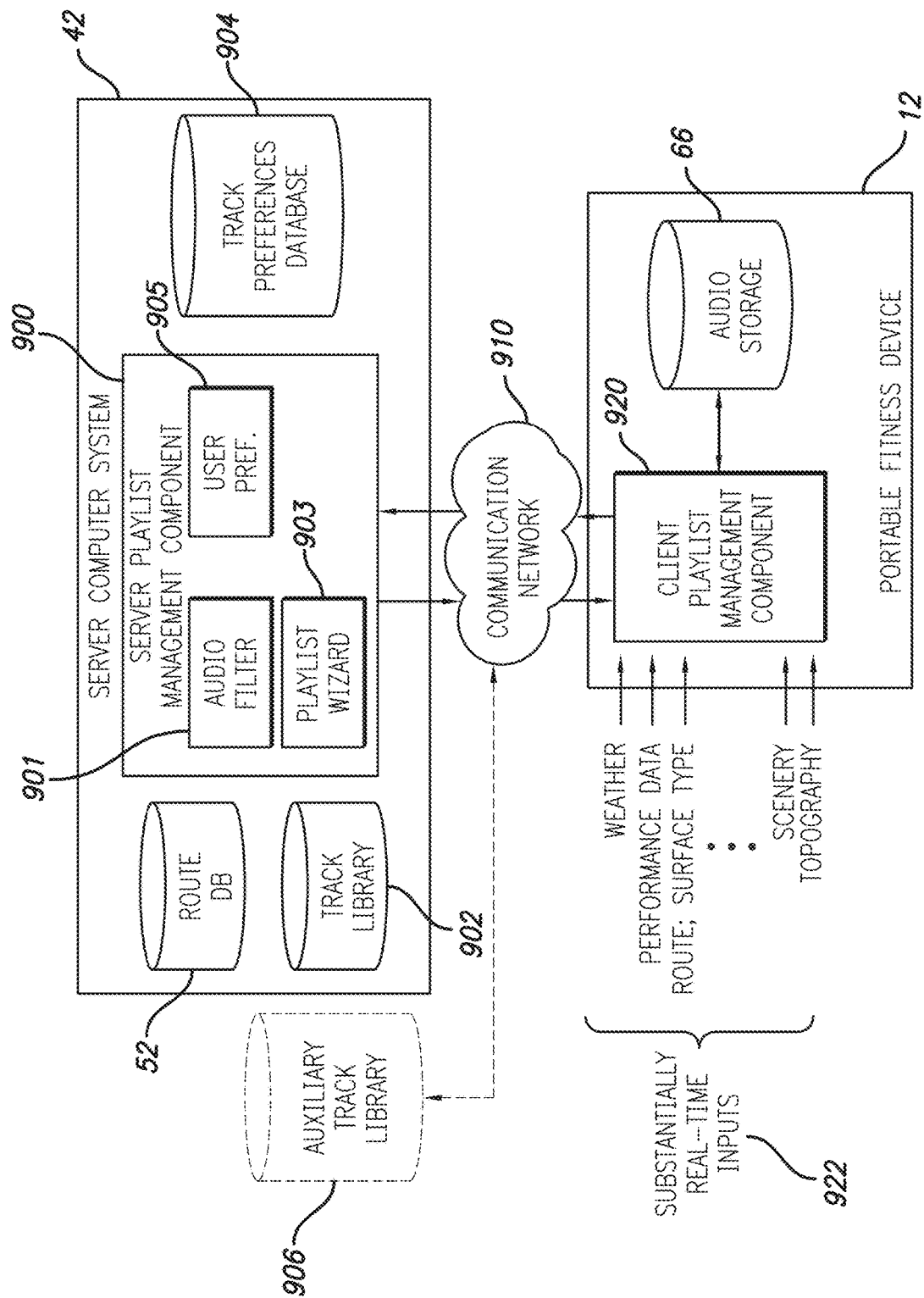
FIG. 9 is a high level logical flowchart of an exemplary playlist management architecture in accordance with an embodiment of the present invention.

Referring now to FIG. 9, there is depicted a block diagram of exemplary playlist management architecture in accordance with the present invention. For clarity, FIG. 9 illustrates only those portions of server computer system 42 and portable fitness monitoring device 12 helpful in gaining an understanding of the invention. As depicted, the playlist architecture includes a server playlist management component 900, a track library 902 containing songs and/or other audio tracks, and a track preferences database 904 residing at or accessible to server computer system 42. The playlist architecture optionally includes an auxiliary track library 906 containing additional songs and/or other tracks that may be accessed to augment the contents of track library 902. Auxiliary track library 906 may reside on a client computer system 44 or at a commercial music distribution service licensed to distribute tracks. In order to comply with copyright laws, access to each track in track library 902 may be restricted by server playlist management component 900 to only those users having a license to the track (e.g., as evidenced the user uploading the track directly from auxiliary track library 906 through selection of a hyperlink provided in a web page served by server playlist management component 900 and HTTP server 214).

Server playlist management component 900 is coupled for communication by a communication network 910 (e.g., Internet 40 and the wireless WAN) to a client playlist management component 920 residing on portable fitness monitoring device 12. Client playlist management component 920 receives a set of substantially real-time inputs 922, which may be provided, for example, by external sources (e.g., server computer system 42 or other web servers) coupled to communication network 910 and/or by readers 160-166. Inputs 922 may include, for example, weather conditions, athletic performance (e.g., pace, heart rate, distance, etc.), surface type (e.g., paved or unpaved), adjacent scenery, grade (e.g., uphill, flat or downhill), and point-of-interest information (addressed in further detail below). Client playlist management component 920 is further coupled to audio storage 66.

As described in greater detail below, the playlist architecture enables the creation of custom and/or dynamic playlists that will enhance an athlete's 14 activity (e.g., workout). For example, tracks may be played during the activity to motivate, relax or reward an athlete or establish a desired pace for selected segments of a route. Because tracks may be used for motivational purposes, the playing of a track may be tied to the wireless receipt of motivation-related data from a remote user, as described above.

With reference now to FIG. 10A, there is depicted an exemplary method of pre-processing an audio track to determine a corresponding activity pace in accordance with the present invention. As depicted, the process begins at block 1000 in response to designation of an audio track to be processed, for example, by a user invoking the uploading of a track to track library 902. The process then proceeds to block 1002, which depicts server playlist management component 900 applying an audio filter 901 to the track to determine a tempo for the track, for example, in beats per minute. Server playlist management component 900 then determines at block 1004 a corresponding pace for at least one athletic activity (e.g., running, hiking, cycling, etc.) based upon the track tempo and an estimated distance traversed per repeated motion (e.g., stride, pedal revolution, etc.) matching the tempo. Server playlist management component 900 next stores the audio track (or at least an identifier thereof) in track library 902 in association with one or more associated paces. Thereafter, the process ends at block 1008.

Referring now to FIG. 10B, there is depicted a high level logical flowchart of an exemplary method of constructing a user playlist in accordance with the present invention. The process begins at block 1010, for example, in response to a user logged into server computer system 42 and viewing a route in his training journal via a GUI presented by training journal interface 232 invoking a playlist wizard 903 within server playlist management component 900. The process then proceeds to block 1012, which depicts the playlist wizard 903 of server playlist management component 900 calling training journal interface 232 to present a GUI containing a selected view (e.g., an elevation view) of the route. The visual presentation of the route is preferably demarked into a plurality of route segments based upon, for example, substantial changes in route grade, predetermined distances, landmarks or other points-of-interest adjacent the route, user input, etc. The user may be permitted to change the location on the route of the demarcation between segments, for example, by manipulating the location of a line representing a segment interface utilizing a graphical pointer.

Next, at block 1014, playlist wizard 903 obtains a pace for each of the route segments comprising the route. For example, playlist wizard 903 may utilize a user-entered pace or an athlete's 14 historical average pace (for the specific route or overall) as the base pace for the route and, from the base pace, calculate a pace for each route segment based upon the average grade of each route segment. Alternatively, playlist wizard 903 may use one or more paces associated with the route by a workout in a training plan. The pace for each route segment may desirably be graphically indicated on the elevation view of the route with a respective attribute (e.g., color or pattern) and/or numeric label (e.g., presented in a flyover popup label presented when a graphical pointer is positioned over a route segment).

As depicted at blocks 1016-1018, playlist wizard 903 permits the user to build a playlist for the route by associating one or more tracks from track library 902 and/or auxiliary track library 906, for example, by dragging one or more tracks presented within a picklist to specific locations on the graphical presentation of the route. In addition, playlist wizard 903 may automatically (e.g., in response to user selection of an "Autofill" button with a graphical pointer) associate one or more tracks to portions of route segments not currently having associated tracks by matching (within a range) the pace of each track from track library 902 as determined at block 1004 with the pace of a route segment as obtained at block 1014. This automatic playlist construction may further be informed by user preferences, which may be entered as described below with reference to FIG. 10D.

The process proceeds from block 1018 to block 1020, which illustrates storing the playlist within the athlete's 14 personal journal in training journal database 54 such that the beginning of each track is associated with a particular location on the route. As indicated at block 1030, the playlist is optionally published to the community along with the route, for example, in response to a user selecting "Publish" button 496 of FIG. 5B.

As depicted at blocks 1032 and 1034, when the route is subsequently downloaded to a portable fitness monitoring device 12, for example, in response to an input invoking the download or in response to download manager 246 automatically pushing the route to the portable fitness monitoring device 12, the playlist is downloaded in association with the route. In this manner, the tracks within the playlist may be played at appropriate points along the route, as described below with reference to FIG. 10C.

Figure 10C:
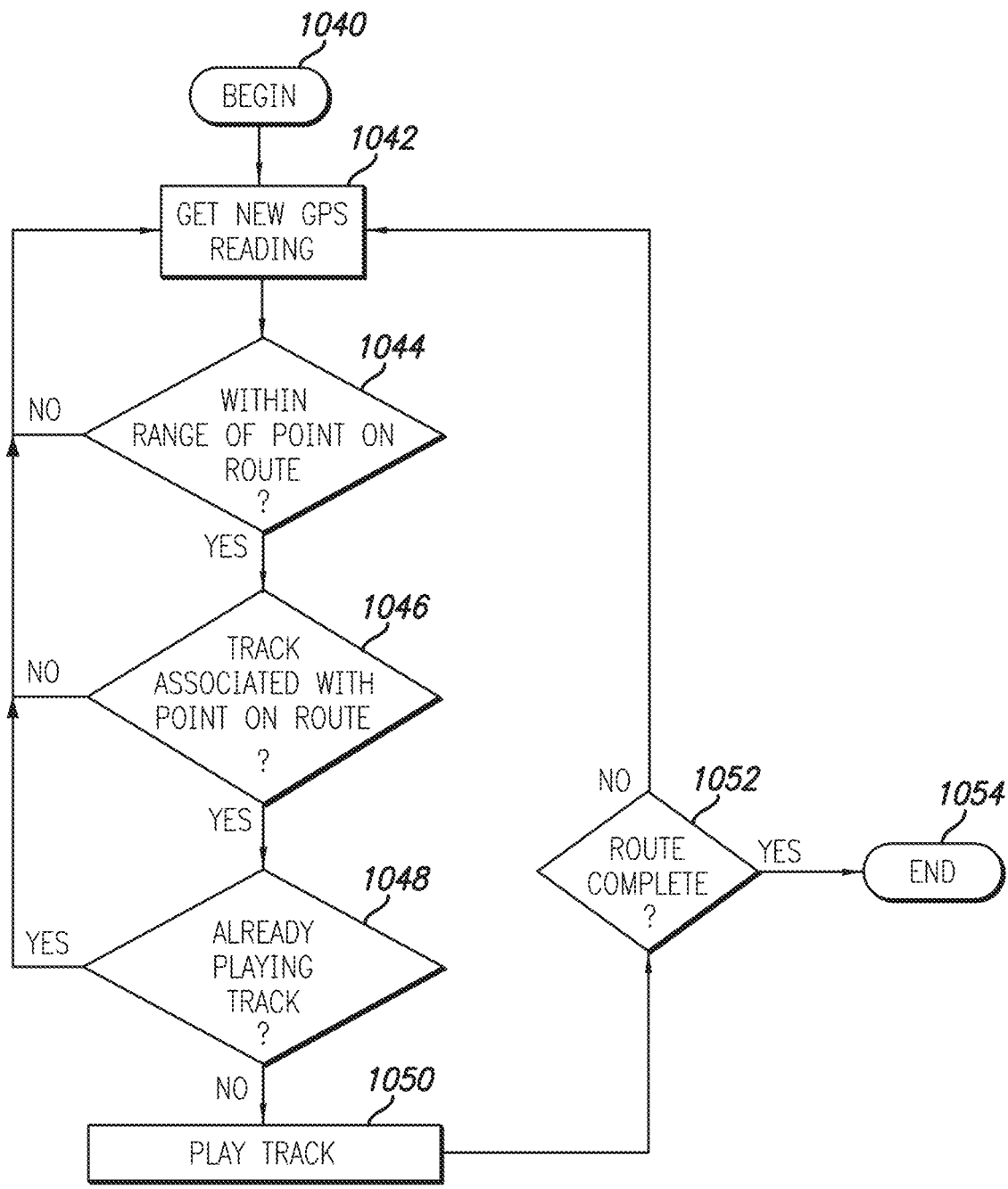
FIG. 10C is a high level logical flowchart of a location-based method of presenting audio tracks as a route is traversed in accordance with an embodiment of the present invention.

With reference now to FIG. 10C, there is illustrated a high level logical flowchart of a location-based method of presenting audio tracks as a route is traversed in accordance with the present invention. The illustrated process may be performed, for example, by audio presentation module 192 of portable fitness device client 154.

As illustrated, the process begins at block 1040 and then proceeds to block 1042, which depicts audio presentation module 192 receiving a new GPS reading from GPS reader 160 or route and performance recorder 176. At blocks 1044 and 1046, audio presentation module 192 then determines by reference to route information within internal memory device 62 whether the current GPS reading is within a predetermined range of a point on the route and, if so, whether a track within a playlist is associated with the point on the route. If either of the determinations depicted at blocks 1044 and 1046 is negative, the process returns to block 1042, which has been described. If, on the other hand, both of the determinations at blocks 1044 and 1046 are affirmative, audio presentation module 192 further determines at block 1048 whether or not it is already playing the track associated with the matching point on the route. If so, the process returns to block 1042, which has been described. If, on the other hand, the track is not already being played, audio presentation module 192 plays the track, as illustrated at block 1050.

As depicted at block 1052, if the route is complete, as indicated, for example, by an athlete 14 input received by the portable fitness monitoring device 12 via input buttons 80, the process ends at block 1054. If the route is not complete, the process returns to block 1042, which has been described.

Figure 10D:
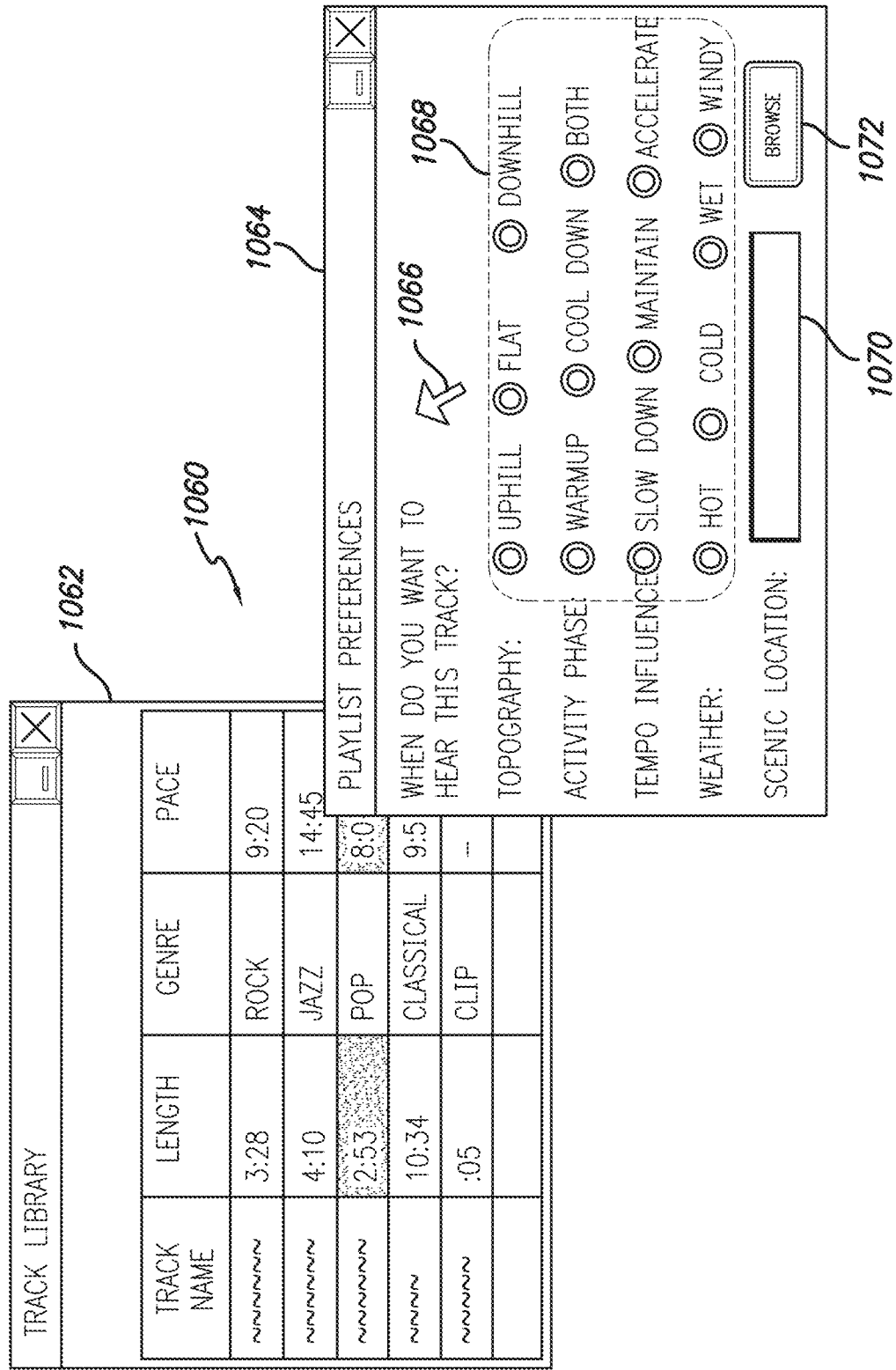
FIG. 10D illustrates an exemplary user interface by which user audio preferences may be entered in accordance with an embodiment of the present invention.

Referring now to FIG. 10D, there is depicted a block diagram of an exemplary graphical user interface (GUI) 1060 through which user audio preferences may be entered in accordance with the present invention. GUI 1060 may be presented within a browser interface on client computer 44 by user preferences package 905 of server playlist management component 900, for example, in response to a user establishing an account with server computer system 42 or in response to a user logging into server computer system 42 and entering an indication of a desire to enter playlist preferences.

As shown, GUI 1060 includes a track library window in which a list of tracks is presented. Entries in the track list may include information such as a track name, track length, genre and corresponding pace (e.g., determined as depicted in FIG. 10A). Of course, entries in the track list may include additional information, such as an artist and/or album name, track price, etc. In response to a user input associated with a track in the track list, for example, a user right-clicking on an entry with graphical pointer 1066 and then making a selection of a "Playlist Preferences" entry from a drop down list, user preferences package 905 causes a playlist preferences window 1064 to be presented within GUI 1060.

Playlist preferences window 1064 presents a number of GUI components that gather information regarding when the user would want the athlete 14 to hear a particular track. In the depicted embodiment, playlist preferences window 1064 includes radio buttons 1068 that the user can select with graphical pointer 1066 to indicate what grade (e.g., uphill, flat, or downhill), activity phase (e.g., warm-up or cool down), tempo influence (e.g., slow down, maintain, or accelerate), weather (e.g., hot, cold, wet, or windy), or point-of-interest the user wants to associate with the selected track. In an embodiment, the user may also be able to use playlist preferences window 1064 to associate a selected track with a particular remote user in regard to the receipt of motivational-related data from the remote user. In addition, playlist preference window 1064 includes a text box 1070 and associated "Browse" button 1072 that a user may employ to enter a name of a scenic location, type of scenery, or other point-of-interest with which the user desires to associated the selected track.

In addition to track specific preferences, user preferences package 905 preferably further collects the user's general track preferences, such as preferred genres of music, preferred activity phases for which presentation of tracks is enabled or disabled, etc., via one or more unillustrated graphical user interfaces. Using one or more of the track-specific and/or general preferences, the playlist architecture of the present invention can dynamically create and present a playlist to a user in association with an activity.

Figure 10E:
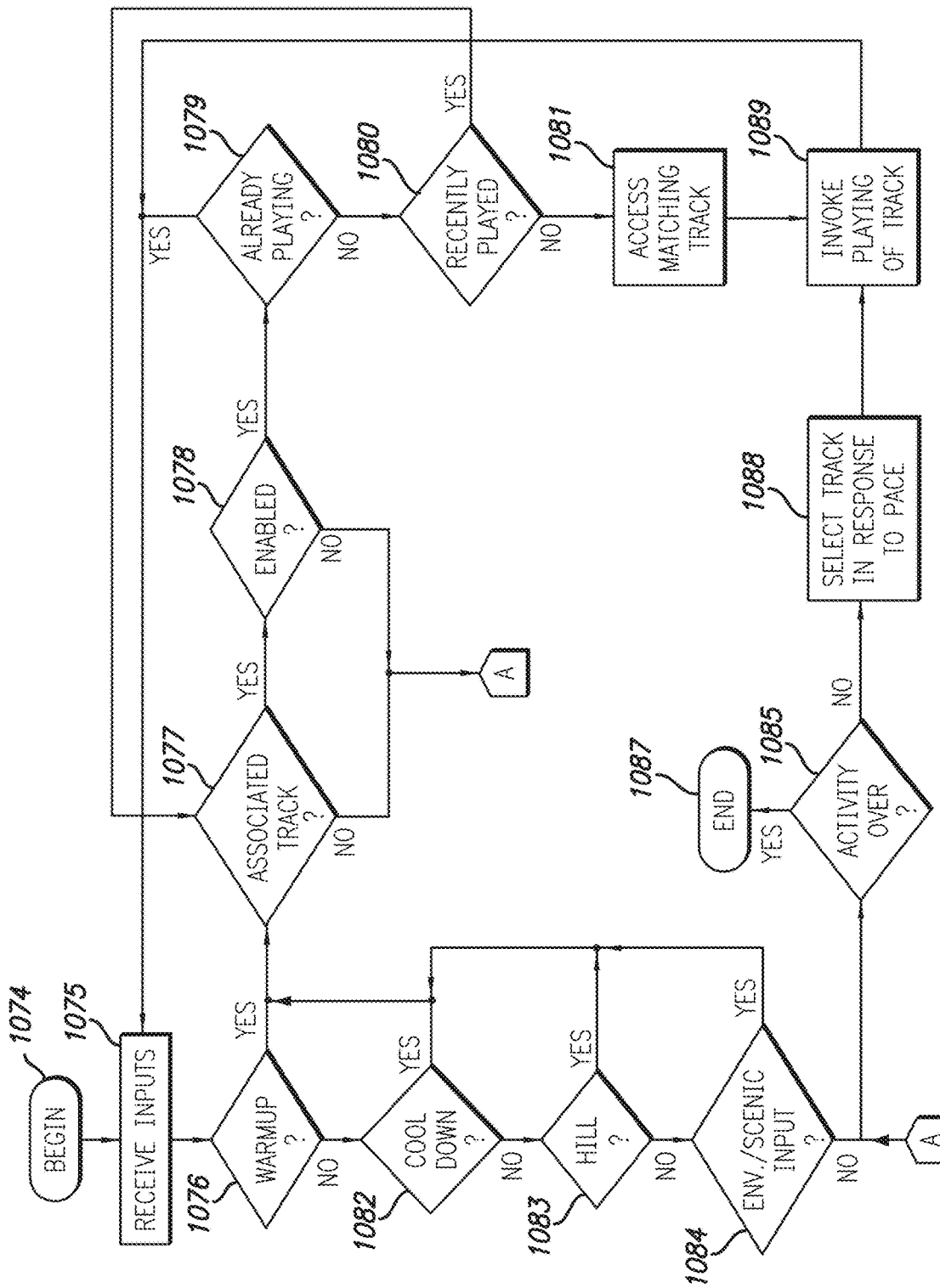
FIG. 10E is a high level logical flowchart of an exemplary method of dynamic playlist management in accordance with an embodiment of the present invention.

With reference now to FIG. 10E, there is illustrated a high level logical flowchart of an exemplary method of dynamic playlist management in accordance with the present invention. The depicted process can be performed remotely by client playlist management component 920 of portable fitness monitoring device 12, by server playlist management component 900 on server computer system 42 utilizing communication with portable fitness monitoring device 12 over communication network 910, or a combination of the two. The depicted method of dynamic playlist management can be performed in response to a user input or automatically as a default mode of operation in the absence of user designation of a particular playlist or user designation of a route with an associated user-constructed playlist.

As illustrated, the process begins at block 1074 and then proceeds to block 1075, which illustrates playlist management component 900 or 920 receiving a set of substantially real-time inputs 922 from external sources (e.g., server computer system 42 or other web servers) coupled to communication network 910 and/or by readers 160-166 within portable fitness monitoring device 12. As described above, the set of inputs 922 can include, for example, weather conditions, athletic performance (e.g., pace, heart rate, distance, etc.), surface type (e.g., paved or unpaved), adjacent scenery, route grade (e.g., uphill, flat or downhill), or other points-of-interest. In response to receipt of inputs 922, playlist management component 900 or 920 determines at blocks 1076, 1082, 1083, and 1084 whether inputs 922 indicate a particular activity phase (e.g., warm-up or cool down), a particular grade (e.g., uphill or downhill), proximity to a particular scenic input or other point-of-interest, or an environmental (e.g., weather) condition. If not, the process proceeds through page connector A to block 1085, which is described below. If, on the other hand, inputs 922 indicate a particular activity phase, a particular grade, or a particular environmental or scenic input or other point-of-interest, the process proceeds to blocks 1077-1078.

Blocks 1077-1078 depict playlist management component 900 or 920 determining whether the detected input has an associated track based upon the athlete's playlist preferences (e.g., playlist preferences entered utilizing GUI 1060 of FIG. 10D) and, if so, whether the general preferences have enabled or disabled playing the track for the particular input. If an associated track is identified and its playing is enabled, the process passes to block 1079, which illustrates a determination of whether or not the associated track is already playing. If so, the process returns to block 1075, which has been described. If not, the process proceeds to block 1080, which illustrates a determination regarding whether or not the track has recently been played, for example, in a user-selectable or predetermined non-repeating interval (e.g., 5 minutes). If so, the process returns to block 1077, representing a determination of whether or not an alternative track is associated with the triggering input. If a determination is made at block 1080 that the associated track determined at block 1077 has not recently been played, the process passes to block 1081.

Block 1081 illustrates playlist management component 900 or 920 accessing or causing the associated track to accessed, for example, from audio storage 66, track library 902 or auxiliary track library 906. Presentation of the associated track by audio presentation module 192 is then invoked, as depicted at block 1089. Thereafter, the process returns to block 1075, which has been described.

Returning to block 1085, a determination is made by reference to the pace and/or location or other inputs received at block 1075 whether the activity has been completed. If so, the process depicted in FIG. 10E ends at block 1087. If, however, a determination is made at block 1085 that the activity has not been completed, the process proceeds to block 1088, which depicts playlist management component 900 or 920 selecting a track from audio storage 66 or track library 902 corresponding to the current pace of athlete 14. Playlist management component 900 or 920 then invokes presentation of the selected track, as shown at block 1089. Thereafter, the process returns to block 1075, which has been described.

It will be appreciated by those skilled in the art that although the methods of FIG. 10A-10E have been described with particular reference to use by an athlete 14, it will be appreciated that the playlist management methodologies disclosed herein may be applied more generally to provide audio presentation services based upon a user's environment and/or location. Thus, for example, the services may be advantageously utilized by tourists, persons commuting in cars, buses, trains, etc.

In the case of athletes, location-based outputs may be provided to the athlete 14 in a variety of ways for a variety of different points-of-interest. Points-of-interest may include, for example: historically significant locations or structures; facilities of particular interest to competing athletes such as race starting lines, race finish lines, race registration booths, or bandstands/stages or other entertainment facilities along the race course; or facilities of interest to athletes or members of the general public such as bathroom facilities, a source of drinkable water, an establishment selling food and/or drinks, an athletic apparel store, entrances to pedestrian bridges, or other locations or structures that may be of interest to the athlete 14. Points-of-interest need not be limited to stationary structures or inanimate objects. For example, in an embodiment, the point-of-interest may be the location of one or more friends, family members, or coaches stationed along the race course or route. If the friend, family member, or coach is carrying a location based device, the location of the point-of-interest associated with that person may change as the person moves and may be tracked by the system of the present invention.

In one embodiment of the present invention, a method of providing a location-based output to an athlete 14 equipped with a location-aware portable fitness monitoring device may include one or more steps. First, data is received describing a GPS waypoint that is acquired as the athlete engages in a fitness activity. Then, a point-of-interest is identified. Finally, a location-based output is provided to the athlete 14 based on the identification of the point-of-interest.

The above mentioned steps may be executed, for example, using a processor (such as CPU 60) located within the portable fitness monitoring device 12, using the server 42, using a remote computer 44, or using one or more processors located within two or more of these devices. Furthermore, the point-of-interest output may be provided to the athlete 14 in real time or before or after completing a fitness activity.

Identifying a point-of-interest may include comparing a location indicated by the data describing the GPS waypoint to a location associated with the point-of-interest, and comparing the athlete's 14 location-based output preferences to characteristics associated with the point-of-interest.

Potential points-of-interest may be accessed by embodiments of the system of the present invention either locally or from a remote point-of-interest database, which may or may not be included within map database 224. Potential points-of-interest accessed locally may be saved in memory (such as internal memory 62) of the portable fitness monitoring device 12, and, in some embodiments, may be downloaded to the portable fitness monitoring device 12 along with a workout that is downloaded to the device 12. Potential points-of-interest accessed remotely may be accessed from a database housed in server 42 or from another suitable remote point-of-interest database.

The pool of potential points-of-interest may include a plurality of points of interest that are associated with at least latitude and longitude information (i.e. location information) and one or more characteristics about the points-of-interest. For example, characteristics associated with a point-of-interest may include whether or not the point-of-interest is historical in nature, relates to an athletic competition, relates to food and beverages, etc.

In an embodiment, a determination is made as to whether the distance between the location indicated by the data describing a GPS waypoint and the location associated with a potential point-of-interest is less than a minimum distance (e.g., +/−10 meters).

With regard to matching user point-of-interest preferences to characteristics of the potential points of interest, a point-of-interest management component may exist that may function similarly to playlist management components 900 or 920, described above. Specifically, a point-of-interest management component, or other suitable processing means (such as processor 60), may determine whether or not the athlete's preference settings indicate that the athlete 14 would like to receive point-of-interest information related to a particular potential point-of-interest.

For example, in one embodiment, the athlete 14 equipped with the portable fitness monitoring device 12 may be running in an organized race along a set race course. Race organizers or other users may have created or otherwise enabled access to a database containing a plurality of points-of-interest related to the race. As described above, points-of-interest may include things such as the race starting line, race finish line, the race registration booths, and water stations along the race course. Prior to participating in the organized race, the athlete 14 may download the point-of-interest data to his portable fitness monitoring device. During the course of the race, the portable fitness monitoring device 12 may provide a location-based output to the athlete 14 based on the athlete nearing a point of interest. In this case, because race organizers predetermined that the pool of points-of-interest would be relevant to all race participants, there may not be a need for the athlete 14 to set preferences regarding the types of point-of-interest alerts the athlete 14 would like to receive. However, in an embodiment, the athlete may use their device preference settings to indicate, for example, that they do not need to be notified of the location of water stations along the course. In alternate embodiments, the athlete 14 may download point-of-interest data in substantially real time as the athlete 14 traverses the course.

In another exemplary embodiment, a recreational athlete 14 may decide to go on a bike ride on a Sunday afternoon. The athlete 14 may decide to ride to and around a city park having a variety of bike paths. Because they athlete 14 has not decided precisely which paths he may be riding on prior to departing on the trip, relevant point-of-interest may have to be download to his portable fitness monitoring device 12 in real-time as the athlete 14 rides his bike. The city park may contain several statues or other structures of historical significance. Some athletes 14 may enjoy being provided with historical point-of-interest information while on a leisurely bike ride through the park, while others may prefer to not receive such information (these athletes 14 may, for example, prefer to listen to music via their portable fitness monitoring device 12). Accordingly, the athlete 14 may adjust their device or account settings accordingly prior to departing on the bike ride through the park.

In an embodiment, the athlete 14 may have established default settings at a previous time that will apply to this activity. As the athlete 14 approaches potential points-of-interest, a processor (such as CPU 60) will determine, based on location and the athlete's 14 preferences, whether or not to provide a location based output to the athlete, as described above.

Several different types of location-based outputs based on points-of-interest may be provided to the athlete 14. As described above with reference to FIGS. 9 and 10A-10E, in one embodiment, music tracks may be output based on the identification of a point-of-interest. Suitable outputs may also include textual, audio, video, image-based, or tactile (e.g. vibrations). In an embodiment, the video output may be an animation. In one embodiment, two or more of textual, audio, video, and image-based, or tactile outputs are included in the location-based output.

The location based outputs may also convey different types of information in different ways. In an embodiment of the present invention, the mere existence of a nearby point-of-interest may be indicted by, for example, an audio tone, the illumination of an LED, or a vibration. Such output may be sufficient, for example, for an athlete 14 running in a race each time the athlete 14 approaches a water station.

In one embodiment, a nearby point-of-interest may be indicated by, for example, a relatively short message such as "Water station," "Bathroom approaching," "Pedestrian bridge on your right," or "Washington Monument on your left in 25 meters." Such relatively short messages may be conveyed, for example, textually, audibly, or visually.

In another embodiment, a nearby point-of-interest may be indicated by, for example, a relatively long narrative message such as, for example. "The Washington Monument appears on your left. The Washington Monument is an obelisk near the west end of the National Mall in Washington, D.C., built to commemorate the first U.S. president, General George Washington. The monument, made of marble, granite, and sandstone, is the world's tallest stone structure . . . " As is understood by those of skill in the art, such relatively long narrative messages may most easily be conveyed to athlete 14 audibly Point-of interest information may also be used to define or chose an appropriate route for an athlete 14. In an embodiment of the present invention a route may be selected based on a user's preferred point-of-interest settings. Route selection may occur in accordance with the route wizard 222 feature described above, or by means of any other suitable user interface on the portable fitness monitoring device 12 or on a remote computer 44.

In an embodiment, the user may be prompted to specify point-of-interest parameters for a potential route. In particular, the user may be able to specify a location of the desired route by entering a known ZIP code or city name that includes several known points of interest, or by simply entering or selecting one or more specific points of interest or categories of points of interest. For example, a route may be selected or created based on a user's indication that they are interested in seeing the Capitol Building, the Washington Monument, and the Lincoln Memorial in Washington, DC. The user may further indicate features such as the desired length of their activity (e.g. 5K of distance or a 30 minutes). After a suitable route is selected or created, the athlete 14 may traverse the route and receive point-of-interest information about these landmarks.

In one embodiment, the user may be presented with a map indicating the location of several points of interest and the user may select one or more of the displayed points of interest to indicate that they would like a route that passes by the selected points of interest.

Referring now to FIG. 11A, there is depicted a high level logical flowchart of an exemplary method of publishing a challenge route to an online user community in accordance with the present invention. As shown, the process begins at block 1100, for example, with a user such as an athlete 14, competitor athlete, coach, trainer, event organizer, spectator, or friend, logging into server computer system 42 from a client computer 44 and invoking the display by training journal interface 232 of a particular route in an athlete's 14 personal training journal within training journal database 54 that has been traversed by the athlete 14. One exemplary GUI for viewing a traversed route is described above in detail with reference to FIGS. 5A-5B.

The process then proceeds from block 1100 to block 1102, which depicts the user designating the particular route as a "challenge" route, for example, through interaction with a GUI displayed as a result of the selection of "Publish" button 496 of FIG. 5B utilizing graphical pointer 262. In response to designation of the particular route as a challenge route, route generation and publication module 220 computes a point value for the challenge route, for example, based upon the total distance and cumulative elevation gain of the uphill portions of the route (block 1104). Route generation and publication module 220 then publishes the route in route database 52 for selection and download to the portable fitness monitoring devices 12 of other members of the service community. Thereafter, the process ends at block 1108.

With reference now to FIG. 11B, there is illustrated a high level logical flowchart of an exemplary method of staging the device-assisted traversal of a challenge route in accordance with the present invention. As depicted, the process begins at block 1110 and then proceeds to block 1112, which illustrates training input manager 186 of portable fitness monitoring device 12 determining if a user, such as athlete 14, has entered an input (e.g., using input buttons 80) signifying the selection of a challenge route previously downloaded to internal memory device 62 of portable fitness monitoring device 12. (The meta-data associated with the route in internal memory device 62 preferably indicates whether a downloaded route is a challenge route.) If not, other processing is performed, as depicted at block 1113.

In response to a determination by training input manager 186 that a challenge route has been selected for traversal, training input manager 186 further determines at block 1114 whether directions to the starting point should be presented. For example, training input manager 186 may determine if athlete 14 has entered an additional input requesting such directions or has simply not canceled the presentation of such directions. If a determination is made at block 1114 that no directions are needed or desired, the process proceeds to block 1118, which is described below. If, however, a determination is made at block 1114 that directions to the starting point of the route are needed or desired, training input manager 186 calls audio presentation module 192 and/or visual presentation manager 190 at block 1116 to present turn-by-turn audible direction and/or a map to guide athlete 14 to the starting point of the challenge route. This functionality is particularly helpful if the challenge route is off-road.

The process proceeds from block 1116 to block 1118, which illustrates training input manager 186 determining by reference to the GPS readings provided by GPS reader 160 whether or not athlete 14 has transported portable fitness monitoring device 12 to the starting point of the challenge route (e.g., within a positional error range (5 meters) of the starting location). If not, the process returns to block 1114, which has been described. If, however, training input manager 186 determines at block 1118 that athlete 14 has transported portable fitness monitoring device 12 to the starting point of the challenge route, the process passes to block 1120.

Block 1120 depicts training input manager 186 calling audio presentation module 192 to present an audible start message to the athlete 14 from audio storage 66. For example, the start message may state, "Forward motion will start timing the challenge route." Following presentation of the start message, training input manager 186 monitors GPS readings provided by GPS reader 160 at block 1122 for forward motion of portable fitness monitoring device 12 along the challenge route. When forward motion is detected, the process proceeds to block 1124, which depicts training input manager 186 calling audio presentation module 192 and/or visual presentation manager 190 to present real-time turn-by-turn audible direction and/or a map to guide athlete 14 along challenge route in response to GPS readings provided by GPS reader 160. Training input manager 186 may also present comparative performance or split information as the challenge route is traversed, for example, indicating comparative overall performance or splits with respect to a previous best time for traversing the challenge route (e.g., "You are 10 seconds off of best time"). Presentation of directional assistance continues until training input manager 186 determines an end point of the challenge route. Thereafter, the process ends at block 1128.

Figure 11C:
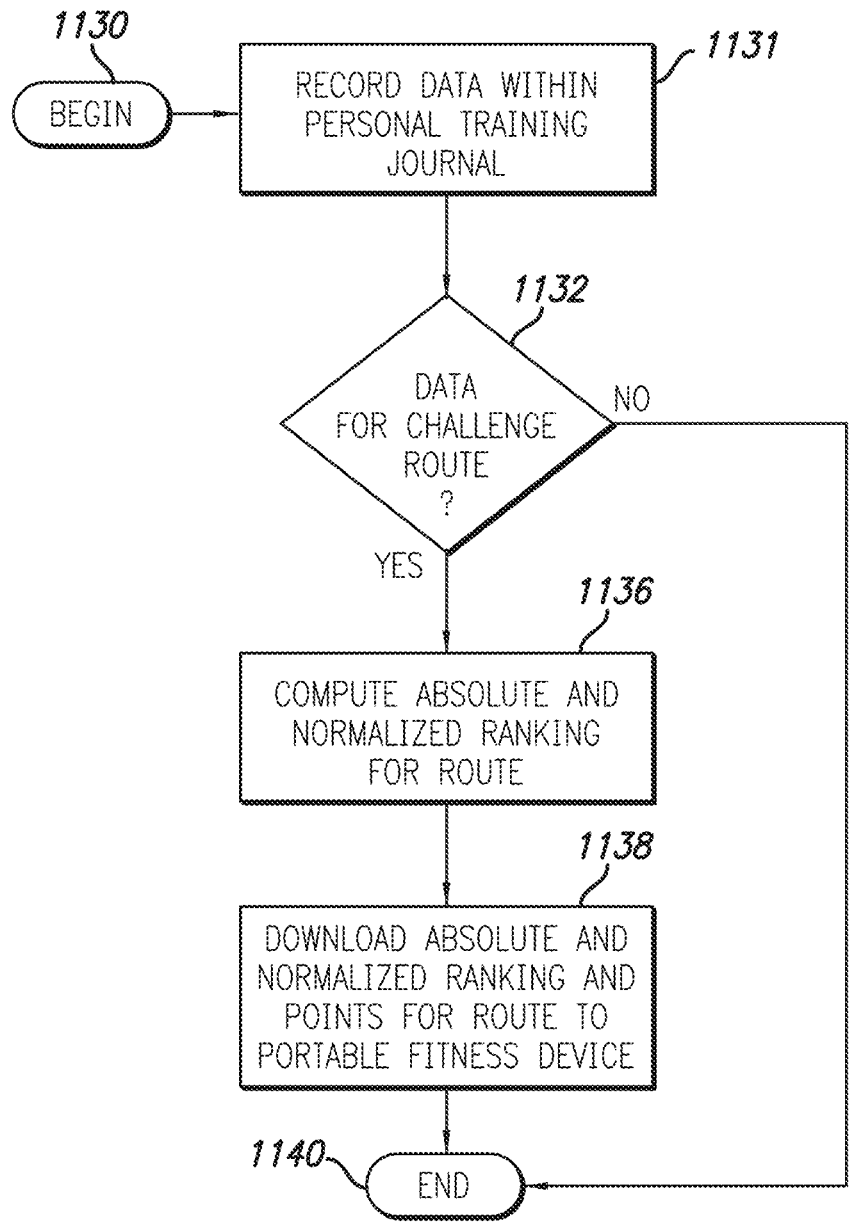
FIG. 11C is a high level logical flowchart of an exemplary method of presenting the results of a traversal of a challenge route in accordance with an embodiment of the present invention.

Referring now to FIG. 11C, there is depicted a high level logical flowchart of an exemplary method of presenting the results of a traversal of a challenge route in accordance with the present invention. The process begins at block 1130 and the proceeds to block 1131, which illustrates data recorder module 226 running on server computer system 42 receiving data recorded for a route traversed by a portable fitness monitoring device 12 from upload manager 174 running on the portable fitness monitoring device 12 and recording the data in an athlete's personal training journal within training journal database 54. Upload manager 174 preferably transmits the data in conjunction with a parameter indicating whether or not the route for the data were collected is a challenge route, permitting data recorder module 226 to determine whether the data is for a challenge route, as shown at block 1132. If the data is not for a challenge route, the process ends at block 1140. If, however, data recorder module 226 determines at block 1132 that the data is for a challenge route, the process proceeds to blocks 1136-1138.

Block 1136 depicts data recorder module 226 computing feedback regarding the traversal of the challenge route. For example, based upon the route data and other results for the same route contained in training journal database 54, data recorder module 226 may compute an absolute ranking of the total time for the route traversal (e.g., an overall and age-bracketed ranking) and a normalized ranking for the route traversal. The normalized ranking may compensate for factors such as wind speed and direction, athlete age, how long the athlete has been training, and/or temperature to correctly "handicap" diverse environment conditions and athletic abilities. As shown at block 1138, data recorder module 226 then downloads to portable fitness monitoring device 12 feedback information regarding the traversal of the challenge route. For example, data recorder module 226 may transmit the absolute and normalized rankings, as well as points earned by the athlete 14 for the traversal of the challenge route and a cumulative point total for all challenge routes traversed by the athlete 14. The feedback data transmitted by data recorder module 226 to portable fitness monitoring device 12 are received by training input manager 186 and then presented by visual presentation module 190 and/or audio presentation module 192. The process depicted in FIG. 11C then terminates at block 1140.

In an embodiment, a challenge race may be staged in between a plurality of athletes 12 each equipped with location-aware portable fitness monitoring devices 12, where the athletes may or may not be traversing routes in the same physical location.

Challenge races traversed simultaneously by several athletes may be tied to routes so designated as a challenge route by an athlete 14 or other user, as described above with respect to FIG. 11A. In an embodiment, the challenge route need not be a route previously traversed and recorded by an athlete, but may be a route built entirely from scratch by an athlete 14 or other user. The challenge route may or may not have a point value assigned to it, also as described above. In other embodiments, the challenge race is not tied to any particular route, but is defined by other parameters.

Challenge races staged among several athletes simultaneously may or may not be staged similarly to the staging of the traversal of a single athlete challenge route race, as described above with respect to FIG. 11B.

In an embodiment of the present invention, a method of staging a race between a plurality of athletes each equipped with a location-aware portable fitness monitoring device 12 may includes one or more steps. First, each portable fitness monitoring device accesses information related to the particular challenge race from one or more memory units. Then, based on this information, the portable fitness monitoring device notifies each of the participating athletes that it is time to begin the race, and later notifies them that it is time to end the race. During the course of the race or thereafter, race performance information is received, processed, and transmitted back to each of the participating portable fitness monitoring devices 12, thus notifying them of the results of the race.

An athlete 14 may decide to participate in a challenge race after creating the challenge race themselves, being invited by a friend to participate in a challenge race, or by finding a publicly available challenge race in the online community. An athlete 14 may participate in the challenge race as an individual, or groups of athletes may participate in the challenge race as members of a team.

Prior to participating in the challenge race, data related to the challenge race may need to be downloaded to the internal memory device 62 of portable fitness monitoring device 12. Alternatively, data related to the challenge race may reside on server 42 until it is necessary to communicate such data to the portable fitness monitoring devices.

Each challenge race may have a variety of information associated with it that may be interpreted by the portable fitness monitoring devices 12. For example, a challenge race may have specific time, distance, route, allowable number of participants, and/or activity requirements (e.g. participants are required to be walking, biking, inline skating, etc.).

In one embodiment of the present invention, the challenge race may be a time-based race. The goal of the time-based race may be, for example, for the participating athletes 14 to cover a set distance in the least amount of time. Athletes may or may not be required to follow a particular geographic route.

In another embodiment, the challenge race may be a distance-based race. The goal of the distance-based race may be, for example, for the participating athletes to cover the most distance in a set amount of time. Athletes may or may not be required to follow a particular geographic route.

In some embodiments, the athletes may be required to follow a predetermined geographical route while participating in the race.

Figure 11D:
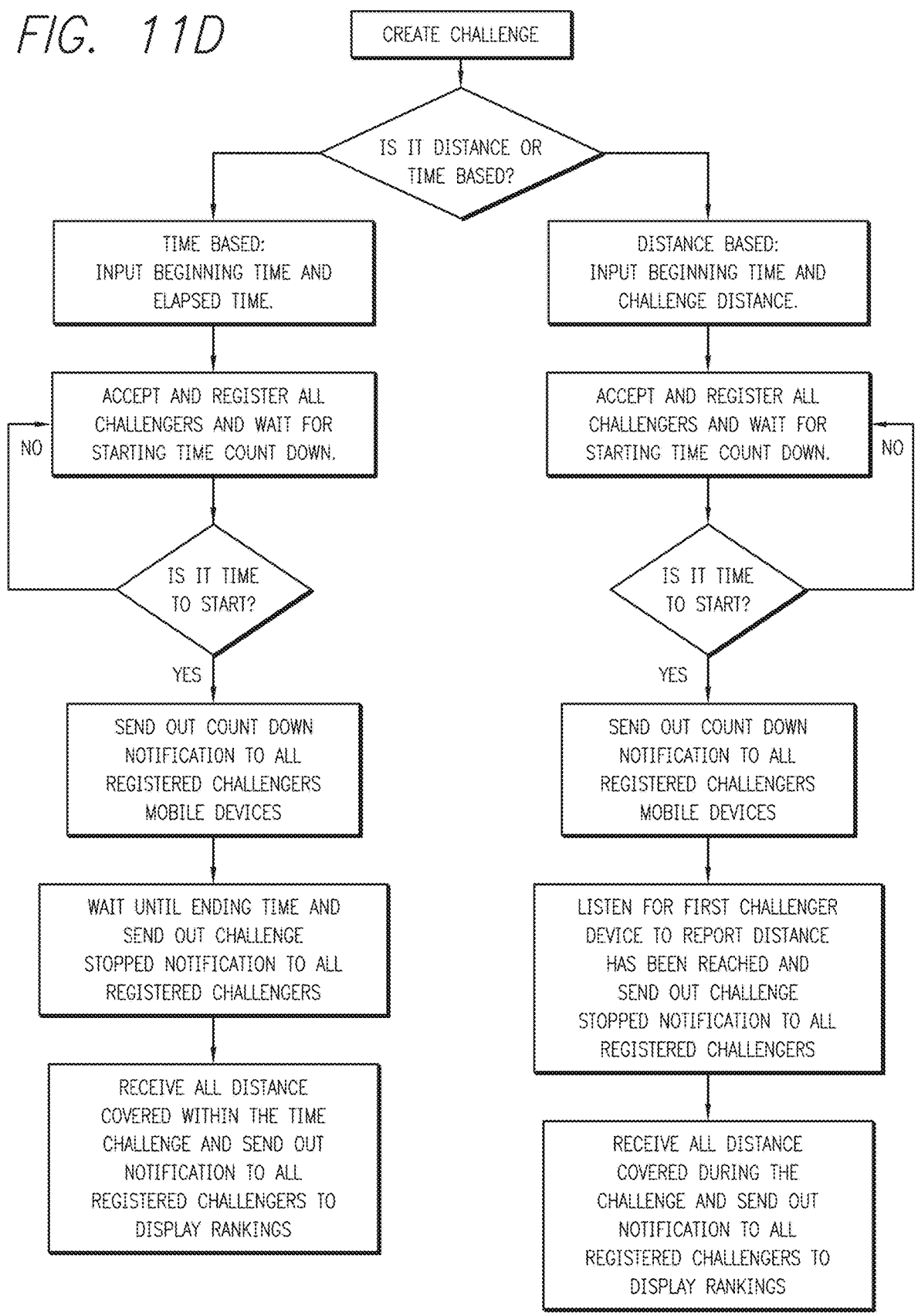
FIG. 11D is a high level logical flowchart of exemplary methods of creating, staging the traversal of, and presenting the results of time or distance based challenge routes, in accordance with an embodiment of the present invention.

With reference to FIG. 11D, the challenge race may be staged according to different methods depending on whether the challenge race is, for example, time or distance based. In an embodiment, a challenge race module running on the server 42 may be responsible for monitoring all of the participating challengers based on a registration method that provides synchronization between the server 42 and each of the portable fitness monitoring devices 12 carried by the participating challengers.

Regardless of the metric for measuring performance in the race, the portable fitness monitoring devices 12 of the participants may notify the athletes that it is time to begin the race. In embodiments where the challenge race information has already been stored locally in a memory devices of the portable fitness monitoring devices 12 (such as internal memory 62), local processors (such as CPU 60) may provide suitable outputs to the athletes 14. Such outputs may include textual, audio, or visual outputs such as, for example, an audile countdown ("On your mark, get set, go!") or the sound of a starter gun firing. In some embodiments, athletes may be given significant forewarning that the challenge race will begin in, for example, 30, 10, or 5 minutes.

In embodiments where the challenge race information is not stored locally in the memory devices of the portable fitness monitoring devices 12, this information must be accessed in order to provide indications to the participants that the race is beginning.

In one embodiment, the server 42 may be responsible for coordinating the "start" announcements to the plurality of participating portable fitness monitoring devices 12 so that it is ensured that each participant starts at the same time. Network latency, network performance, and portable fitness monitoring device performance have the potential to pose problems to coordinating start time announcements.

In an embodiment of the present invention, these potential problems may be addressed by leveraging the network time with respect to each portable fitness monitoring device 12. Specifically, a relative start time may be calculated for each portable fitness monitoring device 12 taking into account device specific timing issues (e.g., network latency). In one embodiment, this may be accomplished based on a master network time associated with the server 42 and provided to the portable fitness monitoring devices 12. For example, after the appropriate timing determinations and synchronizations are made, even though several participants' devices 12 may provide a 30 second countdown to start, another participant's device 12 may be set to provide a 29 second countdown because the later participant's device time is running one second behind that of the other devices 12.

As described above with respect to FIG. 11B, if the challenge race requires traversal of a particular route, turn-by-turn directions may be provided to the participants.

As the athletes participate in the designated fitness activity (e.g. running, biking, inline skating, etc.), GPS waypoints and other data may be logged either remotely or on the server 42, as described in detail above.

At the appropriate time, the portable fitness monitoring devices 12 of the participants may notify the athletes that it is time to end the race. The timing of such an announcement may vary according to the type of race. For example, in a time-based race, the portable fitness monitoring devices 12 may notify the athletes 12 that the race has ended when the predetermined race time has expired. In a distance-based race, the portable fitness monitoring devices 12 may notify the athletes 12 that the race has ended after the server 42 receives an indication that at least one of the race participants has achieved the predetermined distance goal. Appropriate end notifications may include an audible alarm or a message such as "The race ended, begin cool-down."

In order to provide race result information to the participants (and in order to determine the end of a distance based race), athlete performance information, which may include, but may not be limited to, time-stamped GPS waypoints, may need to be wirelessly transmitted to the server 42. Transmission may occur in substantially real-time throughout the traversals of the route or only after a given athlete 14 has completed the challenge.

In embodiments where data transmission occurs in substantially real-time, the server 42 may make ongoing performance and rank calculations so that the athletes 14 may be updated on their performance and relative position during the course of the activity.

The server 42 may determine the results of the race and present them in a variety of different ways. Athletic performance information may be processed to determine the race winner and the relative ranks of all race participants. Personal best times may also be calculated for individual athletes 14 and/or teams of athletes 14. As described above, points may be tallied and provided based on the relative difficulty of the challenge. Race results may be wirelessly transmitted to the participating portable fitness monitoring devices 12 after the race is complete. In one embodiment, race results are delivered to the portable fitness monitoring devices 12 within several minutes after the race ends. In another embodiment, race results are delivered to the portable fitness monitoring devices 12 in less than one minute after the race ends.

The notification of the race results may include textual content and/or multimedia content such as audio content, video content, or image-based content. Textual or audio content may include messages like "Great job, David," "You are the winner," "Congratulations, you came in $2^{nd}$ place out of 12 participants," or "You earned 50 points." Audio content may further include a song or other music clip or the sound of cheering spectators. Video or image-based content may include, for example, images, symbols, or video clips such as those involving an athlete in motion, an athlete crossing a finish line, a "thumbs up" sign, spectators cheering, a medal, a trophy, or the like. In one embodiment, two or more of textual, audio, video, and image-based content are included in the same race results notification.

Of course, race results information may also be saved to the journal database 54 in each athlete's training journal for future viewing and analysis.

Furthermore, remote users may be able to monitor the plurality of athletes participating in a challenge race in real-time, as described above.

With reference now to FIG. 12A, there is illustrated a high level block diagram of a system architecture that provides nutritional guidance to an athlete in accordance with the present invention. For clarity, FIG. 12A illustrates only those portions of server computer system 42 and portable fitness monitoring device 12 helpful in gaining an understanding of the invention.

As depicted, the nutritional guidance architecture includes a server computer system 42 and a portable fitness monitoring device 12. Server computer system 42 includes a server nutritional assistant 1200 and a meal plan database 1202 containing personal meal plans for subscribers. The personal meal plans may specify, for example, a caloric intake goal and/or other nutritional information (e.g., grams of fats, carbohydrates and sugars, food categories, food "point" value, etc.) on a per-meal or daily basis. Residing at or accessible to server computer system 42 is a restaurant database 904, which contains information regarding geographic locations of restaurants, hours of operation, and menu items available at the restaurants. With respect to menu items, restaurant database 904 preferably indicates an estimated calorie amount and optionally additional nutritional information (e.g., grams of fats, sugars, and total carbohydrates). The nutritional guidance architecture optionally further includes an auxiliary restaurant database 1206 (which may reside on a web server or represent a web portal such as Google, Bing, or Yahoo!) containing duplicate or additional information that may be accessed to locate restaurants, obtain information (e.g., calories or nutritional information) regarding menu items, and/or populate restaurant database 1204.

Server nutritional assistant 1200 is coupled for communication by a communication network 1210 (e.g., Internet 40 and the wireless WAN) to a client nutritional assistant 1220 residing on portable fitness monitoring device 12. Client nutritional assistant 1220 receives inputs from server nutritional assistant 1200 and presents the inputs via calls to visual presentation module 190 and/or audio presentation module 192.

As described in greater detail below, the nutritional guidance architecture enables an athlete 14 who uses the portable fitness monitoring device 12 to determine menu items conforming to a meal plan that are in proximity to the athlete's 14 geographic location. The menu items may be selected for presentation to the athlete 14 based upon the caloric expenditure associated with activities recorded in the athlete's 14 personal training journal within training journal database 54.

Referring now to FIG. 12B, there is depicted a high level logical flowchart of an exemplary method by which a client device, such as portable fitness monitoring device 12, queries a service for nutritional guidance in accordance with the present invention. The process begins at block 1230 and thereafter proceeds to block 1232, which depicts client nutritional assistant 1220 monitoring the athlete's inputs (e.g., manipulations of inputs buttons 80) of portable fitness monitoring device 12 for an input signifying a dining decision query. In response to detection of an athlete 14 input signifying a dining decision query, the process next passes to block 1234, which illustrates client nutritional assistant 1220 sending a dining decision query to server, such as nutritional assistant 1200 running on server computer system 42, via communication network 1210. The dining decision query contains the geographic location of portable fitness monitoring device 12 (e.g., as indicated by a recent GPS reading obtained from GPS reader 160) may optionally further contain or be interpreted as containing a parameter indicating one or more proximities (e.g., 1 mile, 3 miles, 5 miles) to the current geographic location.

As shown at block 1236, client nutritional assistant 1220 then iterates until a response to the dining decision query is received from server nutritional assistant 1200 via communication network 1210, for example, in the form of an XML document. In response to receipt of the response, client nutritional assistant 1220 presents the response to the athlete 14 at block 1238 by making appropriate calls to visual presentation module 190 and/or audio presentation module 192. In one embodiment, the XML response document includes a picklist containing one or more entries that each identifies a restaurant name, a distance (e.g., in miles or kilometers) to the restaurant from the current geographic location of portable fitness monitoring device 12, and a number of menu choices available at that restaurant that comply with the user's meal plan. Athlete 14 selection of an entry of the picklist may invoke further display of a map to the restaurant from the current geographic location of portable fitness monitoring device 12 and/or images of the available menu items. In other embodiments, the response to the dining decision query may be electronically encoded in other ways, with or without reliance on the XML serialization protocol.

Client nutritional assistant 1220 then determines at block 1240 if athlete 14 input has been received (e.g., via input buttons 80) indicating that the athlete 14 desires to receive additional results from more distant restaurants. If not, the process ends at block 1242. If so, client nutritional assistant 1220 increases the proximity parameter at block 1244 and issues another dining decision query with the increased proximity parameter, as shown at block 1234. Thereafter, the process continues as has been described.

With reference now to FIG. 12C, there is illustrated a high level logical flowchart of an exemplary method by which a server device responds to a query for nutritional guidance in accordance with the present invention. The depicted process begins at block 1250 and thereafter proceeds to block 1252, which illustrates server nutritional assistant 1200 waiting until a dining decision query is received from a client device, such as portable fitness monitoring device 12 or client computer system 44. In response to receipt of the dining decision query, server nutritional assistant 1200 accesses restaurant database 1204 and/or auxiliary restaurant database 1206 at block 1254 to identify one or more restaurants within at least one zone of proximity to the client device (e.g., portable fitness monitoring device 12).

As shown at block 1256, for at least one restaurant, and preferably for each restaurant identified at block 1254 that is within the proximity zone, server nutritional assistant 1200 then determines by reference to restaurant database 1204 and/or auxiliary restaurant database 1206 which menu items at the restaurant, if any, can be eaten by the athlete 14, given the time of day (i.e., an indication of whether the meal is a breakfast, lunch, dinner or snack) and the nutritional information (e.g., caloric intake goal, grams of fats, sugars and carbohydrates, food "point" values, etc.) specified in the athlete's 14 meal plan stored within meal plan database 1202. Server nutritional assistant 1200 may further take into consideration caloric expenditure estimated from recent activity (e.g., same or previous day) recorded for the user within training journal database 54. In this manner, caloric expenditure can be compensated for or "rewarded" by the inclusion of higher calorie menu item selections. Server nutritional assistant 1200 then downloads its response to the dining decision query to the client device (e.g., portable fitness monitoring device 12) via communication network 1210, as shown at block 1258. Thereafter, the process terminates at block 1260.

While the invention has been particularly shown as described with reference to a preferred embodiment, it will be understood by those skilled in the art that various changes in form and detail may be made therein without departing from the spirit and scope of the invention. For example, while the present invention has been described with respect to an exemplary software configuration in which software performing certain functions of the present invention resides on a server computer system of a service provider (e.g., of a subscription service), those skilled in the art will appreciate that, in alternative embodiments, such software may alternatively reside on a client computer system, such as client computer system 44, and/or on portable fitness monitoring device 12.

Furthermore, while the present invention has been described with reference to tracking and visualizing the performance and/or route of an athlete, those skilled in the art will appreciate that the present invention may also be applied to tracking and visualizing the location and movement of other persons, such as children or criminals under electronic supervision, or objects.

Moreover, although aspects of the present invention have been described with respect to a data processing system executing program code that directs the functions of the present invention, it should be understood that present invention may alternatively be implemented as a program product for use with a data processing system. Program code defining the functions of the present invention can be delivered to a data processing system via a variety of signal-bearing media, which include, without limitation, non-rewritable storage media (e.g., CD-ROM), rewritable storage media (e.g., a floppy diskette or hard disk drive), and communication media, such as digital and analog networks. It should be understood, therefore, that such signal-bearing media, when carrying or encoding computer readable instructions that direct the functions of the present invention, represent alternative embodiments of the present invention.

What is claimed is:

1. A method of displaying motivational content along a route traversed by an athlete, comprising:
    displaying a plurality of routes on a display of a portable electronic device of the athlete, the plurality of routes comprising a first challenge route;
    receiving a user input on the portable electronic device, the user input comprising a selection of the first challenge route;
    receiving data describing a plurality of satellite navigational system waypoints that are acquired as the athlete engages in a fitness activity;
    identifying a map area based on a location indicated by the data describing the plurality of satellite navigational system waypoints;
    determining first performance information of the athlete along the first challenge route based on the data describing the plurality of satellite navigational system waypoints;
    receiving second performance information related to a second athlete's traversal of a second challenge route;
    generating comparative performance information based on a comparison of the first performance information to the second performance information;
    displaying the route traversed by the athlete on top of the map area
    generating motivational content based on the comparative performance information;
    displaying the motivational content on the display;
    displaying the second challenge route traversed by the athlete on portable electronic device of the second athlete;
    receiving, on the portable electronic device of the athlete, a first notification to begin traversal of the first challenge route and a second notification to end traversal of the first challenge route; and
    receiving, on the portable electronic device of the second athlete, a third notification to begin traversal of the second challenge route and a fourth notification end traversal of the second challenge route;
    wherein the first notification and the third notification are received simultaneously, and wherein the second and the fourth notification are received simultaneously.

2. The method of claim 1, wherein the motivational content comprises an indication of the second performance information related to the second athlete's traversal of the second challenge route.

3. The method of claim 1, further comprising generating second motivational content based on the comparative performance information.

4. The method of claim 3, further comprising displaying the second motivational content on a display of a portable electronic device of the second athlete.

5. The method of claim 4, wherein displaying the motivational content is done in real-time, and wherein the displaying the second motivational content is done in real-time.

6. The method of claim 1, wherein the first challenge route and the second challenge route are the same route.

7. The method of claim 1, wherein the first challenge route and the second challenge route are different routes.

8. The method of claim 1, further comprising:
determining, based on the received waypoints, whether the athlete is at the starting point of the first challenge route.

9. The method of claim 8, further comprising:
receiving, on the portable electronic device of the athlete, a notification to begin traversal of the first challenge route.

10. The method of claim 9, wherein the motivational content is displayed after receiving the notification to begin traversal of the route.

11. The method of claim 1, further comprising:
determining, based on the received waypoints, whether the athlete is at the end of the first challenge route; and
receiving, on the portable electronic device of the athlete, a notification to end traversal of the first challenge route.

12. The method of claim 11, wherein the motivational content is displayed after receiving the notification to end traversal of the first challenge route.

13. A method of displaying motivational content along a route traversed by an athlete, comprising:
displaying a plurality of routes on a display of a portable electronic device of the athlete;
receiving a user input on the portable electronic device, the user input comprising a selection of a first route of the plurality of routes;
receiving data describing a plurality of satellite navigational system waypoints that are acquired as the athlete engages in a fitness activity;
identifying a map area based on a location indicated by the data describing the plurality of satellite navigational system waypoints;
determining performance information of the athlete along the first route based on the data describing the plurality of satellite navigational system waypoints;
generating motivational content based on the performance information;
displaying the first route traversed by the athlete on top of the map area displaying a second route traversed by the athlete on portable electronic device of a second athlete;
receiving, on the portable electronic device of the athlete, a first notification to begin traversal of the first route and a second notification to end traversal of the first route; and
receiving, on the portable electronic device of the second athlete, a third notification to begin traversal of the second route and a fourth notification end traversal of the second route;
wherein the first notification and the third notification are received simultaneously, and wherein the second and the fourth notification are received simultaneously.

14. The method of claim 13, further comprising displaying the motivational content over the display of the route traversed by the athlete.

15. The method of claim 13, further comprising displaying the performance information as a graphical representation overlaying the route traversed.

16. The method of claim 13, further comprising providing second motivational content after the athlete completes traversal of the route.

17. The method of claim 13, further comprising:
determining, based on the received waypoints, whether the athlete is at the starting point of the first route; and
displaying the motivational content on the display after determining that the athlete is at the starting point of the first route.

* * * * *